United States Patent
Rawlins et al.

(10) Patent No.: US 11,044,114 B2
(45) Date of Patent: Jun. 22, 2021

(54) RULE-BASED GRAPHICAL CONVERSATIONAL USER INTERFACE FOR SECURITY AND AUTOMATION SYSTEM

(71) Applicant: Vivint, Inc., Provo, UT (US)

(72) Inventors: Mark Allen Rawlins, Lehi, UT (US); Victoria Marie Thomas, Salt Lake City, UT (US); Nic Brunson, Salt Lake City, UT (US); Wes Robert Hotchkiss, Lehi, UT (US); Matthew Christopher Mahar, South Jordan, UT (US); Gavin Scott Jensen, Lehi, UT (US)

(73) Assignee: Vivint, Inc., Provo, UT (US)

( * ) Notice: Subject to any disclaimer, the term of this patent is extended or adjusted under 35 U.S.C. 154(b) by 197 days.

(21) Appl. No.: 15/818,545

(22) Filed: Nov. 20, 2017

(65) Prior Publication Data

US 2018/0139069 A1    May 17, 2018

Related U.S. Application Data

(63) Continuation-in-part of application No. 14/607,926, filed on Jan. 28, 2015, now Pat. No. 10,564,614.
(Continued)

(51) Int. Cl.
*H04L 12/28*    (2006.01)
*G06F 3/0482*    (2013.01)
(Continued)

(52) U.S. Cl.
CPC .......... *H04L 12/282* (2013.01); *G06F 3/0482* (2013.01); *G06F 3/04847* (2013.01);
(Continued)

(58) Field of Classification Search
None
See application file for complete search history.

(56) References Cited

U.S. PATENT DOCUMENTS 5,877,759 A    3/1999    Bauer
7,403,838 B2    7/2008    Deen et al.
(Continued)

FOREIGN PATENT DOCUMENTS

WO    2011007299 A1    1/2011

OTHER PUBLICATIONS

International Search Report and Written Opinion of the International Searching Authority for PCT/US2015/013439, dated Apr. 27, 2015.
(Continued)

*Primary Examiner* — Kenneth M Lo
*Assistant Examiner* — Istiaque Ahmed
(74) *Attorney, Agent, or Firm* — Holland & Hart, LLP

(57) ABSTRACT

A method including determining an occupancy state of a building relating to a user, detecting a condition of a component of the security and/or automation system associated with the home, displaying, based at least in part on the determined occupancy state of the user and the detected condition of the component, a message related to the user on a graphical conversational user interface ("G-CUI"). The message include a request for permission from the user to initiate a change associated with the component of the system. The method may include receiving, via the G-CUI, a response from the user including an instruction whether to grant permission to initiate the change based at least in part on the displaying, and generating a rule associated with the component and a future occupancy state of the home relating to the user based at least in part on the received response.

20 Claims, 29 Drawing Sheets

Related U.S. Application Data

(60) Provisional application No. 61/933,998, filed on Jan. 31, 2014.

(51) Int. Cl.

| | | |
|---|---|---|
| *G06F 3/0488* | (2013.01) | |
| *G06F 3/0484* | (2013.01) | |
| *G06F 21/62* | (2013.01) | |
| *G05B 11/01* | (2006.01) | |
| *G06Q 30/06* | (2012.01) | |

(52) U.S. Cl.
CPC ........ *G06F 3/04886* (2013.01); *G06F 21/629* (2013.01); *H04L 12/2829* (2013.01); *G05B 11/01* (2013.01); *G06F 21/6218* (2013.01); *G06Q 30/0635* (2013.01)

(56) References Cited

U.S. PATENT DOCUMENTS

| | | | |
|---|---|---|---|
| 8,786,425 B1* | 7/2014 | Hutz | H04M 11/04 |
| | | | 340/526 |
| 9,548,050 B2 | 1/2017 | Gruber et al. | |
| 9,614,690 B2 | 4/2017 | Ehsani et al. | |
| 10,421,238 B2 | 9/2019 | Leonard et al. | |
| 2004/0030531 A1 | 2/2004 | Miller et al. | |
| 2009/0195349 A1 | 8/2009 | Frader-Thompson et al. | |
| 2010/0289643 A1 | 11/2010 | Trundle et al. | |
| 2011/0099142 A1 | 4/2011 | Karjalainen et al. | |
| 2012/0125592 A1* | 5/2012 | Fadell | G05D 23/1902 |
| | | | 165/201 |
| 2013/0099011 A1* | 4/2013 | Matsuoka | G05D 23/1904 |
| | | | 236/1 C |
| 2013/0158721 A1 | 6/2013 | Somasundaram et al. | |
| 2013/0159220 A1 | 6/2013 | Winn et al. | |
| 2013/0185051 A1* | 7/2013 | Buryak | G06F 40/58 |
| | | | 704/2 |
| 2013/0297555 A1 | 11/2013 | Fadell et al. | |
| 2013/0338839 A1 | 12/2013 | Rogers et al. | |
| 2014/0277795 A1 | 9/2014 | Matsuoka et al. | |
| 2014/0293046 A1* | 10/2014 | Ni | H04N 7/181 |
| | | | 348/143 |
| 2015/0160797 A1 | 6/2015 | Shearer et al. | |
| 2015/0186357 A1 | 7/2015 | Oldham et al. | |
| 2015/0363989 A1* | 12/2015 | Scalisi | G07C 9/00904 |
| | | | 348/143 |
| 2016/0378080 A1 | 12/2016 | Uppala et al. | |
| 2017/0076263 A1* | 3/2017 | Bentz | H04W 4/80 |
| 2018/0181286 A1* | 6/2018 | McKay | G06F 3/04845 |

OTHER PUBLICATIONS

Supplementary European Search Report for EP Application No. 15743043, dated Sep. 1, 2017 (3 pp.).

* cited by examiner

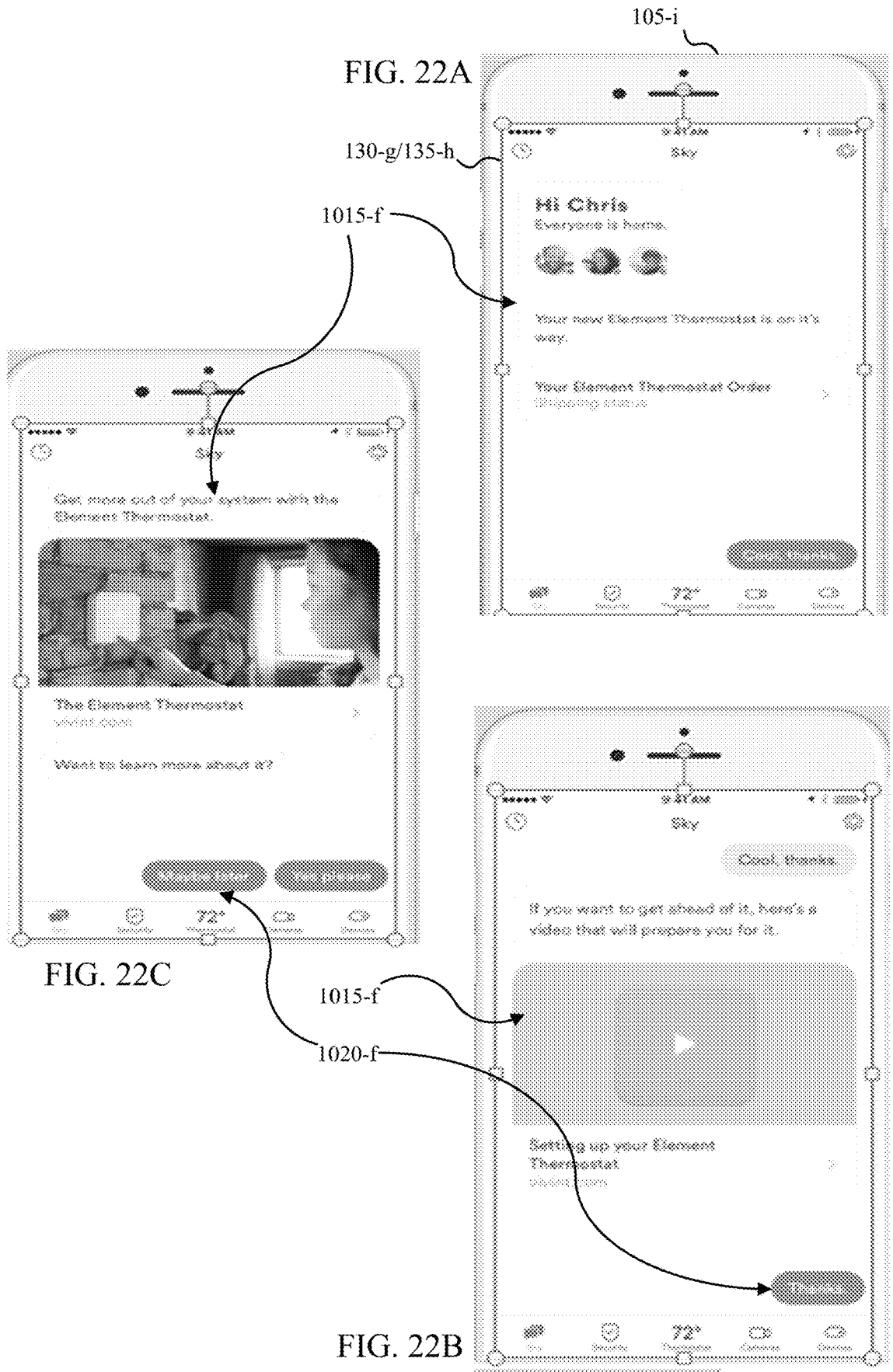

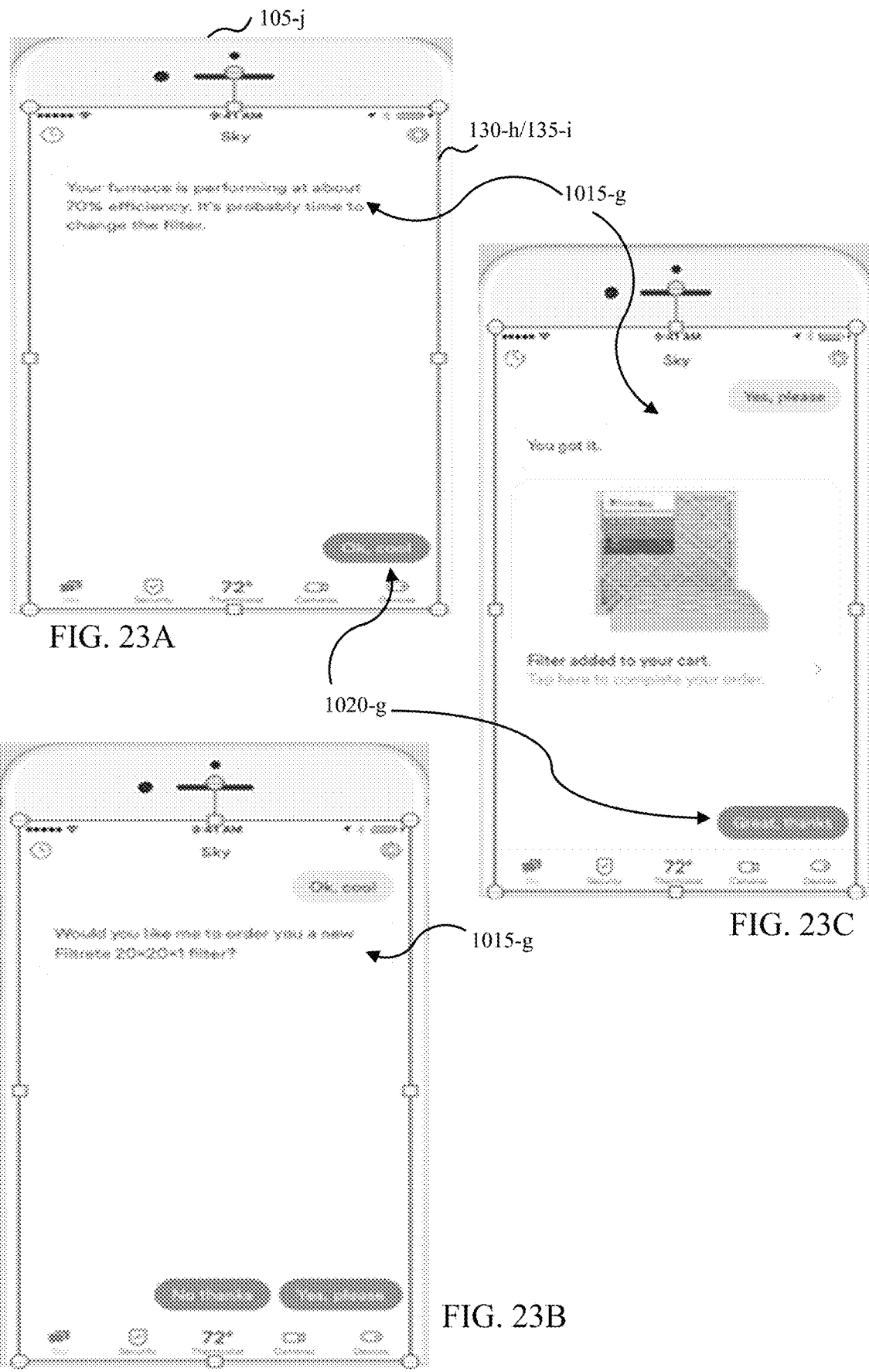

RULE-BASED GRAPHICAL CONVERSATIONAL USER INTERFACE FOR SECURITY AND AUTOMATION SYSTEM

CROSS-REFERENCE TO RELATED APPLICATIONS

This application is a continuation-in-part of U.S. patent application Ser. No. 14/607,926, filed Jan. 28, 2015, titled "PROGRESSIVE PROFILING IN AN AUTOMATION SYSTEM," which claims priority from U.S. Provisional Patent Application No. 61/933,998, filed Jan. 31, 2014, titled "PROGRESSIVE PROFILING IN AN AUTOMATION SYSTEM," and assigned to the assignee hereof, the disclosures of which are expressly incorporated herein in their entireties by this reference.

BACKGROUND

Advancements in premises automation and security systems and media-related technologies continue to increase at a rapid pace. Increasing demand for automation and security has influenced the advances made to automation and security systems. Computer systems have increasingly become an integral part of the automation and security systems. Computer systems may be used to carry out several automation and security functions. The wide-spread access to automation and security has been accelerated by the increased use of computer networks, including the Internet and cloud networking.

Many homes and businesses use one or more computer networks to control one or more aspects of the home or business, and to generate, deliver, and receive data and information between the various computers connected to computer networks. With the wide-spread use of computers and mobile devices has come an increased presence of premises automation and premises security products. In some cases, however, an automation system may perform actions that an occupant does not want automated, or may perform actions differently than how the occupant wants the actions performed. As a result, benefits may be realized by providing systems and methods for progressively profiling occupants in relation to a premises automation and security system.

In addition, security and/or automation systems utilizing computers are widely deployed to provide various types of communication and functional features such as monitoring, communication, notification, and/or others. These systems may be capable of supporting communication with a user through a communication connection or a system management action. Users of such as security and/or automation systems continue to demand increased access to information and an increase in the efficiency and convenience of these technologies. Improving the efficiency of these technologies is desirable, as many users and residents of homes feel overwhelmed by the technologies, how to use them, and how perform various tasks. Owning but not knowing how to operate a security and/or automation system to its potential may, in some instances, result in dissatisfaction or confusion. Alternatively, some users may simply be unaware that a security and/or automation system is not being utilized to its potential or may be apathetic to that fact in light of the perceived effort required to more effectively operate the system. Moreover, existing methods may not allow automation and customization of a security and home system to the degree possible according to a user's preferences. Thus there is a need for a more convenient and efficient communication platform to deliver valuable information to users, and/or allow users to seamlessly command the performance of various tasks.

SUMMARY

According to at least one embodiment, a method of communicating with a user of a security and/or automation system is described. In some examples, the method may include determining an occupancy state of a home relating to a user. In some examples, the method may also include detecting a condition of a component of the security and/or automation system associated with the home. In some examples, the method may also include displaying, based at least in part on the determined occupancy state of the user and the detected condition of the component, a message related to the security and/or automation system to the user on a graphical conversational user interface ("G-CUI"). In some examples, the message may include natural language syntax, and include a request for permission from the user to initiate a change associated with the component of the security and/or automation system. In some examples, the method may further include receiving, via the G-CUI, a response from the user including an instruction whether to grant permission to initiate the change based at least in part on the displaying. In some examples, the method may further include generating a rule associated with the component of the security and/or automation system and a future occupancy state of the home relating to the user based at least in part on the received response.

In some examples, the condition of the component may have begun at a first time, and the generated rule may further be based at least in part on an action of the user relating to the component that may have begun at a second time prior to the first time.

In some examples, the generated rule may be further based at least in part on a prior instruction of the user whether to grant or deny permission to initiate a prior change related to the change.

In some examples, the method may include providing, via the G-CUI, a plurality of user-selectable responses associated with the message. In some examples, the plurality of user-selectable responses may include natural language syntax. In some examples, the response from the user may be selected from among the plurality of user-selectable responses.

In some examples, the method may further include providing, via the G-CUI, a keyboard user interface based at least in part on the response selected from among the plurality of user-selectable responses. In some examples, the may further include enabling communication, via the G-CUI, with a live customer service agent using the keyboard user interface.

In some examples, the occupancy state may be one of: home, returning home, away, sleep, or vacation. In some examples, the occupancy state may be vacation, and the request may be associated with a short term rental of at least a portion of the home.

In some examples, the condition may be at least one of: an unlocked or locked door or window, an open or closed (e.g., garage) door or window, a thermostat/HVAC output, an active/activated or inactive/deactivated appliance/media (TV)/fan/electronic device, open or closed blinds/curtains, turned on or off lights, an unarmed or disarmed state of the security and/or automation system, a running faucet, or a combination thereof.

In some examples, the method may include displaying, via the G-CUI, the generated rule to the user. In some examples, the method may further include receiving, via the G-CUI, a command from the user to implement the generated rule.

In some examples, the occupancy state of the home may relate to another person. In some examples, the future occupancy state may further relate to the other person.

In some examples, the component may be consumable. In some examples, the detected condition may indicate a need for replenishment, and the request may relate to replenishing the consumable component. In some examples, the request may include making a purchase order associated with replenishing the consumable component. In some examples, the detecting may include determining that an efficiency rating associated with the security and/or automation system and relating to the consumable component is lower than a threshold.

In some examples, the method may include identifying the user. In some examples, the method may include analyzing a historical pattern of conditions of the component associated with occupancy states of the home relating to the identified user. In some examples, the method may also include determining a preference of the user associated with the condition of the component based at least in part on the analyzing. In some examples, the generated rule may be based at least in part on the determined preference.

In some examples, an apparatus for security and/or automation systems may also be described. The device may include a processor and memory in electronic communication with the processor. The memory may store instructions that may be executable by the processor to determine an occupancy state of a home relating to a user and detect a condition of a component of the security and/or automation system associated with the home. The instructions may also be executable by the processor to display, based at least in part on the determined occupancy state of the user and the detected condition of the component, a message related to the security and/or automation system to the user on a G-CUI. In some examples, the message may include natural language syntax, and include a request for permission from the user to initiate a change associated with the component of the security and/or automation system. The instructions may also be executable by the processor to receive, via the G-CUI, a response from the user including an instruction whether to grant permission to initiate the change based at least in part on the displaying. The instructions may also be executable by the processor to generate a rule associated with the component of the security and/or automation system and a future occupancy state of the home relating to the user based at least in part on the received response.

In some examples, the condition of the component may have begun at a first time, and the generated rule may further be based at least in part on an action of the user relating to the component that began at a second time prior to the first time. In some examples, the generated rule may further be based at least in part on a prior instruction of the user whether to grant or deny permission to initiate a prior change related to the change.

In some examples, the instructions may further be executable by the processor to provide, via the G-CUI, a plurality of user-selectable responses associated with the message, the plurality of user-selectable responses including natural language syntax. In some examples, the response from the user may be selected from among the plurality of user-selectable responses.

In some examples, the instructions may also be executable by the processor to identify the user, analyze a historical pattern of conditions of the component associated with occupancy states of the home relating to the identified user; and determine a preference of the user associated with the condition of the component based at least in part on the analyzing. In some examples, the generated rule may be based at least in part on the determined preference.

In some examples, non-transitory computer-readable medium storing computer-executable code may be described. In some examples, the code may be executable by a processor to determine an occupancy state of a home relating to a user and detect a condition of a component of the security and/or automation system associated with the home. In some examples, the code may be executable by a processor to display, based at least in part on the determined occupancy state of the user and the detected condition of the component, a message related to the security and/or automation system to the user on a G-CUI, the message including natural language syntax, and may include a request for permission from the user to initiate a change associated with the component of the security and/or automation system.

In some examples, the code may be executable by a processor to receive, via the G-CUT, a response from the user including an instruction whether to grant permission to initiate the change based at least in part on the displaying. In some examples, the code may be executable by a processor to generate a rule associated with the component of the security and/or automation system and a future occupancy state of the home relating to the user based at least in part on the received response.

In addition, according to at least one embodiment, a computer-implemented method for progressive profiling in a home automation system is described. Data related to a premises and an occupant of the premises may be analyzed and one or more observations may be made based on the analysis of the data. Upon detecting one or more conditions associated with the one or more observations made, an offer to perform one or more actions may be communicated to the occupant.

In one embodiment, one or more observations may be communicated to the occupant. At least one of the observations may be based on the occupant previously performing the one or more actions under one or more conditions. In some cases, it may be confirmed with the occupant whether to perform the one or more actions offered. In some cases, an offer to perform the one or more actions may be communicated upon predicting one or more conditions before the one or more conditions occur. Upon receiving a confirmation from the occupant in the affirmative, the one or more actions may be performed. In some cases, upon receiving a confirmation from the occupant in the affirmative, a setting may be saved in a profile of the occupant based on the one or more actions performed and the one or more conditions under which the one or more actions are performed.

In one embodiment, at least one observation is made in relation to one or more words written by the occupant and/or one or more words spoken by the occupant. Upon generating a communication intended for the occupant, the manner in which the occupant communicates may be simulated in the communication. At least one observation may be made in relation to an identity of the occupant, a profile of the occupant, what action is performed, when an action is performed, who performs the action, where the action is performed, a device used to perform the action, an outside temperature, an indoor temperature, a state of one or more electronic devices before the action is performed, and/or a state of one or more electronic devices after the action is performed.

A computing device configured to obscure content on a screen is also described. The device may include a processor and memory in electronic communication with the processor. The memory may store instructions that may be executable by the processor to analyze data related to a premises and an occupant of the premises, make one or more observations based on the analysis of the data, and upon detecting one or more conditions associated with the one or more observations made, offer to perform one or more actions.

A computer-program product to obscure content on a screen is also described. The computer-program product may include a non-transitory computer-readable medium that stores instructions. The instructions may be executable by the processor to analyze data related to a premises and an occupant of the premises, make one or more observations based on the analysis of the data, and upon detecting one or more conditions associated with the one or more observations made, offer to perform one or more actions.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 22A, 22B and 22C show block diagrams of an apparatus relating to a security and/or an automation system that may utilize a G-CUI in accordance with various aspects of this disclosure;

FIGS. 23A, 23B, and 23C show block diagrams of an apparatus relating to a security and/or an automation system that may utilize a G-CUI in accordance with various aspects of this disclosure;

Figure 1:
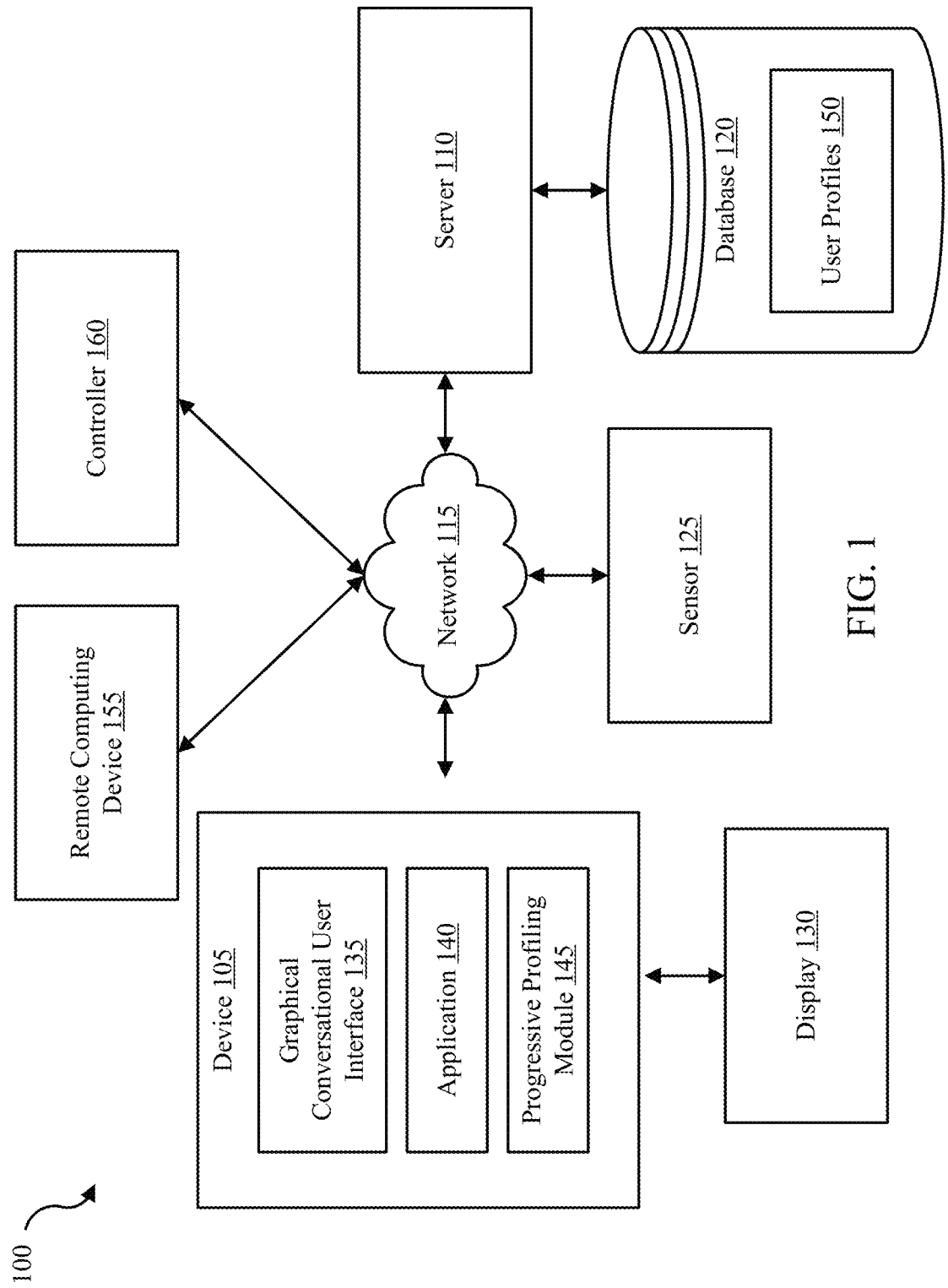
FIG. 1 is a block diagram illustrating one embodiment of an environment in which the present systems and methods may be implemented in accordance with various aspects of this disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation. More specifically, the systems and methods described herein relate to progressively profiling occupants of a premises in relation to a home automation system. Each occupant of the premises may be profiled separately and individually. Thus, a profile may be generated for each occupant of the premises based on observations the systems and methods make in relation to one or more actions taken by an occupant and the conditions under which the occupants takes the one or more actions. Based on the observations made, the systems and methods may communicate to the occupant an offer to perform the one or more actions. In some cases, the systems and methods may observe an occupant performing one or more actions that vary from the one or more actions the systems and methods already perform on behalf of the occupant. For example, every evening at dusk a system may dim the lights, turn down the thermostat, and close the blinds. The system may observe an occupant adjusting the set temperature of the thermostat.

In some cases, the system may observe that the occupant only adjusts the temperature from the set temperature on the weekends. Accordingly, the system may state that the occupant has been observed adjusting the thermostat on weekends. The system may offer to make this adjustment on behalf of the occupant on weekends. For example, the system may show the present settings for the weekend and show new settings the system may take on behalf of the occupant based on the observations the system has made. The system may show the present settings of the weekdays and ask whether to keep these settings as they are.

In some cases, the systems and methods may monitor the manner in which an occupant communicates (e.g., email, text messages, conversations, etc.). Upon learning the manner in which the occupant communicates, the systems and methods may communicate with the occupant in a similar manner, using words and phrases in a manner similar to the way the occupant uses them. For example, where an occupant may communicate using text messages, a G-CUI may be utilized, which may further assist a user of a security and home automation system communicate with, make commands to, and better utilize the security and automation system to its potential. In some examples one or more messages may be transmitted to the user by displaying the messages to the user via the G-CUI. The messages in some examples may be in natural language syntax form.

The content of the messages may vary and may relate to observations and settings as described above, and/or may address the user. In some example, the user may first be identified, for example, in relation to his/her profile. In some examples, messages may convey information associated with the security and/or automation system, such as information relating to conditions under which the occupants takes the one or more actions. In some examples, such conditions and actions may relate to a state of, or be associated with a component of the security and/or automation system. In some examples, such conditions and actions may relate to an occupancy state of a building (which in some examples, may be a home) relating to the user and/or another person. In some examples, the content of a message may include a request for permission from the user to initiate a change associated with the component of the security and/or automation system.

In some examples, a message may be accompanied with or followed by a plurality of user-selectable responses associated with the request. In some examples, the plurality of user-selectable responses may be in natural language syntax form, which may be based at least in part on, for example, analysis of how the user communicates (as described above). In some examples, the responses may be close ended and selected by a user with a simple touch or click on a display of a device. In some examples, a response may be open ended and inputted by a user using freeform text. In some examples, a response may authorize performance of various tasks related to the security and home automation system. In some examples, the response from the user may include an instruction whether to grant permission to initiate a change associated with the security and/or automation system (for example, to a component thereof).

Some examples may involve, prior to requesting whether to initiate change (e.g., to a setting of the security and/or automation system and/or a component thereof), analyzing the user's response(s), to determine whether or not to request permission from the user to initiate a change associated with the security and/or automation system (for example, to a component thereof). In other examples, a change may be initiated based at least in part on the user's responses or other feedback without first expressly requesting permission from the user to do so. For example, a change may be initiated based at least in part on past input historically provided by the user (in response to, for example, a previous system-generated message). Alternatively or in addition, in some examples, either as a default setting or set by the user as a preference (e.g., a "do then tell" setting), the user be informed after completion of a particular task and/or action with regard to a particular home state and/or component of the system. Thus, in some examples such a message informing of completion may occur without the user's permission first being requested. Alternatively or in addition, in some examples, either as a default setting or set by the user as a preference (e.g., a "just do" setting), a task may be completed based at least in part on, for example, a particular home state and/or component of the system, without informing the user.

In some examples, the response from the user may trigger a follow up message. In some aspects, presentation and/or display of a follow up message may be delayed until prompted by the user's selection of responses. Thus to some degree the "give and take" of a normal conversation may be replicated, and a user may not be overloaded with information prior to the user's indication of receptiveness to the additional information. Moreover, similar aspects relating to the flow of a normal conversation may be utilized regardless of whether triggered by a user response or if initiated via the G-CUI in the first instance. In some examples, one or more user-selected response(s) (e.g., a selected response of a plurality of user-selectable responses) may be logged or stored. In some examples, the user may access the logged or stored responses and/or other messages (by, e.g., "scrolling up" within the G-CUI). In some examples, the stored responses and conversational history accessible to the user may by presented in a different format than the original conversation, which may be more conducive to quick review. For instance, a full state change flow in the chat history may be collapsed or condensed to a summary snippet in order to render the chat history more easily readable.

In some examples, based at least in part on the user's response(s) (whether presently communicated or previously logged), or on other input or observations, a rule related to settings of the security and automation system may be generated. In some examples, the generated rule or change to settings may be associated with a component of the security and/or automation system and/or an occupancy state of the home relating to the user. In some examples the generated rule or change to settings may be proposed to the user via the G-CUI. In other examples, the generated rule or change to settings may be implemented without first obtaining express user approval. In some examples, the generated rule may be proposed to the user for implementation. In some examples, the generated rule may be implemented without first receiving user permission and/or feedback. For instance, in some examples the system may inform the user that an action has already been taken and/or initiated, or initiate and/or take the action without first informing the user, which may depend on the user's settings.

FIG. 1 is a block diagram illustrating one embodiment of an environment 100 in which the present systems and methods may be implemented in accordance with various aspects of this disclosure. In some embodiments, the systems and methods described herein may be performed on a device (e.g., device 105). The environment 100 may include a device 105, server 110, a sensor 125, a remote (e.g., mobile) computing device 155, a controller (which may be examples of a premises automation controller and/or control panel) 160, and a network 115 that allows the device 105, the server 110, the remote computing device 155, and sensor 125 to communicate (e.g., via wired or wireless communication links). In alternate embodiments, the network 115 may be integrated with any one of the device 105, 120, server 110, or remote computing device 155, such that separate components are not required. In some examples, device 105 and remote computing device 155 may be custom computing entities configured to interact with sensor 125 via network 115, and in some embodiments, via server 110. Device 105 and remote computing device 155 may be stationary and/or mobile. In some examples, remote computing device 155 may be remote from a building premises and/or remote from a particular user who has the device 105.

Examples of the device 105 and remote computing device 155 may include mobile devices, smart phones, personal computing devices (e.g., a desktop computer, a laptop computer, a netbook, a tablet personal computer (PC), an iPod®, an iPad®, a personal digital assistant (PDA)), computers, servers, premises automation controllers (e.g., control panels), premises security controllers, media content set top boxes, satellite set top boxes, cable set top boxes, DVRs, personal video recorders (PVRs), a control panel, an indicator panel, a multi-site dashboard, a BLUETOOTH® device, a Wi-Fi device, a mobile station, a subscriber station, a mobile unit, a subscriber unit, a wireless unit, a remote unit, a wireless device, a wireless communications device and the like, and/or any other suitable device operable to send and receive signals, store and retrieve data, and/or execute functions and operations described and/or contemplated herein.

In some configurations, the device 105 may include a user interface, which in some examples may be a G-CUI 135, application 140, and progressive profiling module 145. Although the components of the device 105 are depicted as being internal to the device 105 it is understood that one or more of the components may be external to the device 105. For example, although the G-CUI 135 is shown as part of the device 105, a variety of devices may additionally or alternatively include the G-CUI 135. Further, in some examples the device 105 (or the remote computing device 155 and/or the controller 160) may include the display 130, and some or all aspects of the display 130 in some examples may be included in the G-CUI 135 (or vice versa). For example, the remote computing device 155, and/or the controller 160 (which in some examples may be a premises automation controller) may include and/or incorporate a G-CUI. In addition, one or more components may connect to device 105 through wired and/or wireless connections. In some embodiments, application 140 may be located on remote computing device 155 in order to allow a user to interface with a function of device 105 and/or progressive profiling module 145.

In some embodiments, device 105 may communicate with server 110 via network 115. In some embodiments, where device 105 is the controller 160 of a security and/or automation system, and for example sensor 125 may communicate with controller 160 directly (not via server 110), at least some aspects of operations may not require communication with server 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the internet. In some embodiments, a user may access the functions of device 105 from remote computing device 155. For example, it is noted that in some embodiments, the device 105 may not include a progressive profiling module 145. In some examples, the application 140 may allow the device 105 to interface with the controller 160 via the progressive profiling module 145 located on server 110.

In some embodiments, the device 105, the remote computing device 155, the controller 160, and/or the server 110 may include a progressive profiling module 145 where at least a portion of the functions of the progressive profiling module 145 are performed separately and/or concurrently on the device 105, remote computing device 155, controller 160, and/or the server 110. In some embodiments, a user may access the functions of device 105 and/or controller 160 (e.g., directly or through device 105 via progressive profiling module 145) from remote computing device 155. For example, in some embodiments, remote computing device 155 may include a mobile application that interfaces with one or more functions of device 105, controller 160, progressive profiling module 145, and/or server 110.

The device 105 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the device 105 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensors 125.

The processor of the device 105 may be operable to control operation of the output of the device 105. The output may be a television, a liquid crystal display (LCD) monitor, a cathode ray tube (CRT) monitor, speaker, tactile output device, and/or the like. In some embodiments, the output may be an integral component of the device 105, for example, the output may be directly coupled with the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the device 105 to the output.

The remote computing device 155 may be a computing entity operable to enable a remote user to monitor the output of the sensors 125. The remote computing device 155 may be functionally and/or structurally similar to the device 105 and may be operable to receive data streams from and/or send signals to at least one of the sensors 125 via the network 115. The network 115 may be the Internet, an intranet, a personal area network, LAN, WAN, a virtual network, a telecommunications network implemented as a wired network and/or wireless network, etc. The remote computing device 155 may receive and/or send signals over the network 115 via communication links and server 110.

In some embodiments, the server 110 may be coupled to database 120. For example, device 105 may access user profiles 150 in database 120 over the network 115 via server 110. Database 120 may be internal or external to the server 110. In one example, the device 105 may be coupled to database 120 via network 115. The server 110 may be configured to communicate with the sensors 125, the device 105, the remote computing device 155 and controller 160. The server 110 may perform additional processing on signals received from the sensors 125 or device 105, or may simply forward the received information to the remote computing device 155 and controller 160.

Server 110 may be a computing device operable to receive data streams (e.g., from sensors 125 and/or device 105 or remote computing device 155), store and/or process data, and/or transmit data and/or data summaries (e.g., to remote computing device 155). For example, server 110 may receive a stream of building data from a sensor 125, and a stream of user data from the same or a different sensor 125. In some embodiments, server 110 may "pull" the data streams, e.g., by querying the sensors 125, the device 105, and/or the controller 160. In some embodiments, the data streams may be "pushed" from the sensors 125 and/or the device 105 to the server 110. For example, the sensors 125 and/or the device 105 may be configured to transmit data as it is generated by or entered into that device. In some instances, the sensors 125 and/or the device 105 may periodically transmit data (e.g., as a block of data or as one or more data points).

The server 110 may include a database (e.g., in memory) containing building data received from the sensors 125 and/or the device 105, such as for example a log relating to occupancy of a home related to a user (and/or other entity), conditions of components, etc. Additionally, as described in further detail herein, software (e.g., stored in memory) may be executed on a processor of the server 110. Such software (executed on the processor) may be operable to cause the server 110 to monitor, process, summarize, present, and/or send a signal associated with resource usage data.

Progressive profiling module 145 may allow a user to control (either directly or via controller 160) an aspect of the home of the user, including security, locking or unlocking a door, checking the status of a door, locating a person or item, controlling lighting, adjusting window coverings (blinds, curtains, shutters, etc.), adjusting thermostat devices, controlling cameras, and the like. In some configurations, application 140 may enable device 105 to interface with controller 160 via progressive profiling module 145 to provide home automation functions to device 105 and/or remote computing device 155. Thus, application 140, via the progressive profiling module 145, may allow users to control aspects of their home. Further details regarding the progressive profiling module 145 are discussed below.

In some embodiments, the one or more sensors 125 may be sensors configured to conduct periodic or ongoing automatic measurements related to a building. Each sensor 125 may be capable of sensing multiple building parameters, or alternatively, separate sensors 125 may monitor separate building parameters. For example, one sensor 125 may measure energy efficiency, while another sensor 125 (or, in some embodiments, the same sensor 125) may detect occupancy of a home (e.g., via motion, etc.). In alternate embodiments, a user may input building data directly at the device 105 or at remote computing device 155. For example, a user may enter occupancy data into a dedicated application on his/her smart phone indicating that he/she has left a building and/or confirming that there are no users left in the building.

Sensors 125 may be stationary and/or mobile. A sensor 125 may include and/or be one or more sensor units that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. Examples of the sensor 125 include a camera, three-dimensional (3-D) sensor, motion sensor, smoke sensor, glass break sensor, door sensor, window sensor, carbon monoxide sensor, and the like. Sensor 125 may also be integrated with a facial recognition system. Although sensor 125 is depicted as connecting to device 105 over network 115, in some embodiments, sensor 125 may connect directly to device 105.

A device 105 and/or a sensor 125 may be able to communicate through one or more wired and/or wireless connections with various components such as control panels, base stations, and/or network equipment (e.g., servers, wireless communication points, etc.) and/or the like. Data gathered by the one or more sensors 125 may be communicated to device 105, which may be, in some embodiments, control panel, a thermostat or other wall-mounted input/output smart home display. In other embodiments, device 105 may be a personal computer or smart phone. In some embodiments, a device 105 that may be personal computer or smart phone may include a G-CUI, and in some embodiment a device 105 that is a wall-mounted smart home display may include a G-CUI (but not necessarily a different type of device 105). Any of device 105, remote computing device 155, and/or controller 160, may have dedicated applications directed to collecting sensor data and calculating building statistics therefrom. For example, the device 105 may process the data received from the one or more sensors 125 to obtain energy efficiency reports. In alternate embodiments, remote computing device 155 may process the data received from the one or more sensors 125, via network 115 and server 110, to obtain, for example, energy efficiency reports. In alternate embodiments, controller 160 may process the data received from the one or more sensors 125 to obtain, for example, energy efficiency reports). Data transmission may occur via, for example, frequencies appropriate for a personal area network (such as BLUETOOTH® or IR communications) or local or wide area network frequencies such as radio frequencies specified by the IEEE 802.15.4 standard.

Examples of controller 160 may include a dedicated home automation computing device (e.g., wall-mounted controller), a personal computing device (e.g., laptop, desktop, etc.), local computing device, a mobile computing device (e.g., tablet computing device, smartphone, etc.), and the like. In some examples, the controller 160 may be or include a control panel, such as for example a smart home system panel. Some examples of a wall-mounted controller 160 may include an interactive panel mounted on a wall in a user's home, or wall of a discrete structure of some other type (e.g., a business—and each of the one more discrete structures may be related to one or more discrete areas). In other examples, multiple controllers 160 may be related to the same one or more discrete structures (e.g., multiple control panels relating to a home and/or a business complex).

Controller 160 may be in direct communication with the one or more sensors 125, or may receive sensor data from the one or more sensors 125 via any combination of device 105 and remote computing devices 155 and network 115 and server 110. In some embodiments, the network 115 may provide user authentication, encryption, access authorization, tracking, Internet Protocol (IP) connectivity, and other access, calculation, modification, and/or functions. The controllers 160 may interface with the network 115 through wired and/or wireless communication links (not shown) to communicate for example with one or more servers 110 (which may be remote in some examples). Among other operations, the controller 160 may perform communication configuration, adjustment, and/or scheduling for communication with the devices 105 and/or other devices, or may operate under the control of another controller. In various examples, the controller 160 may communicate—either directly or indirectly (e.g., through network 115)—with the controller 160 over a set of wired and/or wireless communication links (not shown). The controller 160 may also communicate with a back end server (such as and/or similar to server 110)—directly and/or indirectly—using for example the one or more communication links.

Figure 2:
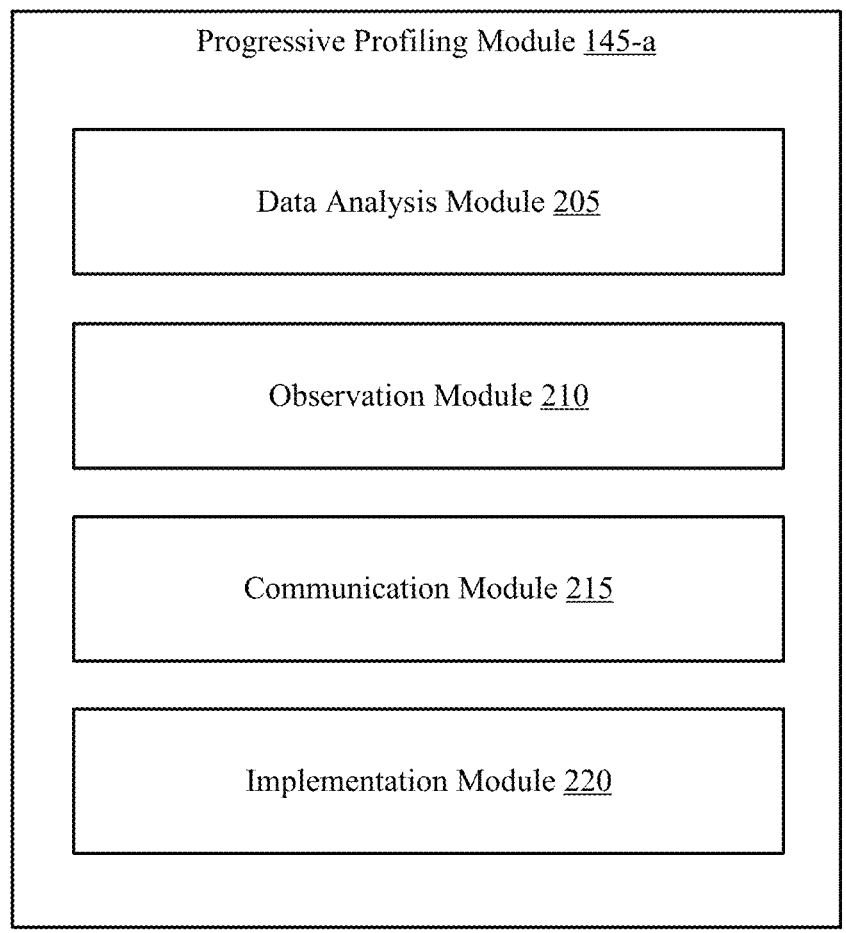
FIG. 2 is a block diagram illustrating one example of a progressive profiling module in accordance with various aspects of this disclosure.

FIG. 2 is a block diagram illustrating one example of a progressive profiling module 145-a in accordance with various aspects of this disclosure. The progressive profiling module 145-a may be one example of the progressive profiling module 145 depicted in FIG. 1. As depicted, the progressive profiling module 145-a may include a data analysis module 205, an observation module 210, a communication module 215, and an implementation module 220.

In one embodiment, data analysis module 205 may analyze data related to a premises and an occupant of the premises. Thus, data analysis module 205 may monitor the status of one or more areas of a premises, monitor the actions taken by an occupant of the premises, monitor the settings of an automation and/or security system, and the like. In some cases, data analysis module 205 may gather data from one or more sources, including sensors (e.g., motion sensor, light sensor, temperature sensor, camera, etc.), lights, light switches, remote actuated locking mechanisms, media delivery systems, and/or any device from which an input from one or more occupants of the premises may be received. In one embodiment, at least one observation may be made in relation to an identity of the occupant (e.g., facial recognition, device ID identification such as a key fob identifier, etc.), a profile of the occupant, what action is performed, when an action is performed, who performs the action, where the action is performed, a device used to perform the action, an outside temperature, an indoor temperature, a state of one or more electronic devices before the action is performed, and a state of one or more electronic devices after the action is performed. In one example, data analysis module 205 may detect that at a particular time of day, at a particular temperature indoors and/or outdoors, an occupant may adjust a thermostat, adjust a set of window coverings (e.g., blinds, curtains, shutters, etc.), adjust lighting, and so forth. In one embodiment, observation module 210 may make one or more observations based on the analysis of the data gathered. Upon detecting one or more present conditions associated with the one or more observations made, communication module 215 may offer to perform one or more actions on behalf of the occupant.

In some embodiments, communication module 215 may communicate to the occupant one or more observations. At least one of the observations may be based on the occupant previously performing one or more actions under one or more conditions. For example, communication module 215 may communicate to the occupant that it has been observed that the occupant adjusts the lights and temperature under certain circumstances. In some cases, communication module 215 may communicate to the occupant the conditions and/or circumstances in which the occupant has been observed to take the one or more actions. In one embodiment, communication module 215 may communicate to the occupant that presently the one or more conditions exist. Upon notifying the occupant that the one or more conditions exist, the system may offer to perform one or more actions on behalf of the occupant. In some embodiments, one or more observations may be made relative to one or more existing settings. For example, one or more automated settings may exist with regards to lighting in the premises.

The system may observe that under certain conditions, the occupant performs one or more actions that vary from the automated settings. Accordingly, the system may communicate to the occupant that one or more actions of the occupant that vary from the automated settings, and query whether the occupant would like the observed actions to be automated. The communication module 215 may communicate to the occupant the current settings, adjustments to the settings, how the adjustments affect the current settings, and query whether the occupant would like the adjustments to be implemented. In some cases, the data analysis module 205 may predict one or more conditions. Thus, the communication module 215 may offer to perform the one or more actions upon predicting one or more conditions before the one or more conditions occur. In one embodiment, communication module 215 may confirm with the occupant whether to perform the one or more actions offered. For example, communication module 215 may communicate an observation in relation to one or more actions taken by the occupant under one or more conditions, notify the occupant that the one or more conditions exist, offer to perform the one or more actions, and confirm whether the occupant would like the system to perform those actions on his or her behalf.

Upon receiving a confirmation from the occupant in the affirmative, implementation module 220 may perform the one or more actions.

In some embodiments, upon receiving a confirmation from the occupant in the affirmative, implementation module 220 may save a setting in a profile of the occupant based on the one or more actions performed and the one or more conditions under which the one or more actions are performed. For example, implementation module 220 may save data related to the profiling of an occupant in a database of user profiles such as user profiles 150 stored in database 120. In some cases, at least one observation may be made in relation to one or more words written by the occupant. For example, data analysis module 205 may analyze email, text messages, and other written communication of an occupant to determine the writing style of the occupant. In some cases, at least one observation may be made in relation to one or more words spoken by the occupant. Thus, data analysis module 205 may analyze a conversation, a spoken query, and other spoken communication made by the occupant to determine a speech style of the occupant. Accordingly, in relation to the monitored communications of an occupant of the premises, communication module 215 may learn language characteristics of an occupant including slang, syntax, semantics, pragmatics, linguistics, connotation, pronunciation, exposition, exegetics, denotations, semiotics, verb usage, noun usage, subject-verb-object (SVO) usage, etc. In some cases, communication module 215 may save learned language characteristics in a profile associated with the occupant. Accordingly, communication module 215 may communicate with the occupant using the learned language characteristics of the occupant in order to communicate with the occupant using the same words the occupant uses, and using the words in the same way that the occupant uses the words to write and speak. Thus, upon generating a communication intended for the occupant, communication module 215 may simulate, in the generated communication, the manner in which the occupant communicates.

Figure 3:
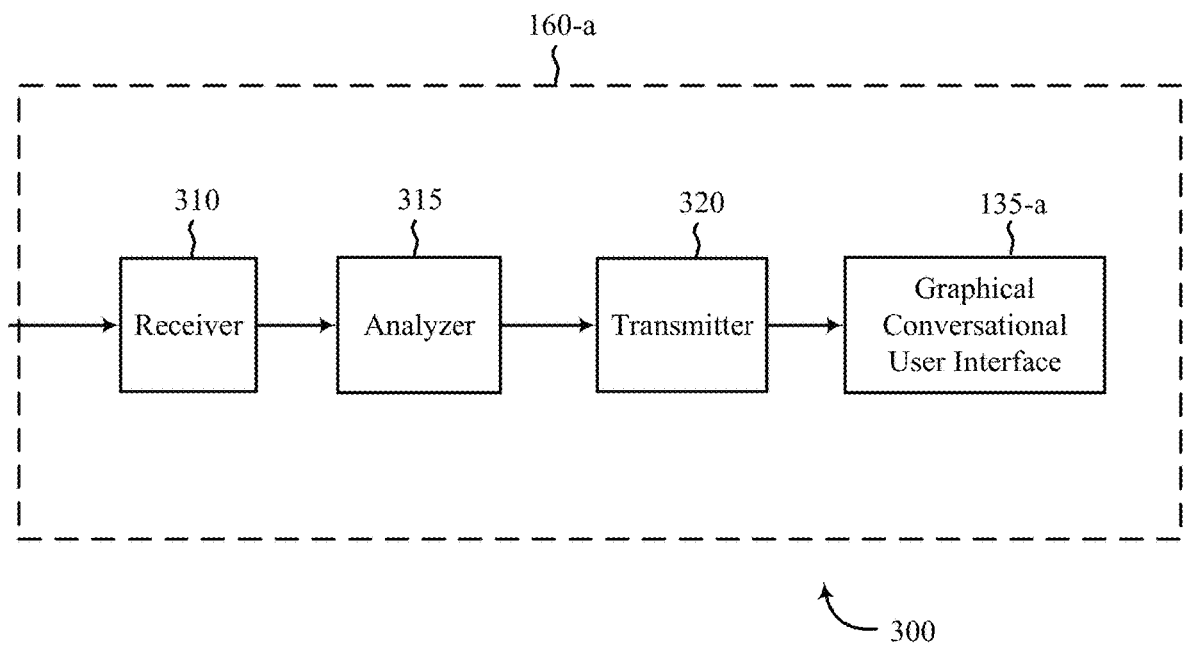
FIG. 3 is a block diagram of a device utilizing a G-CUI for security and/or automation systems in accordance with various aspects of this disclosure.

FIG. 3 shows a block diagram 300 of a device utilizing a G-CUI for security and/or automation systems in accordance with various aspects of this disclosure. The device may be a controller 160-a, which may be an example of one or more aspects of the controller 160 described with reference to FIG. 1. The controller 160-a may include a receiver 310, an analyzer 315 (which may be an example of one or more aspects of the data analysis module 205 of FIG. 2), a transmitter 320 and/or a G-CUI 135-a (which may be an example of one or more aspects of the G-CUI 135 of FIG. 1). The controller 160-a may also be or include a processor. Each of these modules may be in communication with each other—directly and/or indirectly.

The components of the controller 160-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each feature may also be implemented—in whole or in part—with instructions embodied in memory formatted to be executed by one or more general and/or application-specific processors.

The receiver 310 may receive information such as packets, user data, and/or control information associated with various information channels (e.g., control channels, data channels, etc.). The receiver 310 may be configured to receive building data from sensors, and/or data (e.g., stored data) from other sources. Information may be passed on to the analyzer 315, and to other components of the controller 160-a. At the analyzer 315, the information received from the receiver 310 may be processed, and determinations may be made, based on the processing/analyzing, whether to cause to be displayed some message related to the received data on a G-CUI 135-a. In some examples, the analyzer 315 may be part of the controller 160-a, and/or the analyzer 315 may not be part of the controller (e.g., additionally or alternatively part of device 105 and/or remote computing device 155, etc.).

If the determination is made to cause some message to be displayed to the user using a G-CUI 135-a, the transmitter 320 may transmit the one or more signals received from other components of the controller 160-a. The transmitter 320 may transmit signals relating to the message to be displayed to the G-CUI 135-a. In some examples, the transmitter 320 may be collocated with the receiver 310 in a transceiver.

In some examples, the G-CUI 135-a may be part of the controller 160-a. In some examples, the transmitter 320 may not necessary transmit signals outside the controller 160-a in order for the message to be displayed on the G-CUI (and in some examples the transmitter 320 may not necessarily be used at all to perform such operations). In some examples, the G-CUI 135-a may not be part of the controller 160-a—e.g., the G-CUI 135-a may be part of device 105 and/or remote computing device 155. In some examples, the G-CUI 135-a (or some other G-CUI not shown) may also precede the receiver 310 (e.g., certain commands and/or other input may be provided based at least in part on a G-CUI).

Figure 4:
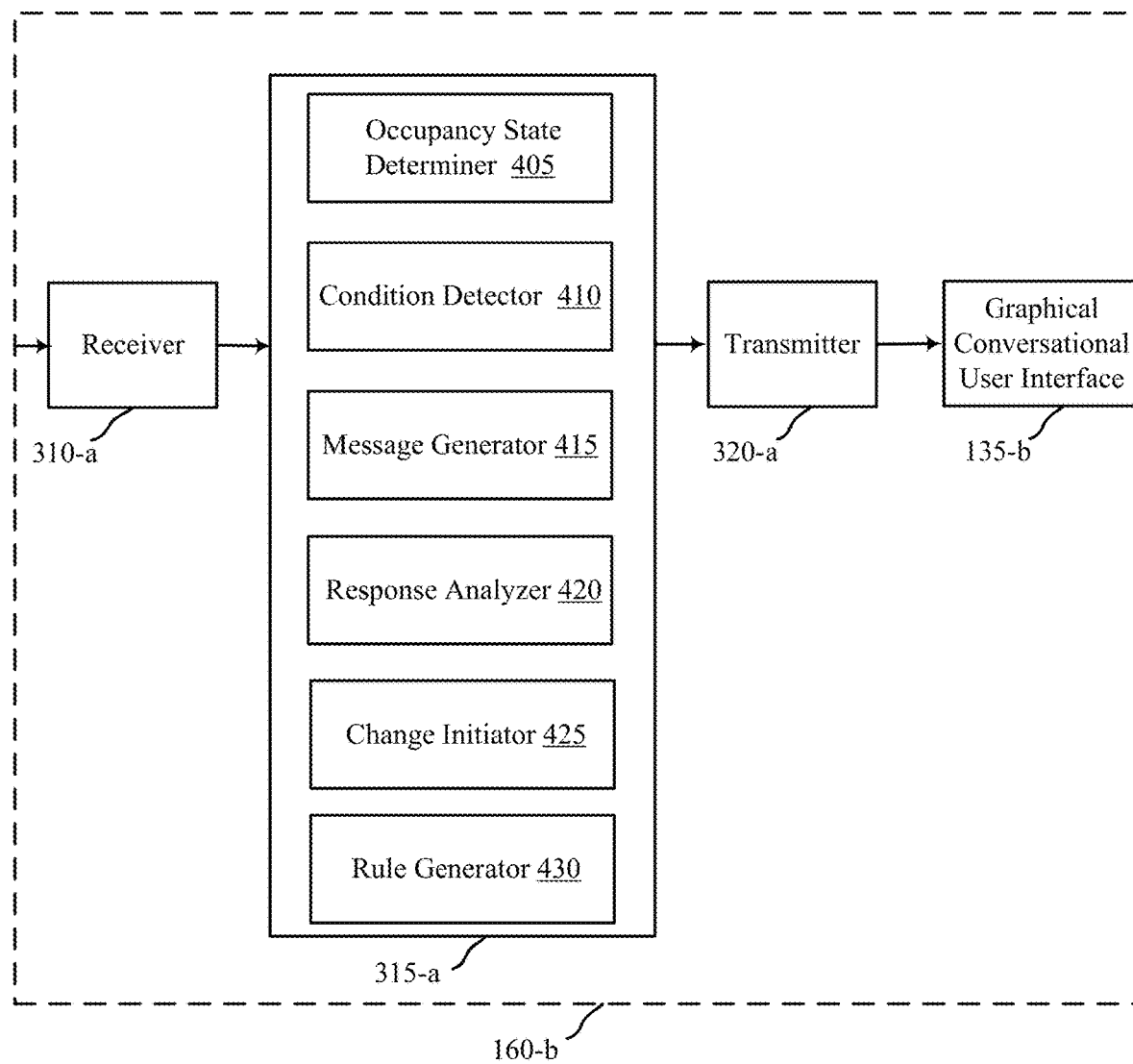
FIG. 4 is a block diagram of a device utilizing a G-CUI for security and/or automation systems in accordance with various aspects of this disclosure.

FIG. 4 shows a device utilizing a G-CUI for security and/or automation systems in accordance with various aspects of this disclosure. The controller 160-b may be an example of one or more aspects of a controller 160 described with reference to FIG. 1. It may also be an example of a controller 160-a described with reference to FIG. 3. The controller 160-b may include a receiver 310-a, an analyzer 315-a, potentially a transmitter 320-a, and potentially a G-CUI 135-b (the G-CUI 135-b may or may not be part of the controller 160-b), which may be examples of the corresponding features of controller 160-a. The controller 160-b may also include a processor. Each of these components may be in communication with each other. For example, the analyzer 315-a may utilize, incorporate, or include a processor. The analyzer 315-a may include an occupancy state determiner 405 (which may be an example of one or more aspects of the observation module 210 of FIG. 2), a condition detector 410 (which also may be an example of one or more aspects of the observation module 210 of FIG. 2), a message generator 415 (which may be an example of one or more aspects of the communication module 215 of FIG. 2), a response analyzer 420 (which also may be an example of one or more aspects of the communication module 215 of FIG. 2), a change initiator 425 (which may be an example of one or more aspects of the implementation module 220 of FIG. 2) and/or a rule generator 430 (which also may be an example of one or more aspects of the implementation module 220 of FIG. 2). The receiver 310-a and the transmitter 320-a may perform the functions of the receiver 310 and the transmitter 320, of FIG. 3, respectively.

The components of the premises automation controller 160-b may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each feature may also be implemented—in whole or in part—with instructions embodied in memory formatted to be executed by one or more general and/or application-specific processors.

The occupancy state determiner 405 may assist in determining the occupancy state of a building. A home occupancy state may be associated with one or more users of the security and/or automation system, and/or potentially one or more persons who are not users, being in the building and/or the building premises. For example, the occupancy state determiner 405 may determine whether one or more persons (e.g., one or more users of the security and/or automation system) or other entities are inside the building, leave/have left the building, enter/have entered the building, etc.

The occupancy state determiner 405 may also determine whether certain predetermined occupancy states of the building exist, such as, for example, "home," "returning home," "away," "sleep," "wake," or "vacation." For example, a "home" occupancy state may indicate that one or more users are in a building being monitored by a security and/or automation system. A "returning home" occupancy state, for example, may be associated with one or more users (or potentially one or more persons who are not users) being in route to the building. An "away" occupancy state may, for example, be associated with a user and/or all users (and/or potentially persons who are not users) not being in the building and/or within the building premises. A "sleep" occupancy state may, for example, be associated with one or more users (or potentially one or more persons who are not users) being retired for the night. A "wake" occupancy state may be associated with, for example, one or more users waking up from a night's rest but staying within the home. A "vacation" occupancy state may, for example, be associated with a user and/or all users (and/or potentially persons who are not users). In some examples, it is possible that the occupancy state may be determined incorrectly, and in such instances the user may be presented with the option of correcting (e.g., the G-CUI avatar) and for instance inputting the correct occupancy state.

The condition detector 410 may assist in detecting one or more conditions associated with the security and/or automation system. For example, some conditions may be associated with one or more components of the security and/or automation system. A condition relating to a component may be, for example: an unlocked or locked door or window, open or closed blinds of curtains, an open or closed (e.g., garage) door or window, a thermostat/HVAC output, an active/activated or inactive/deactivated appliance or electronic media (e.g., TV, stereo) or other device (e.g., fan), lights turned on or off, an unarmed away or unarmed stay or disarmed state of the security and/or automation system, a running faucet, etc.

The message generator 415 may determine whether or not to generate a message for display on the G-CUI for a user. In some examples, such a determination may involve analyzing occupancy states and conditions (e.g., condition of a component), and additionally or alternatively historic patterns of a user. Once a determination is made to generate a message, the message generator 415 may also be associated with determining the content of the message. In some examples, the content of the message may include addressing the user by name, notifying the user of a condition and/or an occupancy state or of a correlation between a condition and an occupancy state, reminding the user regarding a calendar event or other reminder, requesting permission to initiate or informing regarding a change to the security and/or automation system or to a component thereof, providing a follow up response to a previous message (that for example may clarify a preference of the user relating to the security and/or automation system). In some examples, the message generator may generate a plurality of user-selectable responses associated with the message.

In some examples the content of the message may be in the form of natural language syntax. The natural language syntax may be generated in several different ways. For instance, in some examples the natural language syntax may be generated using hardcoding (e.g., default messages). Other examples may involve automatic natural language generation, which may in some examples may occur on the backend. (Thus, not all operations related to the message generator must necessarily be limited to occurring in the controller 160-b.) In some examples of natural language generation, the content of a message may be determined or originally-generated based at least in part on satisfying certain conditions/input (e.g., input provided by the user). In some aspects, the message generator 415 may utilize artificial intelligence technologies. In some examples, aspects of both hardcoding and natural language generation may be utilized by the message generator 415.

The response analyzer 420 may analyze responses provided by a user. In some examples, the response analyzer 420 may operate hand-in-hand with the message generator 415. For instance, the response analyzer 420 may analyze a user's response to a prior message and the message generator 415 may generate an additional message based on the analyzed response provided by the user. In some examples, a user's response may be selected from among a plurality of user-selectable responses. In other examples, a user's response may be a free-form natural language-type response.

The change initiator 425 may initiate a change to the security and/or automation system and/or to a component thereof. In some examples, an initiated change may be based on a determined occupancy state. In some examples, the initiated change may be to an armed/disarmed state of the security and/or automation system, and the change may involve changing the state of the security and/or automation system to armed based at least in part on the occupancy status being "away." In some examples, an armed state may allow an alarm to be triggered by reception of a signal from a sensor (e.g., motion sensor, door sensor, window sensor, etc.) by for example controller 160-b. In some examples, a disarmed state may not entail triggering an alarm when receiving the same signal from the sensor.

In some examples, the initiated change may include locking a door, turning off lights, shutting a window, closing a garage door, lowering a temperature, etc., based at least in part on, for example, the occupancy status also being "away." In other examples, the initiated change may include turning on some lights, turning on a humidifier, lowering or heating a temperature, preheating an oven, based at least in part on, or based on, or triggered by, for example a "returning home" occupancy status. The examples of initiated changes (and other examples herein) are of course not exclusive lists and other examples are also contemplated.

The rule generator 430 may generate a rule associated with security and/or automation systems. The generated rule may be based at least in part on preferences of one or more users or other persons, whether determined in conjunction with the response analyzer 420, via input otherwise implicitly or expressly provided by a user or other person, or by other means. For example, a generated rule may be based at least in part on historic patterns of one or more users. More specifically, in some examples a user may have a habit of leaving a light on, a door unlocked, the temperature set at an inefficient and/or uncomfortable temperature, etc. In some instances the aforementioned conditions may be detected by the condition detector 410, and the message generator 415 may generate a message to query a user regarding whether the change initiator 425 should initiate a change to potentially remedy any of the aforementioned conditions, and based at least in part on the response analyzed by the response analyzer 420, the change may be initiated. Moreover, this process may be repeated.

In some examples, the rule generator 430 may generate a rule that the change may be initiated when the condition is detected without first querying the user. In some examples, the generated rule may be proposed to the user before it is implemented. In some examples the rule may simply be implemented when the message generator 415 provides a notification to the user that the generated rule has been implemented (but, e.g., without express prior authorization). In some examples, the rule may be implemented without notification. In some examples, lists of rules associated with a particular user may be stored and accessed by the particular user, and/or with a user having administrative permissions, and may be overridden by a user. As with the controller 160-a illustrated in FIG. 3, in some examples, the G-CUI 135-b (or some other G-CUI not shown) may also precede the receiver 310-a (e.g., certain commands and/or other input may be provided based at least in part on a G-CUI).

Figure 5:
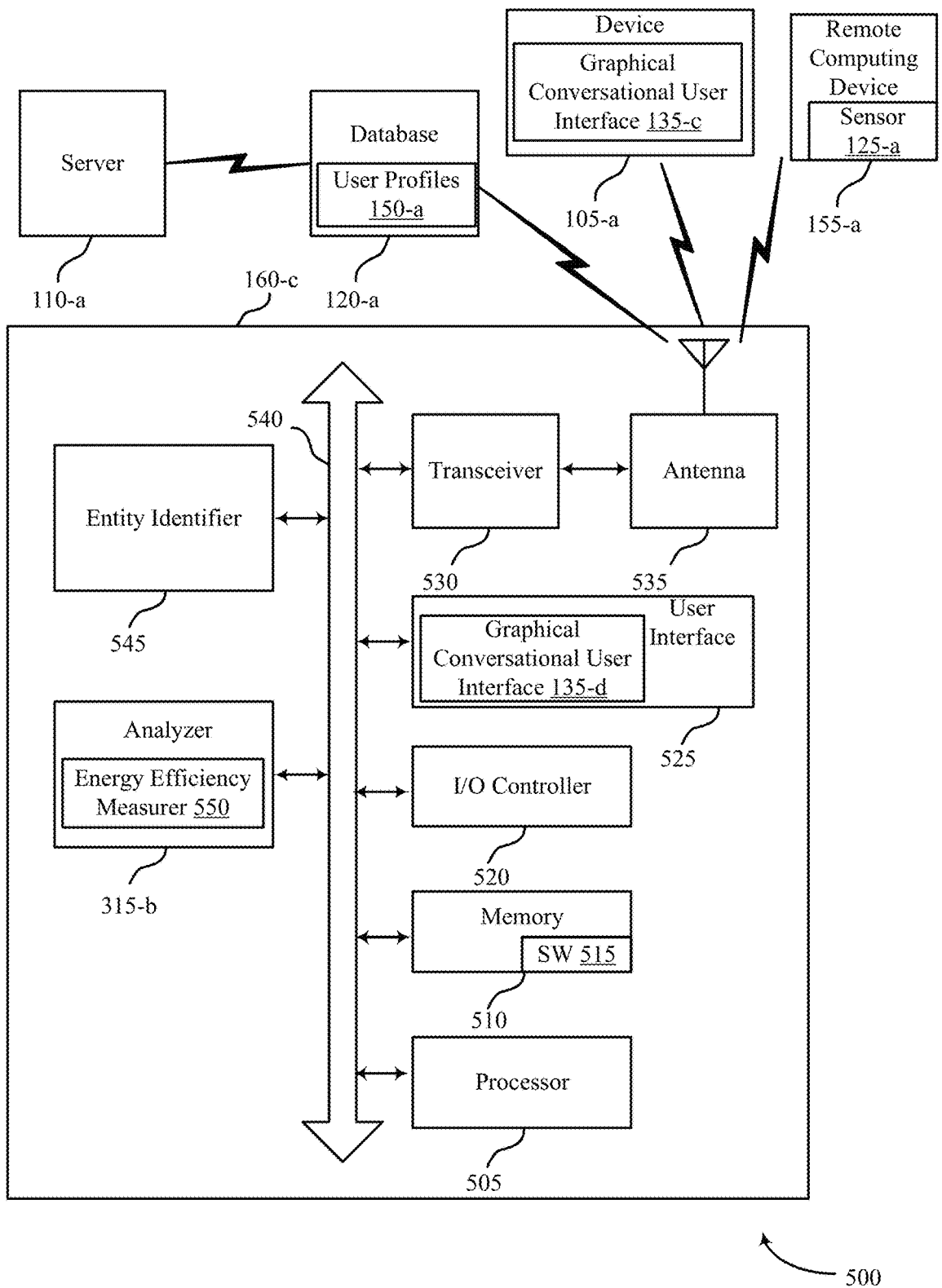
FIG. 5 show shows a security and/or automation systems utilizing a G-CUI in accordance with various aspects of this disclosure.

FIG. 5 shows a system 500 utilizing a G-CUI, in accordance with various examples. System 500 may include a controller 160-c, which may be an example of the controller 160 of FIG. 1. Controller 160-c may also be an example of one or more aspects of controllers 160-a and 160-b of FIGS. 3 and 4. In some embodiments, the terms controller, premises automation controller, a control panel, and a control device are used synonymously.

Controller 160-c may include components for bi-directional voice and data communications including components for transmitting communications and components for receiving communications. For example, controller 160-c may communicate bi-directionally with one or more of device 105-a (may be an example of one or more aspects of device 105 described with reference to FIG. 1), remote computing device 155-a (which may be an example of one or more aspects of remote computing device 155 described with reference to FIG. 1), one or more G-CUI 135-c (which may be an example of one or more aspects of the G-CUIs 135, 135-a, 135-b described with reference to FIGS. 1, 3, and 5, and which in some examples may be associated with and/or included within device 105-a and/or remote computing device 155-a), sensor 125-a (which may be an example of one or more aspects of the sensor 125 described with reference to FIG. 1, and which in some examples may be associated with and/or included within device 105-a and/or remote computing device 155-a), database 120-a (which may be an example of one or more aspects of the database 120 described with reference to FIG. 1, and which may in some examples include a remote storage), and/or server 110-a (which may be an example of one or more aspects of the server 110 described with reference to FIG. 1, and which in some examples may be a remote server). This bi-directional communication may be direct (e.g., controller 160-c communicating directly with database 120-a) or indirect (e.g., controller 160-c communicating indirectly with database 120-a (or remote computing device 155-a or device 105-a) through server 110-a).

In some examples, controller 160-c may include entity identifier 545, and may also include an analyzer 315-b, which may be an example of analyzer 315, 315-a described with reference to FIGS. 3 and 4. The analyzer 315-b may in some examples include an energy efficiency measurer 550, which may be based at least in part on data received from one or more sensors 125-a. For example, based at least in part on data from one sensor 125-a associated with an HVAC unit, the energy efficiency measurer 550 may determine that an HVAC unit has been operating at an energy efficiency level lower than a threshold for longer than a predetermined period of time. The energy efficiency measurer 550 (and/or the analyzer 315-b) may analyze this information and determine that remedial action should be taken (e.g., that a filter of the HVAC unit needs to be changed). Additionally and/or alternatively, the energy efficiency measurer 550 may determine and keep records of power consumption for a building, including power consumption associated with certain components of a security and/or automation system, such as lights, appliances, etc.

Certain correlations between power consumption and components of the security and/or automation system may be determined and potentially brought to a user's attention via a G-CUI 135-c. In one aspect, the energy efficiency measurer 550 (and/or the analyzer 315-b) may also in some aspects diagnose certain unacceptable or concerning levels of power consumption and request that the user troubleshoot, by for example displaying a message via the G-CUI 135-b requesting that the user check an air filter, unplug certain electrical devices from outlets, replace certain devices or components that are energy inefficient (e.g., upgrading to more energy efficient light bulbs), or perform certain tests to components intended to gauge energy efficiency and/or that a component is functioning properly.

In some examples, the energy efficiency measurer 550 may also take into account other environmental conditions, whether inside or outside a building. For example, based on data provided from one or more sensors 125-a, the energy efficiency measurer 550 (and/or the analyzer 315-b) may determine that energy consumed to maintain a cool temperature in a building increases at certain times of day. The energy efficiency measurer 550 (and/or the analyzer 315-b) may propose and/or implement remedial action such as for example, changing (e.g., increasing) the target temperature of an HVAC system during particular hot periods of a day, closing blinds or shades or curtains of windows facing direct sun at certain times of day, shutting doors of unused or less frequently used rooms, etc. In some examples energy efficiency measurer 550 (in some examples, following user permission, in other examples without user permission) may initiate "testing" of certain proposed remedial actions relating to energy efficiency. If certain proposed remedial actions are proved to successfully conserve energy, the results of the testing may be presented to the user and/or the tested remedial actions may be automatically implemented. Other examples are contemplated and "energy efficiency" is construed broadly to also include water efficiency (e.g., relating sprinkler systems, indoor faucets, etc.) to determine how to operate more efficiently (for example whether leaks are present).

The entity identifier 545 (which may be an example of one or more aspects of the progressive profiling module 145 described with reference to FIG. 1) may identify a user of a security and/or automation system, other persons, and/or pets (such as dogs and cats) based at least in part on data received one or more sensors 125-*a*. For example, the entity identifier 545 may involve comparing data received from the one or more sensors 125-*a* with identifying information contained in certain user profiles 150-*a* stored in for example the database 120-*a* (in addition, said user or entity profiles in some examples may also be stored locally to the controller 160-*c* in, e.g., memory 510 or in a local database). The entity identifier 545 may also cause the actions of users to be logged and stored, and then associated with the user profiles 150-*a* of the corresponding users. For example, the actions of the users that are stored may relate to actions a user takes with regard to certain components of the security and/or automation system. In some examples, historical patterns relating to an identified user may be determined from these records and user profiles 150-*a*. In some examples, and as described elsewhere in this disclosure, such historical patterns may be relevant in generating a rule associated with a particular user, and such generated rules may be associated with an entity profile 150-*a* of the user.

Controller 160-*c* may also include a processor 505, and memory 510 (including software/firmware code (SW) 515), an input/output controller 520, a user interface, which in some examples may include a G-CUI 135-*d*, a transceiver 530, and one or more antennas 535 each of which may communicate—directly or indirectly—with one another (e.g., via one or more buses 540). The transceiver 530 may communicate bi-directionally—via the one or more antennas 535, wired links, and/or wireless links—with one or more networks or remote devices as described above. For example, the transceiver 530 may communicate bi-directionally with one or more of device 105-*a*, remote computing device 155-*a*, database 120-*a*, and/or server 110-*a*. The transceiver 530 may include a modem to modulate the packets and provide the modulated packets to the one or more antennas 535 for transmission, and to demodulate packets received from the one or more antenna 535. While a controller 160-*c*, (e.g., control panel, control device, premises automation controller) may include a single antenna 535, it may also have multiple antennas 535 capable of concurrently transmitting or receiving multiple wired and/or wireless transmissions. In some embodiments, one element of controller 160-*c* (e.g., one or more antennas 535, transceiver 530, etc.) may provide a direct connection to a server 110-*a* via a direct network link to the Internet via a point of presence (POP). In some embodiments, one element of controller 160-*c* (e.g., one or more antennas 535, transceiver 530, etc.) may provide a connection using wireless techniques, including digital cellular telephone connection, Cellular Digital Packet Data (CDPD) connection, digital satellite data connection, and/or another connection.

The signals associated with system 500 may include wireless communication signals such as radio frequency, electromagnetics, LAN, WAN, virtual private network (VPN), wireless network (using 802.11, for example), 345 MHz, Z-WAVE®, cellular network (using 3G and/or LTE, for example), and/or other signals. The one or more antennas 535 and/or transceiver 530 may include or be related to, but are not limited to, wireless WAN (WWAN) (GSM, CDMA, and WCDMA), wireless LAN (WLAN) (including BLUETOOTH® and Wi-Fi), wireless metropolitan access network (WMAN and/or WiMAX), antennas for mobile communications, antennas for Wireless Personal Area Network (WPAN) applications (including radio frequency identification (RFID) and ultra-wide band (UWB)). In some embodiments, each antenna 535 may receive signals or information specific and/or exclusive to itself. In other embodiments, each antenna 535 may receive signals or information not specific or exclusive to itself.

In some embodiments, one or more sensors 125-*a* (e.g., motion, proximity, smoke, light, glass break, door, window, carbon monoxide, and/or another sensor) may connect to some element of system 500 via a network using one or more wired and/or wireless connections.

In some embodiments, G-CUIs 135-*c* and/or 135-*d* may include an external display device such as a display screen, and may also include (but are not required to include) an audio device, such as an external speaker system, and/or an input device (e.g., device 105-*a* or remote computing device 155-*a* interfaced with the G-CUI 135-*c* or 135-*d* directly and/or through I/O controller 520, in some examples).

One or more buses 540 may allow data communication between one or more elements of controller 160-*c* (e.g., processor 505, memory 510, I/O controller 520, G-CUI 135-*d* (or in examples without a G-CUI 135-*d*—some other user interface), etc.).

The memory 510 may include RANI, ROM, flash RAM, and/or other types. The memory 510 may store computer-readable, computer-executable software/firmware code 515 including instructions that, when executed, cause the processor 505 to perform various functions described in this disclosure (e.g., generating a message to display on a G-CUI 135-*d*, initiating a change to the security and/or automation system and/or a component thereof, generating a rule, etc.). Alternatively, the software/firmware code 515 may not be directly executable by the processor 505 but may cause a computer (e.g., when compiled and executed) to perform functions described herein. Alternatively, the computer-readable, computer-executable software/firmware code 515 may not be directly executable by the processor 505 but may be configured to cause a computer (e.g., when compiled and executed) to perform functions described herein. The processor 505 may include an intelligent hardware device, e.g., a central processing unit (CPU), a microcontroller, an ASIC, etc.

In some embodiments, the memory 510 can contain, among other things, the Basic Input-Output system (BIOS) which may control basic hardware and/or software operation such as the interaction with peripheral components or devices. For example, the entity identifier 545 to implement the present systems and methods may be stored within the system memory 510. Applications resident with system 500 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver 530, one or more antennas 535, etc.).

Many other devices and/or subsystems may be connected to or may be included as one or more elements of system 500 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 5 need not be present to practice the present systems and methods. The devices and subsystems can be interconnected in different ways from that shown in FIG. 5. In some embodiments, an aspect of some operation of a system, such as that shown in FIG. 5, may be readily known in the art and are not discussed in detail in this application. Code to implement the present disclosure can be stored in a non-transitory computer-readable medium such as one or more of system memory 510 or other memory. The operating system provided on I/O controller 520 may be iOS®, ANDROID®, MS-DOS®, MS-WINDOWS®, OS/2®, UNIX®, LINUX®, or another known operating system.

The transceiver 530 may include a modem configured to modulate the packets and provide the modulated packets to the antennas 535 for transmission and/or to demodulate packets received from the antennas 535.

Figure 6:
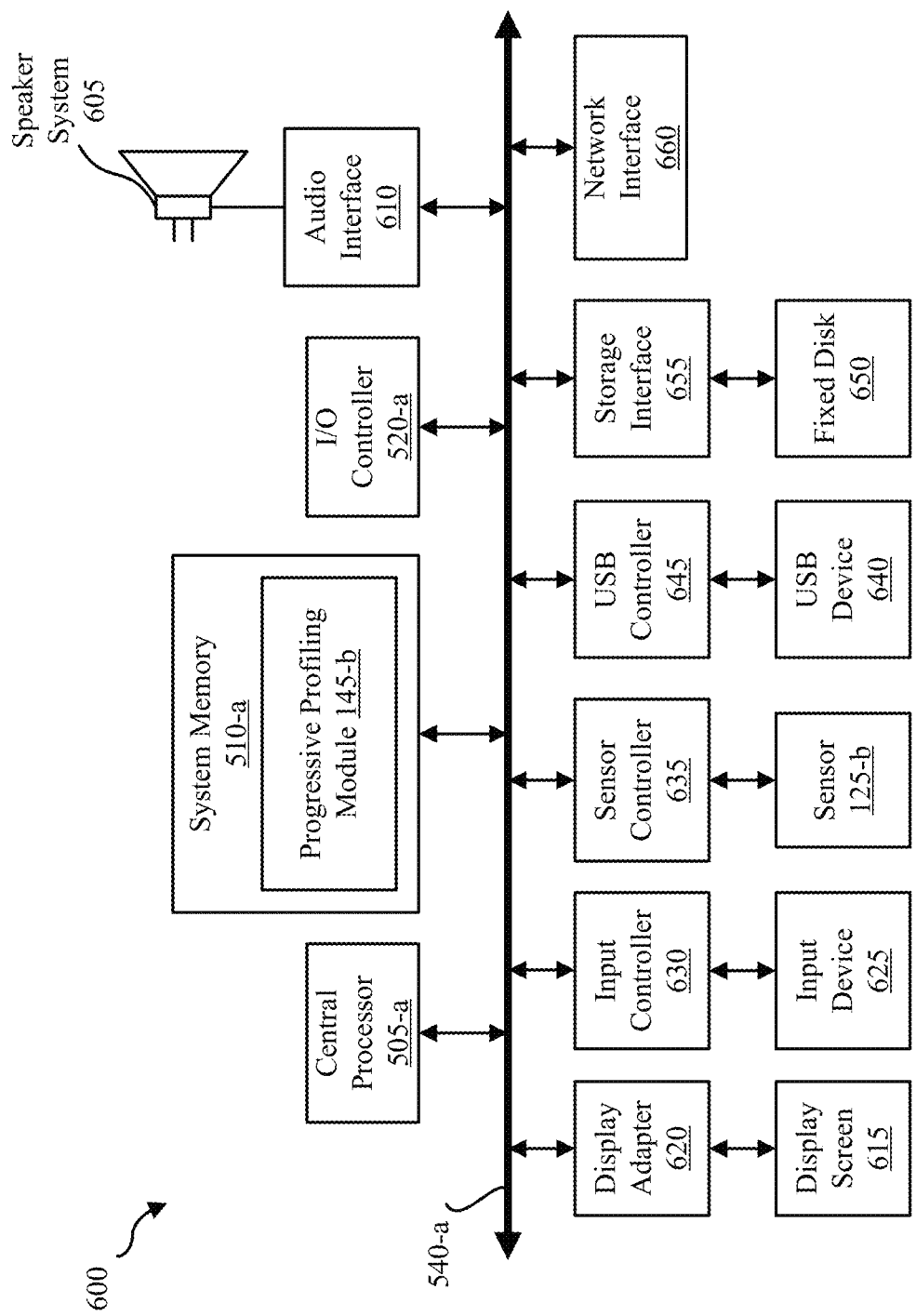
FIG. 6 depicts a block diagram of a computer system suitable for implementing the present systems and methods in accordance with various aspects of this disclosure.

FIG. 6 depicts a block diagram of a computer system suitable for implementing the present systems and methods in accordance with various aspects of this disclosure. The controller 600 may be an example of the device 105, 105-*a*, remote computing device 155, 155-*a* and/or another example of controller 160, 160-*a*, 160-*b*, 160-*c* illustrated in FIGS. 1 and 3-5. In one configuration, controller 600 may include a bus 540-*a* (which may be an example of one or more aspects of the bus 540 of FIG. 5), which interconnects major subsystems of controller 600, such as a central processor 505-*a* (which may be an example of one or more aspects of the processor 505 of FIG. 5), a system memory 510-*a* (typically RAM, but which may also include ROM, flash RAM, or the like, and which may be an example of one or more aspects of the memory 510 of FIG. 5), an input/output controller 520-*a* (which may be an example of one or more aspects of the I/O controller 520 of FIG. 5), an external audio device, such as a speaker system 605 via an audio output interface 610, an external device, such as a display screen 615 via display adapter 620, an input device 625 (e.g., remote control device interfaced with an input controller 630), multiple USB devices 640 (interfaced with a USB controller 645), and a storage interface 655. Also included are at least one sensor 125-*b* (which may be an example of one or more aspects of the sensor 125-*a* of FIG. 5) connected to bus 540-*a* through a sensor controller 635 and a network interface 660 (coupled directly to bus 540-*a*).

Bus 540-*a* allows data communication between central processor 505-*a* and system memory 510-*a*, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the progressive profiling module 145-*b* to implement the present systems and methods may be stored within the system memory 510-*a*. Applications (e.g., application 140) resident with controller 600 are generally stored on and accessed via a non-transitory computer readable medium, such as a hard disk drive (e.g., fixed disk 650) or other storage medium. Additionally, applications can be in the form of electronic signals modulated in accordance with the application and data communication technology when accessed via network interface 660.

Storage interface 665, as with the other storage interfaces of controller 600, can connect to a standard computer readable medium for storage and/or retrieval of information, such as a fixed disk drive 650. Fixed disk drive 650 may be a part of controller 600 or may be separate and accessed through other interface systems. Network interface 660 may provide a direct connection to a remote server via a direct network link to the Internet via a POP. Network interface 660 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 660.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 510-*a* or fixed disk 650. The operating system provided on controller 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal may include the first signal or any modifications to the first signal, whether due to circuit limitations or due to passage through other circuit elements which do not change the informational and/or final functional aspect of the first signal.

Figure 7:
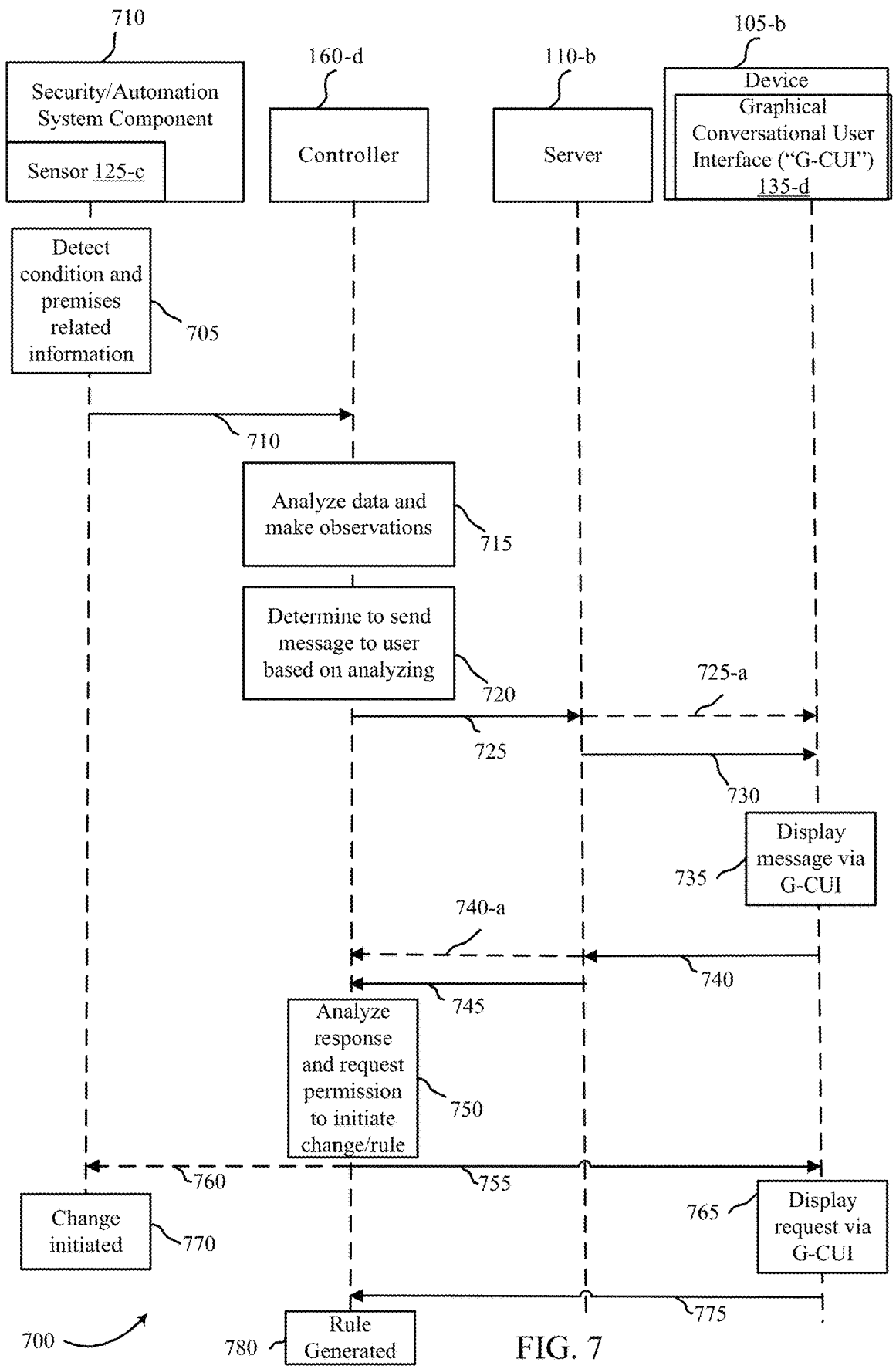
FIG. 7 shows a swim diagram relating to a G-CUI for security and/or an automation system, in accordance with various aspects of this disclosure in accordance with various aspects of this disclosure

FIG. 7 shows a swim diagram relating to a G-CUI for security and/or an automation system, in accordance with various aspects of this disclosure in accordance with various aspects of this disclosure. At block 705, sensor 125-*c* may detect one or more conditions relating to a building, which may include a condition relating to a component and/or an occupancy state, and may transmit relevant data to controller 160-*d* at block 710. As explained above with regard to FIG. 1, controller 160-*d* may be an example of a premises automation controller, control panel, and/or may be or may be included by a number of particular device types.

At block 715, the controller 160-*d* may analyze the data transmitted from the sensor 125-*c* and make certain observations and/or determinations, which in some examples may be based at least in part on the transmitted data. For example, the controller 160-*d* may determine an occupancy state of a building relating to a user. The controller 160-*d* may also, for example at block 720, determine whether or not to send a message to a user. If the controller 160-*d* determines to send a message to a user, then the controller may also determine the content of the message, and how to communicate the message to the user (e.g., using example natural language, what type of natural language specifically, what communication platform, etc.).

At block 725, controller 160-d may transmit a message to the device 105-b of a user, and for example cause the message to be displayed on a G-CUI 135-d of the user. The controller 160-d may transmit the message directly via wired or wireless communication links at block 725-a, or via a server 110-b at block 730. Transmitting the message at blocks 725, 725-a and 730 may include determining a destination device 105-b. In some examples, determining the destination device 105-b (and/or determining the context of the message and determining how to communicate the message) may be based at least in part on whether the destination device 105-b has a G-CUI 135-d and/or the capacity to display messages utilizing the G-CUI 135-d (for example, whether the device 105-b has the proper software and/or application for running a G-CUI 135-d).

At block 735, the transmitted message may be delivered and displayed to the user—for example to device 105-b of the user-which in some examples may include, at block 735, displaying the message via the G-CUI 135-d of the device 105-b.

At 740, the device 105-b may transmit a response to the message back to the controller 160-d, either directly at 740-a or via server 110-b at 745. At block 750, the controller 160-d may analyze the response and determine whether to request permission to initiate a change relating to the security and/or automation system—for example, to a component 710 thereof—and transmit such a request to the user/device 105-b at 755. Alternatively, the controller 160-d may simply initiate a change to a component of the security and/or automation system 710 (e.g., automatically based at least in part on the previously-received response from the user, and/or not based on any particular received response from the user. Alternatively or additionally, the controller 160-d may generate and/or implement a rule at block 750 (or thereafter) and may propose the rule and/or send a request to initiate or implement the rule at 755. In some examples, a rule may be a conditional imperative (e.g., if x, then y must occur). The rules may be associated with, for example, one of more of a building premises, a security and/or automation system and/or a component thereof, a particular user and/or several particular users (which may have stored user profiles), generic users or other persons, entities.

The transmitted request to initiate a change (and/or implement a generated rule) may also be displayed to the user, for example via the G-CUI 135-d at block 765. The user may grant permission to initiate a change and transmit such approval at 775. In some examples, the user may grant permission to initiate a change, implement a rule, or otherwise respond to a message from the controller 160-d by selecting at least one of a plurality selectable responses via an interface, such as via the G-CUI 135-d. Either based at least in part on the granted permission to initiate the change, or by express permission from the user, in some examples the generated rule may be implemented by the controller 160-d at block 780.

Figure 8:
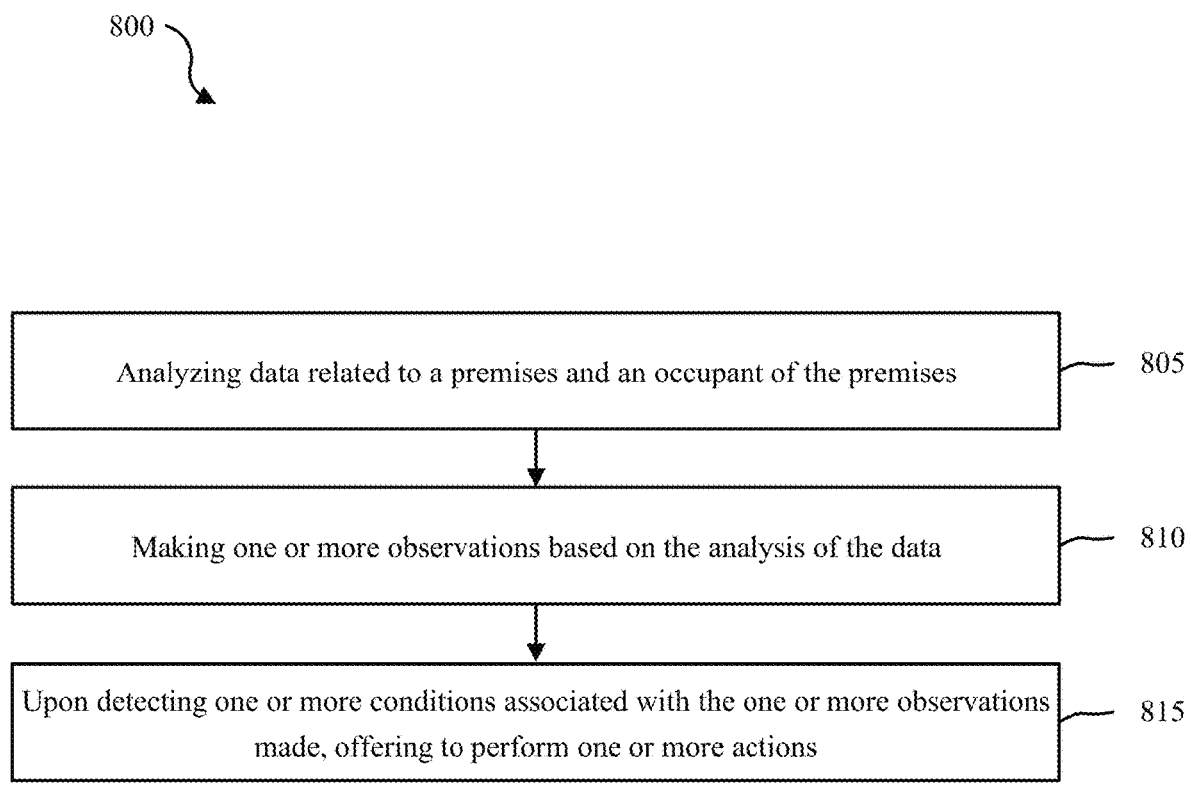
FIG. 8 is a flow diagram illustrating one embodiment of a method for receiving a user input to control home automation in accordance with various aspects of this disclosure.

FIG. 8 is a flow diagram illustrating one embodiment of a method 800 for receiving a user input to control home automation in accordance with various aspects of this disclosure. In some configurations, the method 800 may be implemented by the progressive profiling module 145 and 145-a illustrated in FIG. 1 or 2. In some configurations, the method 800 may be implemented in conjunction with the application 140 and/or the G-CUI 135 illustrated in FIG. 1.

At block 805, data related to a premises and an occupant of the premises may be analyzed. At block 810, one or more observations may be made based on the analysis of the data. In some cases, at least one observation is made in relation to one or more words written and/or spoken by the occupant. In one embodiment, the progressive profiling module 145 may communicate with the occupant using words in the same way as the occupant uses the words to write and speak. Upon generating a communication intended for the occupant, the progressive profiling module 145 may simulate the manner in which the occupant communicates. At block 815, upon detecting one or more conditions associated with the one or more observations made, one or more actions may be offered to be performed.

Figure 9:
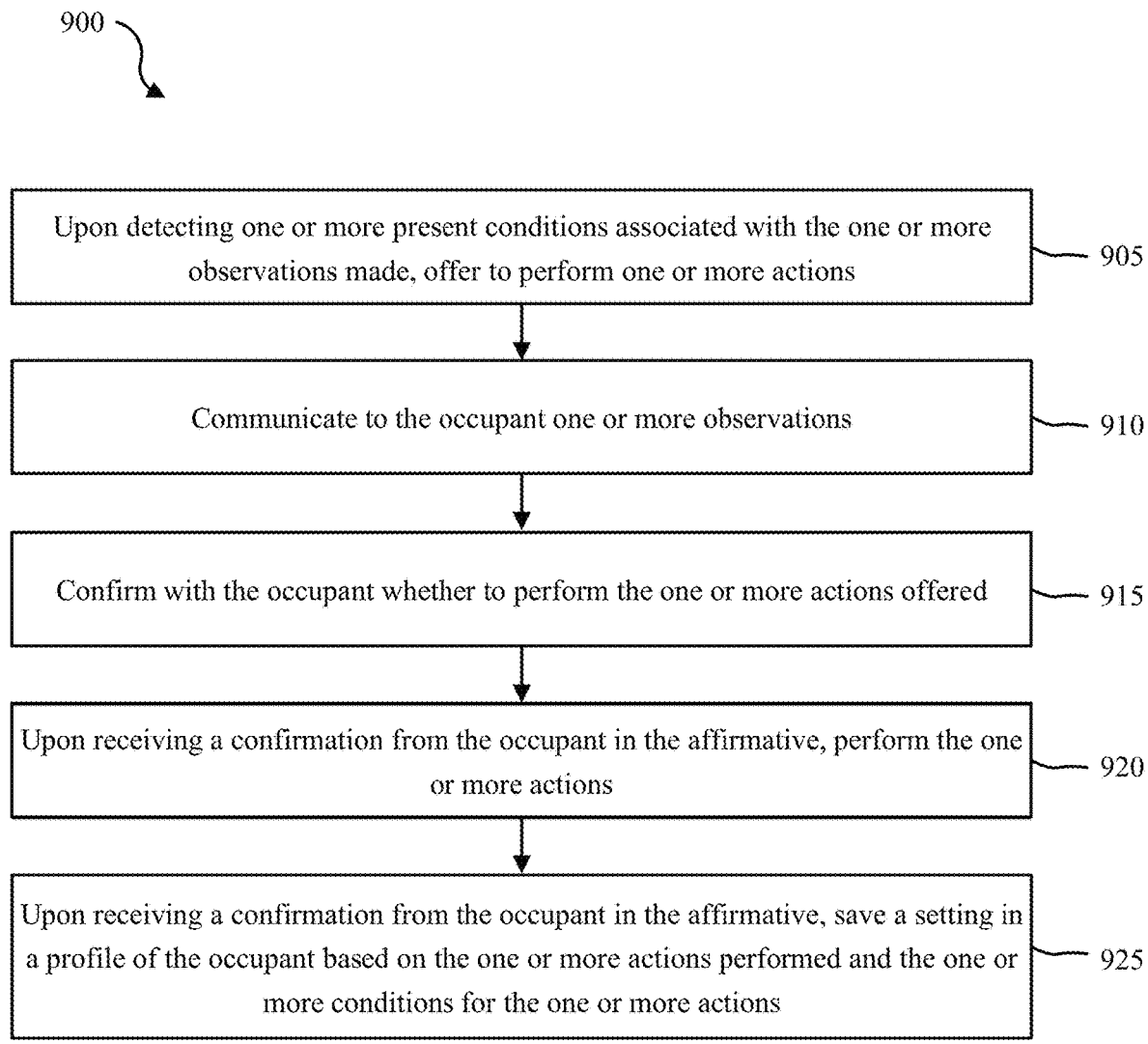
FIG. 9 is a flow diagram illustrating one embodiment of a method for automatically adjusting an aspect of a home automation system based on a detected action of a user in accordance with various aspects of this disclosure.

FIG. 9 is a flow diagram illustrating one embodiment of a method 900 for automatically adjusting an aspect of a home automation system based on a detected action of a user in accordance with various aspects of this disclosure. In some configurations, the method 900 may be implemented by the progressive profiling module 145 illustrated in FIG. 1 or 2. In some configurations, the method 900 may be implemented in conjunction with the application 140 and/or the G-CUI 135 illustrated in FIG. 1.

At block 905, upon detecting one or more present conditions associated with the one or more observations made, one or more actions may be offered to be performed. At block 910, one or more observations may be communicated to the occupant. At least one of the observations may be based on the occupant previously performing one or more actions under one or more conditions. In some cases, at least one of the observations may be based on the occupant previously performing one or more actions under one or more conditions. At block 915, it may be confirmed with the occupant whether to perform the one or more actions offered. At block 920, upon receiving a confirmation from the occupant in the affirmative, the one or more actions may be performed. At block 925, upon receiving a confirmation from the occupant in the affirmative, a setting may be saved in a profile of the occupant based on the one or more actions performed and the one or more conditions associated with the one or more actions, or the conditions under which the one or more actions are performed.

Figure 10:
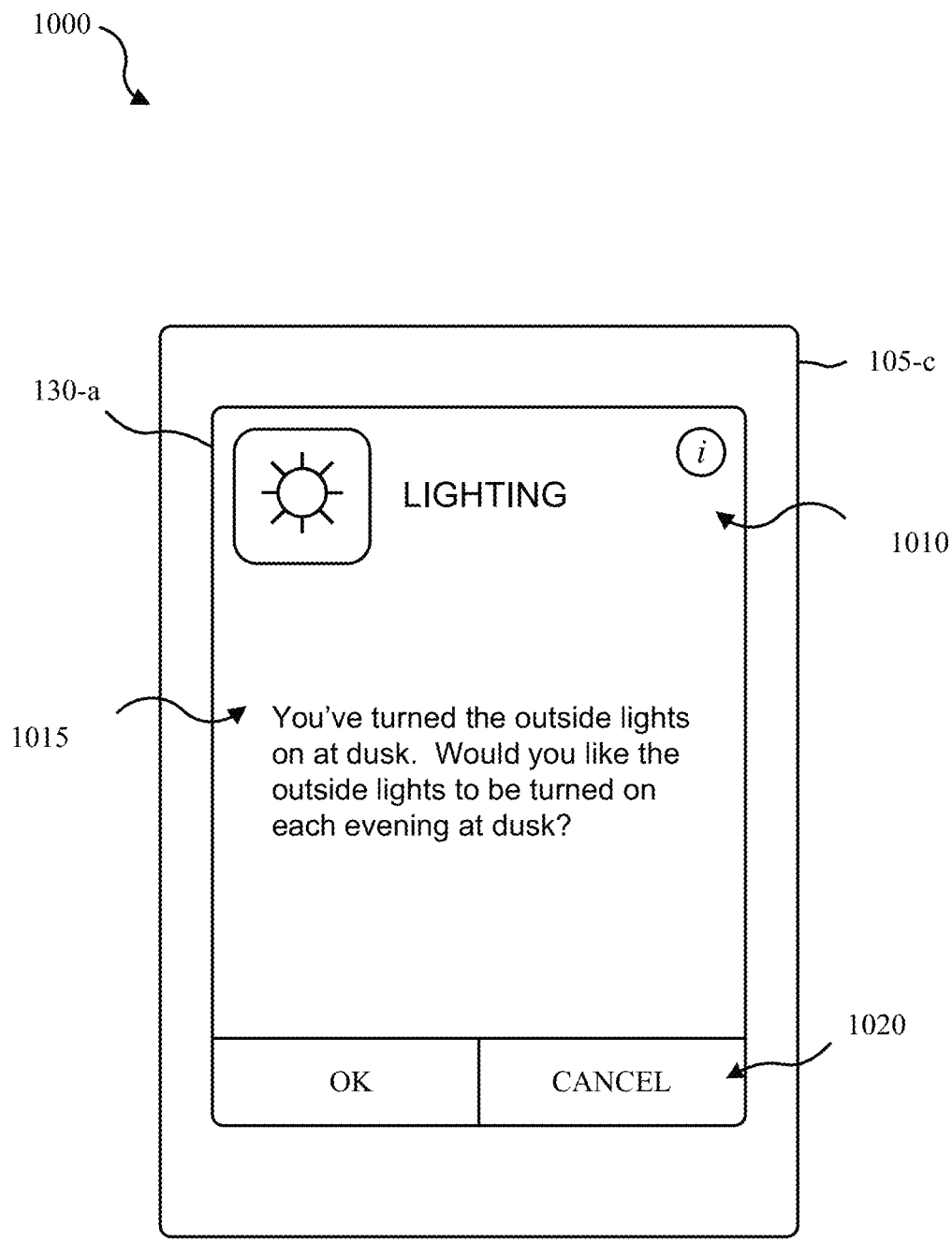
FIG. 10 is a block diagram illustrating one example of an environment for enabling progressive profiling of an occupant of a premises in accordance with various aspects of this disclosure.

FIG. 10 is a block diagram illustrating one example of an environment 1000 for enabling progressive profiling of an occupant of a premises in accordance with various aspects of this disclosure. In some configurations, aspects of the environment 1000 may be implemented by the progressive profiling module 145, 145-a illustrated in FIG. 1 or 2. In some configurations, aspects of the environment 1000 may be implemented in conjunction with the application 140 illustrated in FIG. 1, and/or a user interface 1020.

In one embodiment, environment 1000 may include device 105-c. The device 105-c may be one example of the device 105, 105-a and/or 105-b depicted in FIGS. 1, 5 and 7. Device 105-c may include a display 130-a. Display 130-a may be one example of the display 130 depicted in FIG. 1. Display 130-a may be or include all or part of a user interface and may include a title section 1010, a message section 1015, and a user response section 1020. In one example, the title section 1010 may include a symbol and/or one or more words to describe the affected system. For example, observations may be made with regards to a lighting system, a media system, a temperature control system, a humidity control system, a security system, and the like. As depicted, an observation is made with regards to a lighting system of the premises as depicted in the title section 1010. Thus, the title section 1010 includes a symbol for the lighting system and the word "LIGHTING" to provide a quick reference to any included message. Additionally, or alternatively, the title section 1010 may include an information icon (e.g., the circle "i" icon depicted in title section 1010) that may be configured to provide an occupant more information regarding the observation and/or the observation system when the occupant selects the icon.

In some embodiments, the display 130-a may include a message section 1015. The message section 1015 may include an observation made by the progressive profiling module 145. For example, the message section 1015 may include the observation "I've noticed that you turn the outside lights on at dusk," as depicted in FIG. 10. Additionally, or alternatively, the message section 1015 may include a suggested action the system could take on behalf of the occupant. In some cases, the message section 1015 may present the suggested action in the form of a query with a confirmation request. Thus, the suggested action may be in the form of a query to enable the occupant to confirm that the suggested action will be performed on behalf of the occupant. Thus, as depicted, the message section 1015 may include the query, "Would you like me to turn the outside lights on each evening at dusk for you?" In some cases, the progressive profiling module 145 may include one or more follow-up queries to confirm a suggested action. Accordingly, the message section 1015 may include a confirmation request such as "Would you like me to perform this action every day?" or "Would you like me to perform this action even when the premises is empty?" and so forth. As depicted, the display 130-a may show a user response section 1020. The user response section 1020 may provide a means whereby an occupant may provide a reply in response to a query included in the message section 1015. For example, the user response section 1020 may include a button titled "OK" and another button titled "CANCEL," as depicted in FIG. 10. Accordingly, upon detecting the occupant pressing the "OK" button, the system may determine that the occupant wants the progressive profiling module 145 to perform the indicated action on behalf of the occupant. Upon detecting the occupant pressing the "CANCEL" button, the system may determine that the occupant does not want the action performed on his or her behalf. In some embodiments, upon receiving a negative confirmation (i.e., the occupant pressing the "CANCEL" button), the progressive profiling module 145 may communicate one or more follow-up queries to the occupant to determine whether the occupant wants one or more actions performed on his or her behalf under different circumstances.

Figure 11:
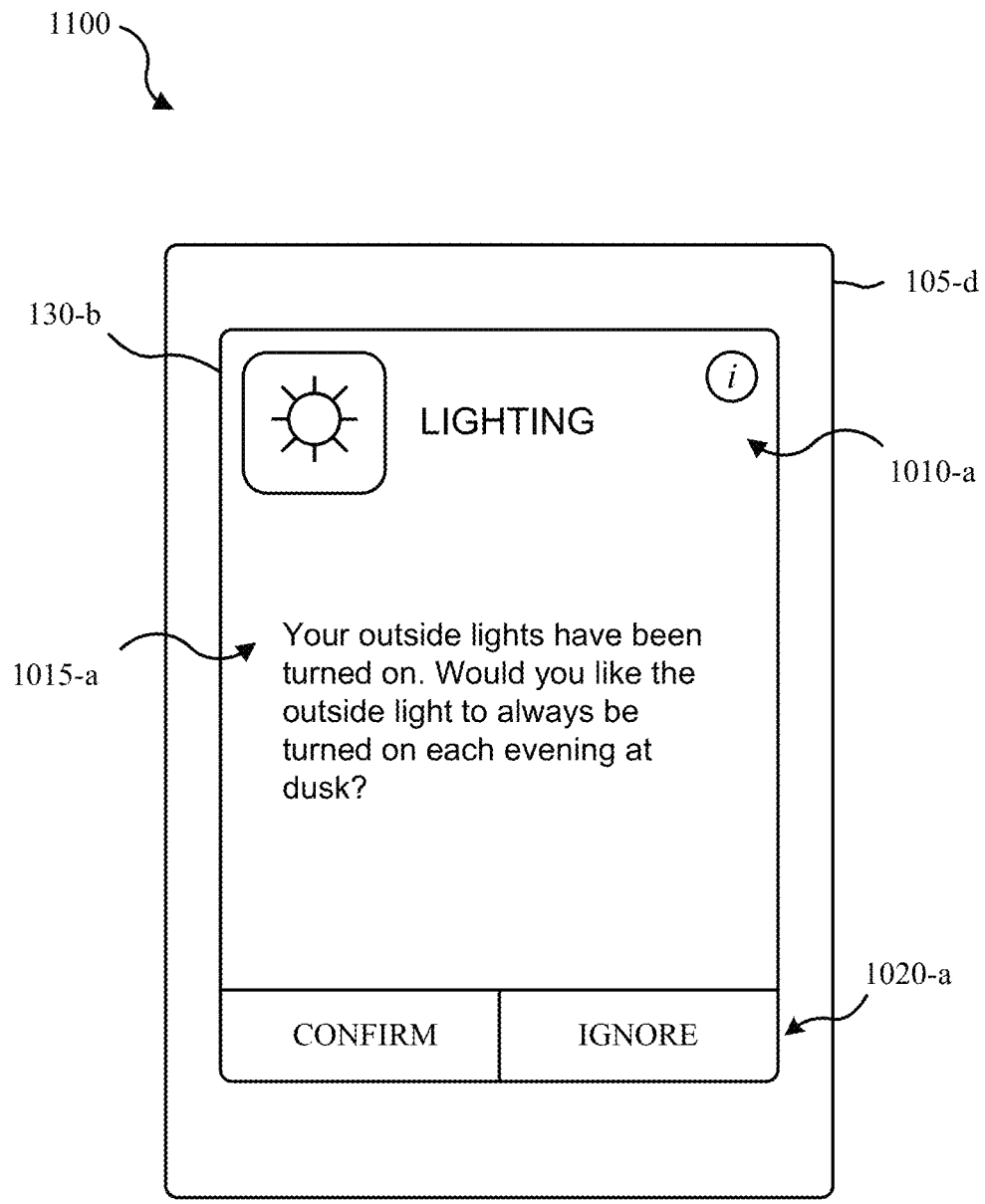
FIG. 11 is a block diagram illustrating another example of an environment for enabling progressive profiling of an occupant of a premises in accordance with various aspects of this disclosure.

FIG. 11 is a block diagram illustrating another example of an environment 1100 for enabling progressive profiling of an occupant of a premises in accordance with various aspects of this disclosure. In some configurations, aspects of the environment 1100 may be implemented by the progressive profiling module 145, 145-a illustrated in FIG. 1 or 2. In some configurations, aspects of the environment 1100 may be implemented in conjunction with the application 140 illustrated in FIG. 1, and/or a user response section 1020-a (which may be similar in one or more aspects to user response section 1020 of FIG. 10).

In one embodiment, environment 1100 may include device 105-d. The device 105-d may be one example of the device 105, 105-a, 105-b and/or 105-c depicted in FIGS. 1, 5, 7 and 10. Device 105-d may include a display 130-b. Display 130-b may be one example of the displays 130, 130-a depicted in FIGS. 1 and/or 10. Display 130-b may include a title section 1010-a, a message section 1015-a, and a user response section 1020-a (which may each be similar in one or more aspects to title section 1010, message section 1015 and user response section 1020 depicted in FIG. 10). In one example, the title section 1010-a may include a symbol and/or one or more words to describe the affected system. As depicted, an observation is made with regard to a lighting system of the premises as depicted in the title section 1010-a.

In some embodiments, the display 130-b may include a message section 1015-a. The message section 1015-a may include an observation made by the progressive profiling module 145. In some cases, the message section 1015-a may include a suggested action and a confirmation request. For example, the message section 1015-a may include the observation "Your outside lights have been turned on," as depicted in FIG. 11. Additionally, or alternatively, the message section 1015-a may include a suggested action the system could take on behalf of the occupant. In some cases, the message section 1015-a may present the suggested action in the form of a query with a confirmation request. The suggested action may be in the form of a query to enable the occupant to confirm that the suggested action will be performed on behalf of the occupant. Thus, as depicted, the message section 1015-a may include the query, "Would you like the outside light to always be turned on each evening at dusk?" As depicted, the display 130-b may show a user response section 1020-a. The user response section 1020-a may provide a means whereby an occupant may provide a reply in response to a query included in the message section 1015-a. For example, the user response section 1020-a may include a button titled "CONFIRM" and another button titled "IGNORE," as depicted in FIG. 11. Accordingly, upon detecting the occupant pressing the "CONFIRM" button, the system may confirm that the occupant wants the progressive profiling module 145 to perform the indicated action on behalf of the occupant. Upon detecting the occupant pressing the "IGNORE" button, the system may determine that the occupant does not want the action performed on his or her behalf. In some embodiments, upon receiving a negative confirmation (i.e., the occupant pressing the "IGNORE" button), the progressive profiling module 145 may communicate one or more follow-up queries to the occupant to determine whether the occupant wants one or more actions performed on his or her behalf under different circumstances. Different examples may feature buttons with different language (i.e., not just "CONFIRM," "IGNORE," etc.), depending for any number of factors such as for instance platform (e.g., Android or iOS platforms).

Figure 12:
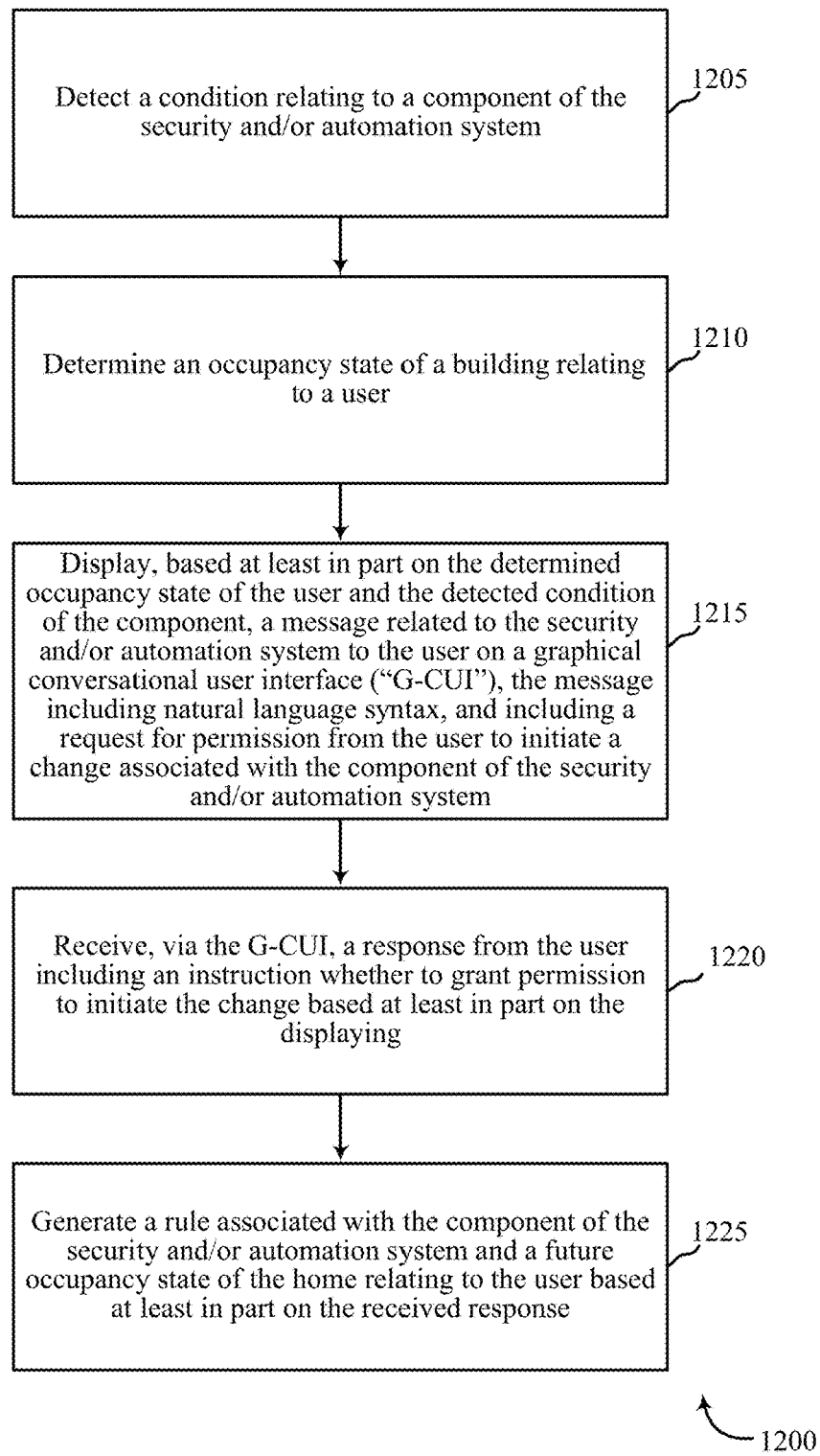
FIG. 12 is a flow diagram illustrating a method for security and/or automation systems that may utilize a G-CUI, in accordance with various aspects of this disclosure.

FIG. 12 is a flow chart illustrating an example of a method 1200 for security and/or automation systems that may utilize a G-CUI, in accordance with various aspects of the present disclosure. In some examples, the method 1200 may be described below with reference to aspects of one or more of the methods described with reference to FIGS. 8 and 9, and/or aspects of one or more of the methods described with reference to the additional figures described below. In some examples, a controller (e.g., a control panel), device, and/or remote computing device, may execute one or more sets of codes to control the functional elements of the security and/or automation system and components thereof to perform the functions described below. Additionally or alternatively, the controller, device, and/or remote computing device may perform one or more of the functions described below using special-purpose hardware.

At block 1205, the method 1200 may include detecting a condition relating to a component of the security and/or automation system. The condition may be associated with a building and/or a building premises, which building in some cases may be a home. The operation(s) at block 1205 may be performed using the analyzer 315, condition detector 410, and data analysis module 205, and sensors 125, 125-*a*, 125-*b*, described with reference to FIGS. 1-6.

At block 1210, the method 1200 may include determining an occupancy state of a building relating to a user. The operation(s) at block 1210 may be performed using the analyzer 315, 315-*a*, 315-*b*, occupancy state determiner 405, and data analysis module 205, and sensors 125, 125-*a*, 125-*b*, described with reference to FIGS. 1-6.

At block 1215, the method 1200 may include displaying, based at least in part on the determined occupancy state of the user and the detected condition of the component, a message related to the security and/or automation system to the user on a G-CUI, the message including natural language syntax, and including a request for permission from the user to initiate a change associated with the component of the security and/or automation system. The operation(s) at block 1215 may be performed using the analyzer 315, transmitters 320, 320-*a*, G-CUI 135-*a*, 135-*b*, 135-*c*, 135-*d*, message generator 415, observation module 210, communication module 215, described with reference to FIGS. 2-5.

At block 1220, the method 1200 may include receiving, via the G-CUI, a response from the user including an instruction whether to grant permission to initiate the change based at least in part on the displaying. The operation(s) at block 1220 may be performed using the analyzers 315, 315-*a*, receivers 310, 310-*a*, transmitters 320, 320-*a*, G-CUI 135-*a*, 135-*b*, 135-*c*, 135-*d*, response analyzer 420, change initiator 425, observation module 210, communication module 215, implementation module 220, described with reference to FIGS. 2-5.

At block 1225, the method 1200 may include generating a rule associated with the component of the security and/or automation system and a future occupancy state of the home relating to the user based at least in part on the received response. The operation(s) at block 1225 may be performed using analyzers 315, 315-*a*, rule generator 430, change initiator 425, observation module 210, implementation module 220 described with reference to FIGS. 2-4.

Thus, the method 1200 may provide for rule generation relating to security and/or automation systems, and utilizing in some examples a G-CUI. It should be noted that the method 1200 is just one implementation and that the operations of the method 1200 may be rearranged or otherwise modified such that other implementations are possible.

Figure 13A:
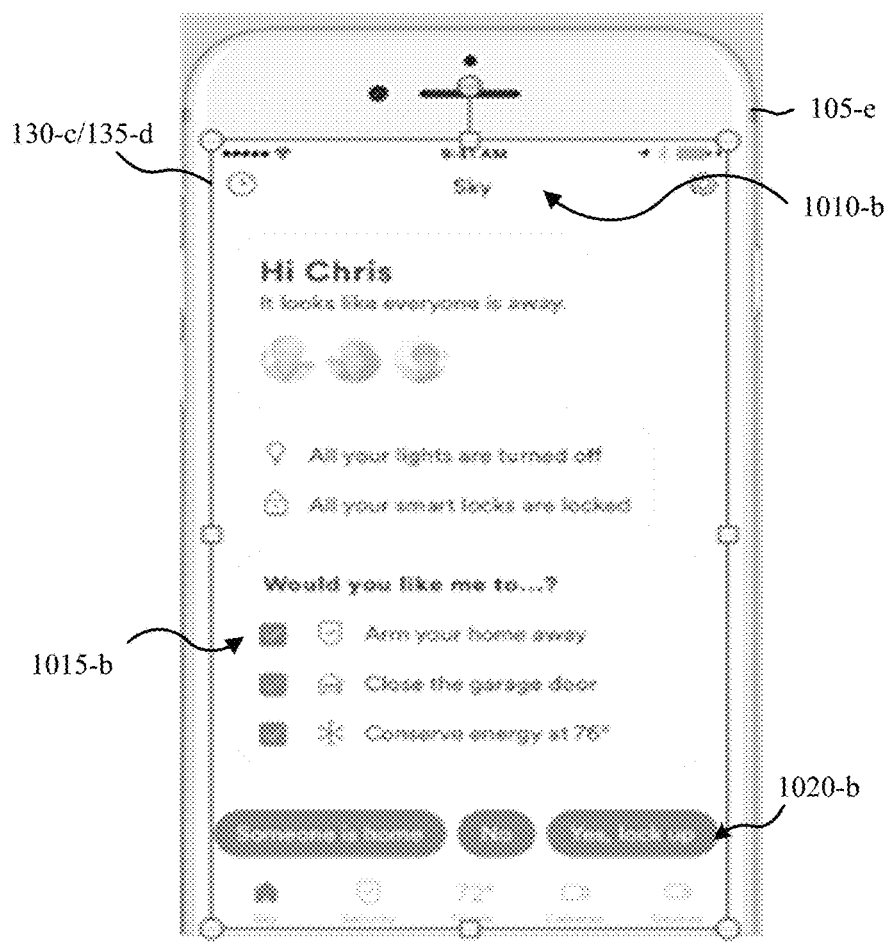
FIGS. 13A and 13B show block diagrams of an apparatus relating to a security and/or an automation system that may utilize a G-CUI in accordance with various aspects of this disclosure.
Figure 13B:
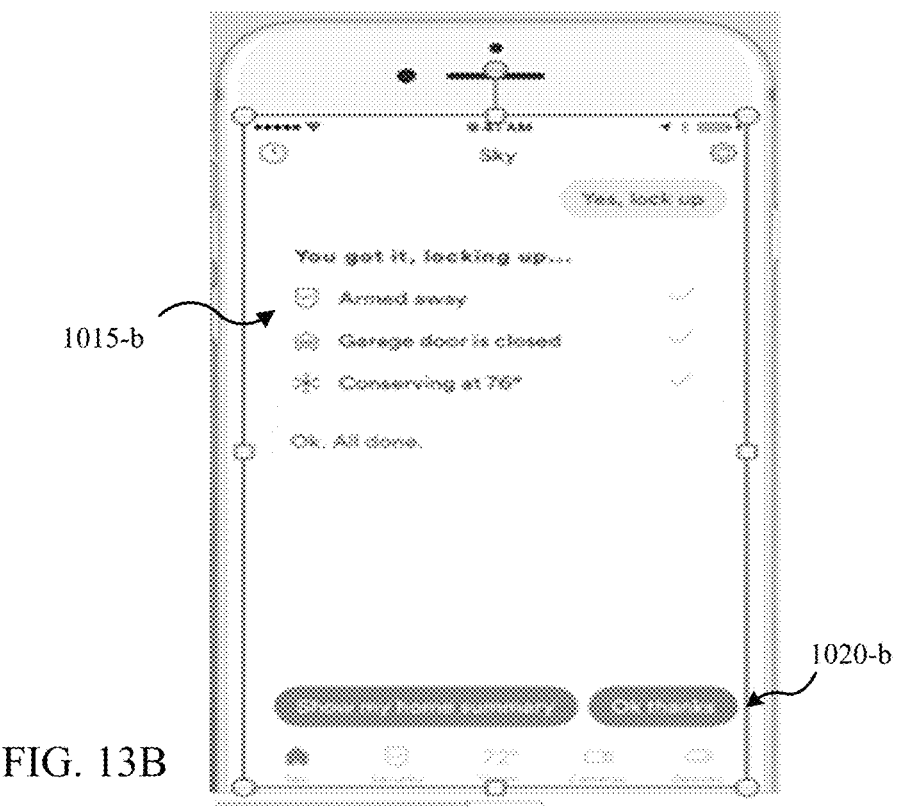

FIGS. 13A and 13B show block diagrams of an apparatus relating to a security and/or an automation system that may utilize a G-CUI in accordance with various aspects of this disclosure. The apparatus may be or include a device 105-*e*, which may be similar in one more aspects to device 105, 105-*a*, 105-*b*, 105-*c*, 105-*d* of FIGS. 1, 5, 7, 10, 11. The device 105-*e* may include a display 130-*c*, which in one or more aspects may be similar to displays 130, 130-*a*, 130-*b* of FIGS. 1, 10, 11. The display 130-*c* may in some examples be interactive (e.g., an interactive touch screen).

In some examples the display 130-*c* may be or include all or part of a G-CUI 135-*d*, which may be similar in some aspects to the G-CUIs 135, 135-*a*, 135-*b*, 135-*c* of FIGS. 1, 3, 4, 5. The G-CUI 135-*d* may assist to more easily and conveniently communicate information and perform various other tasks related to the security and/or automation system. The display 130-*c* and/or the G-CUI 135-*d* may include a title section 1010-*b*, message section 1015-*b* and/or user response section 1020-*b*, which may each be similar (and may also of course be different) in one or more aspects to title sections 1010, 1010-*a*, message sections 1015, 1015-*a* and user interface sections 1020, 1020-*a* depicted in FIGS. 10 and 11. In some examples the display 130-*a* and/or the G-CUI 135-*d* may include other sections and in some examples may include less sections (without for example the title section 1010-*b*). In some examples, the G-CUI 135-*d* may not include excessive icons and labels but rather may have a tendency toward conciseness and clarity.

The display 130-*c* and/or the G-CUI 135-*d* may include a title section 1010-*b*, which may include a symbol and/or one or more words relating to the security and/or automation system. For example, the title section 1010-*b* may identify any one more of the system, a subsystem or component thereof, and/or a related program or name of the G-CUI or related application, including for example, the name of an avatar related to the G-CUI.

The display 130-*c* and/or the G-CUI 135-*d* may also include a message section 1015-*b*. The message section 1015-*b* may include one or more messages. For example, the content of an initial or introductory message may address a user by name. A second message may convey information related to the security and/or automation system, including for example a condition related to or status of one or more components of the security and/or automation system. In some examples, at least one message may include an observation regarding the security and/or automation system or at least one component thereof. A third or subsequent message may include a query or request for permission to initiate a change to the security and/or automation system (including for example to one or more components thereof).

In some examples, the manner of communicating may include at least one message being in natural language syntax form (e.g., plain text wording, plain text English). In some examples, the words and language chosen to communicate with the user may be similar to everyday natural language, thereby conveying to the user the impression of communicating with another human (via, e.g., text message). In some examples, the content of the messages and the manner of communicating may generally provide the user with a sense of familiarity. In some examples, similar messages may be repeated at different times, and may be presented with different words and varying text sequences (e.g., either hard-coded alternate terminology or alternate phrases generated using artificial intelligence). Such varying conversational presentation may be applicable to messages and user-selectable responses, and may replicate to a greater degree normal conversation (e.g., the avatar may not respond the same way to the same question each time the question is asked), which may maintain the user's interest.

In addition, in some embodiments, the content of at least one message may include helpful and aesthetically interesting symbols (e.g., emoji) and/or icons associated for instance with meanings relating to the security and/or automation system.

In some examples, the manner of communicating may include an avatar associated with the G-CUI addressing the user and communicating with the user. In some examples, at least one message may be communicated in the first person form, as if from the perspective of another person (e.g., the avatar), which may be the avatar related to the security and/or automation system. In some examples, the content of the message may be communicated in a similar format to text messaging, with for example messages transmitted from the security and/or automation system avatar aligned with the left side of the display 130-*c* and/or G-CUI 135-*d*.

The display 130-*c* and/or the G-CUI 135-*d* may also include a user response section 1020-*b*. In some examples, the response section 1020-*b* may be located near the bottom of the display 130-c/G-CUI 135-d. In some examples, the user response section 1020-b may include a plurality of user-selectable responses. In some examples, the user response section 1020-b (and other sections of G-CUI 135-d) may utilize a touch screen. In some examples, the user response section 1020-b may include a keyboard. In some examples, the responses (whether selectable or entered as free-form text utilizing a keyboard) may relate to a preference of the user, an occupancy state of the building related to the user, a command, or grant or denial of permission, to initiate a change to the security and/or automation system, etc. In some examples, a user-selectable response (or otherwise provided selection) may be to easily cancel and/or retract a previously-selected response (e.g., in the event a user makes a mistake in selecting a wrong response or otherwise changes her or his mind regarding a previously selected response).

In some examples, the message section 1015-b may include a checklist—e.g., one or more boxes corresponding to suggested or potential actions that the system may take, which boxes may be checked according to the user's input. For example, the user may decide to take some, all, or none of some suggested actions. Moreover, in some examples, those selected actions via the G-CUI may be stored, and future messages to the user may be based at least in part on those stored selections. For instance, similar selectable options (e.g., boxes with corresponding text) may be presented to the user via the G-CUI during a subsequent interaction.

As shown in FIG. 13B, in some examples, once a response is selected by the user, the response may then appear in the message section 1015-b. In some examples, the selected response may appear as a text message aligned with the right side of the display 130-c and/or G-CUI 135-d. In some examples, a follow up message may be transmitted in reply to, or based at least in part on, the user selected response. Thus, in some examples, additional info may be communicated based at least in part on the user's engagement—e.g., communicated more or less when the user implicitly authorizes that information be communicated (by for example selecting a response or otherwise responding). In some examples, the manner of communicating may accordingly be similar in some aspects to the "give and take" of normal human conversation where one person does not typically "talk over" another person. For example, a user may be asked a single question or be made a simple invitation but not be provided further information unless first prompted by the user.

The content of the follow up message may be associated with, for example, an initiated or taken action relating to the security and/or automation system (e.g., confirming that the action has been taken), and/or may inform regarding any problem with initiating the action (e.g., a door could not be closed/locked). Alternatively or additionally, in some examples the user may be presented with the option to re-attempt an unsuccessful component change. In some examples, re-attempted component change may involve a slightly different approach, based for example on the user's feedback. For instance, in the situation where a unsuccessful component change was a failure to arm the security system because of an open door, window, or other security sensor, the user may be presented with the option to "bypass" that sensor and continue arming the system anyway (e.g., sensors other than the sensor monitoring the open door, window, etc., would then function as they normally would in the armed state).

Thus the G-CUI may provide prompt feedback to the user about actions being initiated and/or not initiated, and that the user's command has been processed and/or that the user's instructions or responses have been noted and considered. In some examples (not shown in FIGS. 13A and 13B), a generated rule—or some message relating to the generated rule—may also be displayed in the message section 1015-b. In addition, user selectable responses relating to the generated rule may be provided in the user response section 1020-b.

In some examples, the same one or more messages may be transmitted for displaying to multiple users of a security and automation system via potentially multiple G-CUIs. In such instances, where one user respond to the same message that another user received, the non-responsive user may be informed of the responding user's response (and a consequently "stale notification) so that the non-responsive user may be aware that a response may no longer be necessary. In some examples, such informing the non-responsive user may be handled using elegant conversational flows.

Figure 14A:
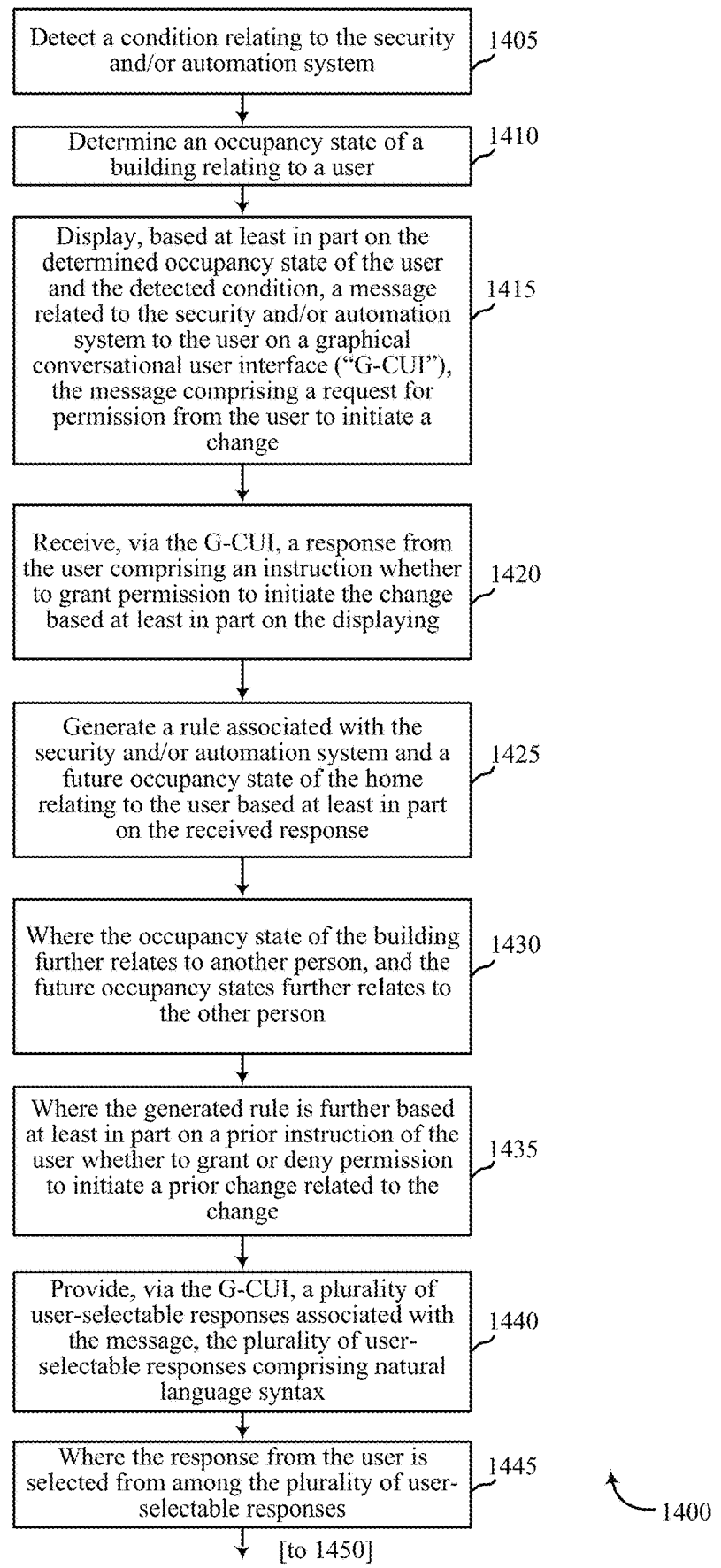
FIGS. 14A and 14B are flow diagrams illustrating a method relating to a security and/or an automation system that may utilize a G-CUI in accordance with various aspects of this disclosure.
Figure 14B:
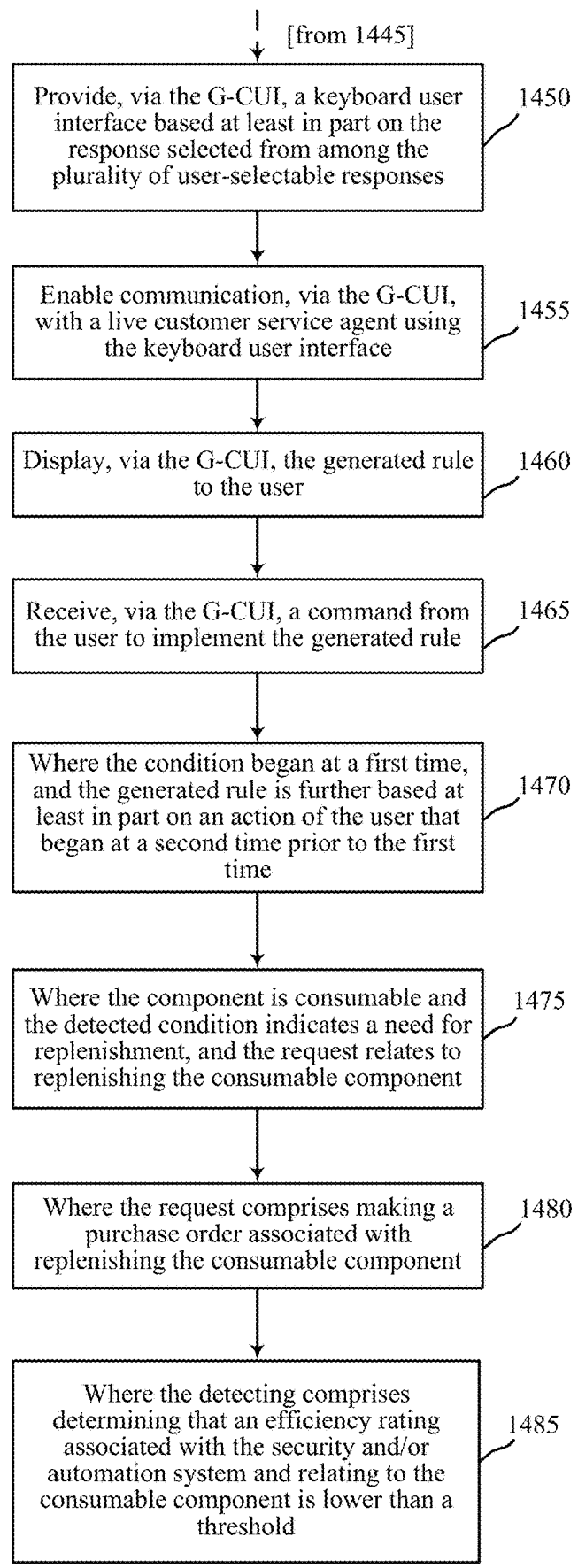

FIGS. 14A and 14B are flow diagrams illustrating a method 1400 relating to a security and/or an automation system that may utilize a G-CUI in accordance with various aspects of this disclosure. In some examples, the method 1400 may be associated with generating rules related to security and/or automation system based at least in part on logged or data, by communicating with a user via a G-CUI. For clarity, the method 1400 is described below with reference to aspects of one or more of the methods 800 and 900 described with reference to FIGS. 8 and 9, and/or method 1200 described with reference to FIG. 12. In some examples, a controller may execute one or more sets of codes to control the functional elements of the security and/or automation system to perform the functions described below. Additionally or alternatively, the controller may perform one or more of the functions described below using special-purpose hardware.

As illustrated in FIG. 14A, at block 1405, the method 1400 may include detecting a condition relating to the security and/or automation system. The condition may be associated with a building and/or a premises of the building, which building in some cases may be a home. In some examples, the condition may relate to a component of the security and/or automation system. For instance a condition relating to a component of the security and/or automation system may include one or more of: an unlocked or locked door or window, an open or closed (e.g., garage) door or window, a thermostat/HVAC output, an active/activated or inactive/deactivated appliance/media (TV)/fan/electronic device, open or closed blinds/curtains, turned on or off lights, an unarmed or disarmed state of the security and/or automation system, a running faucet. The operation(s) at block 1405 may be performed using one or more of the analyzer 315, 315-a, condition detector 410, and data analysis module 205, and sensors 125, 125-a, 125-b, described with reference to FIGS. 1-6.

At block 1410, the method 1400 may include determining an occupancy state of a building relating to a user (or another person). For example, an occupancy state may be one or more of: home, returning home, away, sleep, or vacation. However, other occupancy states may be contemplated. Some occupancy states may take into account the locations of multiple persons (e.g., consider that one user is returning home and another is away and another is home). The operation(s) at block 1410 may be performed using one or more of the analyzers 315, 315-a, occupancy state determiner, and data analysis module 205, and sensors 125, 125-*a*, 125-*b*, described with reference to FIGS. 1-6.

At block 1415, the method 1400 may include displaying, based at least in part on the determined occupancy state of the user and the detected condition, a message related to the security and/or automation system to the user on a G-CUI. In some examples, the message may include a request for permission from the user to initiate a change. In some examples, the change may be associated with a component of the security and/or automation system. In some example the message may be in natural language syntax form. In some examples, the message related to the security and/or automation system may be informational—e.g., may include observations about system/occupancy state, etc. In some embodiments, displaying the message, or the decision to display the message (which decision could be another step), may be system-initiated—i.e., without being prompted by the user. The operation(s) at block 1415 may be performed using one or more of the analyzers 315, 315-*a*, transmitters 320, 320-*a*, G-CUI 135-*a*, 135-*b*, 135-*c*, 135-*d*, message generator 415, observation module 210, communication module 215, described with reference to FIGS. 2-5.

At block 1420, the method 1400 may include receiving, via the G-CUI, a response from the user including an instruction whether to grant permission to initiate the change based at least in part on the displaying. The operation(s) at block 1420 may be performed using one or more of the analyzers 315, 315-*a*, receivers 310, 310-*a*, transmitters 320, 320-*a*, G-CUI 135-*a*, 135-*b*, 135-*c*, 135-*d*, response analyzer 420, change initiator 425, observation module 210, communication module 215, implementation module 220, described with reference to FIGS. 2-5.

At block 1425, the method 1400 may include generating a rule associated with the security and/or automation system and a future occupancy state of the home relating to the user based at least in part on the received response. In some examples, the rule may further be associated with one or more components of security and/or automation system. The operation(s) at block 1425 may be performed using analyzers 315, 315-*a*, rule generator 430, change initiator 425, observation module 210, implementation module 220 described with reference to FIGS. 2-4.

In some examples, as shown at block 1430, the occupancy state of the building may further relate to another person, and the future occupancy state may further relate to the other person. At block 1435, the method 1400 may include the generated rule being further based at least in part on a prior instruction of the user whether to grant or deny permission to initiate a prior change related to the change.

At block 1440, the method 1400 may include providing, via the G-CUI, a plurality of user-selectable responses associated with the message. The plurality of user-selectable responses may be in natural language syntax in some examples. As illustrated in FIG. 14B, at block 1445, the response from the user may be selected from among the plurality of user-selectable responses. The operation(s) at block 1440 and 1445 may be performed using one or more of the receivers 310, 310-*a*, analyzers 315, 315-*a*, transmitters 320, 320-*a*, G-CUI 135-*a*, 135-*b*, 135-*c*, 135-*d*, message generator 415, response analyzer 420, observation module 210, communication module 215, described with reference to FIGS. 2-5.

At block 1450, the method 1400 may further include providing, via the G-CUI, a keyboard user interface based at least in part on the response selected from among the plurality of user-selectable responses. Moreover, at block 1455, the method 1400 may further include enabling communication, via the G-CUI, with a live customer service agent using the keyboard user interface (and/or using in some examples, a voice or video call). The operation(s) at block 1450 and block 1455 may be performed using the receivers 310, 310-*a*, analyzers 315, 315-*a*, transmitters 320, 320-*a*, G-CUI 135-*a*, 135-*b*, 135-*c*, 135-*d*, message generator 415, response analyzer 420, observation module 210, communication module 215, described with reference to FIGS. 2-5.

At block 1460, the method 1400 may include displaying, via the G-CUI, the generated rule to the user. The operation(s) at block 1460 may be performed using one or more of the analyzers 315, 315-*a*, transmitters 320, 320-*a*, G-CUI 135-*a*, 135-*b*, 135-*c*, 135-*d*, message generator 415, response analyzer 420, observation module 210, communication module 215, described with reference to FIGS. 2-5.

At block 1465, the method 1400 may include receiving, via the G-CUI, a command from the user to implement the generated rule. The operation(s) at block 1465 may be performed using one or more of the receivers 310, 310-*a*, analyzers 315, 315-*a*, G-CUI 135-*a*, 135-*b*, 135-*c*, 135-*d*, message generator 415, response analyzer 420, observation module 210, communication module 215, described with reference to FIGS. 2-5.

At block 1470, the method 1400 may include the condition beginning at a first time, and the generated rule being further based at least in part on an action of the user that began at a second time prior to the first time. In some examples, the condition may relate to a component, and the action of the user may be associated with the component. For example, a condition may relate to a sensor of back door of a home indicating that the door is left unlocked and/or open at 3:00 PM on a Tuesday as a user leaves the home. However, the user may have also left the same back door open on a previous Thursday and previous Tuesday around same time of day, 3:00 PM, as the user also left the home. Based in part on this pattern, a rule may be generated to close and/or lock the door as the user leaves around the same time, 3:00 PM. In addition, as explained at block 1435, the user may have previously indicated that the security and/or automation system close and/or lock the door as the user left the home—or the user may have her or himself closed and/or locked the door just prior to leaving the home, and the generated rule may also take into consideration such previous indications to initiate a change—and or the user's very own actions to initiate a change. At block 1475, the component may be consumable and the detected condition may indicate a need for replenishment, and the request may relate to replenishing the consumable component. At 1480, the request may include making a purchase order associated with replenishing the consumable component. At 1485, the detecting may include determining that an efficiency rating associated with the security and/or automation system and relating to the consumable component is lower than a threshold. The operations at blocks 1470-1485 may be performed using one or more of the receivers 310, 310-*a*, analyzers 315, 315-*a*, 315-*b*, energy efficiency measurer 550, message generator 415, observation module 210, communication module 215, and sensors 125, 125-*a*, 125-*b*, described with reference to FIGS. 1-6. It should be noted that the method 1400 is just one implementation and that the operations of the method 1400 may be rearranged or otherwise modified such that other implementations are possible.

Figure 15A:
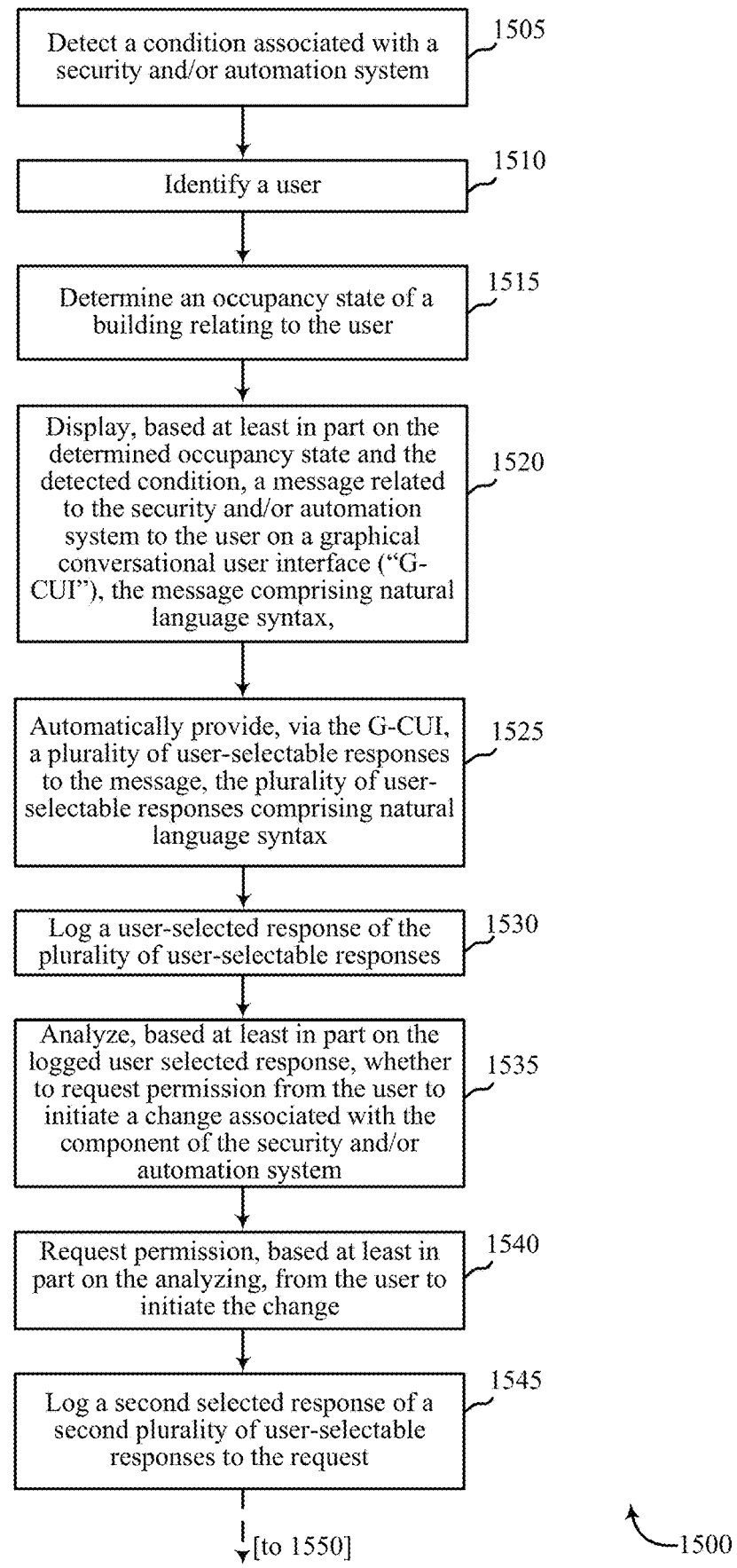
FIGS. 15A and 15B are flow diagrams illustrating a method relating to a security and/or an automation system that may utilize a G-CUI in accordance with various aspects of this disclosure.
Figure 15B:
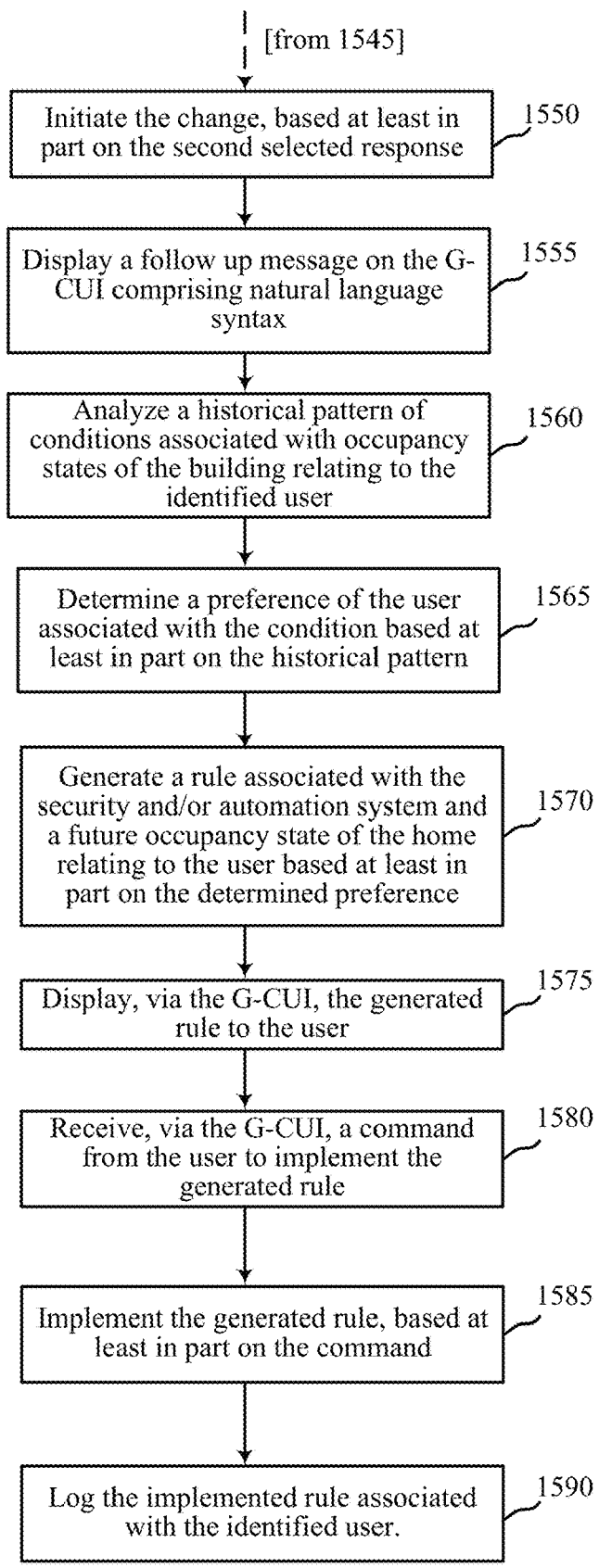

FIGS. 15A and 15B are flow diagrams illustrating a method 1500 relating to a security and/or an automation system that may utilize a G-CUI in accordance with various aspects of this disclosure. In some examples, method 1500 may be associated with generating rules related to security and/or automation system based at least in part on logged or otherwise store data. For clarity, the method 1500 is described below with reference to aspects of one or more of the methods 800 and 900 described with reference to FIGS. 8 and 9, and/or aspects of one or more of the methods 1200, 1400 described with reference to FIGS. 12 and 14. In some examples, a controller may execute one or more sets of codes to control the functional elements of the security and/or automation system to perform the functions described below. Additionally or alternatively, the controller may perform one or more of the functions described below using special-purpose hardware.

As illustrated in FIG. 15A, at block 1505, the method 1500 may include detecting a condition associated with the security and/or automation system, which may include in some examples a condition related to a component of the security and/or automation system. The operation(s) at block 1505 may be performed using one or more of the analyzers 315, 315-*a*, 315-*b*, condition detector 410, data analysis module 205, and sensors 125, 125-*a*, 125-*b*, described with reference to FIGS. 2-6.

At block 1510, the method 1500 may include identifying a user. In some examples the identifying may include correlating the user with a user profile. The operation(s) at block 1510 may be performed using the receivers 310, 310-*a*, analyzer 315, 315-*a*, 315-*b*, occupancy state determiner 405, data analysis module 205, database 120, 120-*a*, user profiles 150, 150-*a*, entity identifier 545, and sensors 125, 125-*a*, 125-*b*, described with reference to FIGS. 1-6.

At block 1515, the method 1500 may include determining an occupancy state of a building relating to a user. The operation(s) at block 1510 may be performed using one or more the analyzers 315, 315-*a*, 315-*b*, receivers 310, 310-*a*, occupancy state determiner 405, data analysis module 205, entity identifier 545, and sensors 125, 125-*a*, 125-*b*, described with reference to FIGS. 1-6.

At block 1520, the method 1500 may include displaying, based at least in part on the determined occupancy state and the detected condition, a message related to the security and/or automation system to the user on a G-CUI, the message including natural language syntax. The operation(s) at block 1520 may be performed using the receivers 310, 310-*a*, analyzers 315, 315-*a*, 315-*b*, transmitters 320, 320-*a*, G-CUI 135, 135-*a*, 135-*b*, 135-*c*, 135-*d*, message generator 415, observation module 210, communication module 215, described with reference to FIGS. 1-5.

At block 1525, the method 1500 may include automatically providing, via the G-CUI, a plurality of user-selectable responses to the message, the plurality of user-selectable responses including natural language syntax. In some examples the context of the message may be informational. The operation(s) at block 1520 The operation(s) at block 1440 and 1445 may be performed using one or more of the receivers 310, 310-*a*, analyzers 315, 315-*a*, transmitters 320, 320-*a*, G-CUI 135-*a*, 135-*b*, 135-*c*, 135-*d*, message generator 415, response analyzer 420, observation module 210, communication module 215, described with reference to FIGS. 2-5.

At block 1530, the method 1500 may include logging a user-selected response of the plurality of user-selectable responses. The operation(s) at block 1520 may be performed using at least one of the analyzers 315, 315-*a*, 315-*b*, database 120, 120-*a*, user profiles 150, 150-*a*, entity identifier 545, and data analysis module 205, described with reference to FIGS. 3-5.

At block 1535, the method 1500 may include analyzing, based at least in part on the logged user selected response, whether to request permission from the user to initiate a change associated with the component of the security and/or automation system. The operation(s) at block 1535 may be performed using the analyzers 315, 315-*a*, 315-*b*, transmitters 320, 320-*a*, message generator 415, observation module 210.

At block 1540, the method 1500 may include requesting permission, based at least in part on the analyzing, from the user to initiate the change. The operation(s) at block 1540 may be performed using one or more of the analyzers 315, 315-*a*, 315-*b*, receivers 310, 310-*a*, transmitters 320, 320-*a*, G-CUI 135-*a*, 135-*b*, 135-*c*, 135-*d*, response analyzer 420, change initiator 425, observation module 210, communication module 215, implementation module 220, described with reference to FIGS. 2-5.

At block 1545, the method 1500 may include logging a second selected response of a second plurality of user-selectable responses to the request. The operation(s) at block 1545 may be performed using at least one of the analyzers 315, 315-*a*, 315-*b*, database 120, 120-*a*, user profiles 150, 150-*a*, entity identifier 545, and data analysis module 205, described with reference to FIGS. 3-5.

As illustrated in FIG. 15B, at block 1550, the method 1500 may include initiating the change based at least in part on the second selected response. The operation(s) at block 1550 may be performed using one or more of the analyzers 315, 315-*a*, 315-*b*, receivers 310, 310-*a*, transmitters 320, 320-*a*, G-CUI 135-*a*, 135-*b*, 135-*c*, 135-*d*, response analyzer 420, change initiator 425, observation module 210, communication module 215, implementation module 220, described with reference to FIGS. 2-5.

At block 1555, the method 1500 may include displaying a follow up message on the G-CUI including natural language syntax. The operation(s) at block 1555 may be performed using one or more of the analyzers 315, 315-*a*, transmitters 320, 320-*a*, G-CUI 135-*a*, 135-*b*, 135-*c*, 135-*d*, message generator 415, observation module 210, communication module 215, described with reference to FIGS. 2-5.

At block 1560, the method 1500 may include analyzing a historical pattern of conditions associated with occupancy states of the building relating to the identified user. At block 1565, the method 1500 may include determining a preference of the user associated with the condition based at least in part on the historical pattern. The operation(s) at blocks 1560 and 1565 may be performed using analyzer 315, 315-*a*, 315-*b*, condition detector 410, occupancy state determiner 405, database 120, 120-*a*, user profiles 150, 150-*a*, entity identifier 545, data analysis module 205, and sensors 125, 125-*a*, 125-*b*, described with reference to FIGS. 1-5.

At block 1570, the method 1500 may include generating a rule associated with the security and/or automation system and a future occupancy state of the home relating to the user based at least in part on the determined preference. The operation(s) at block 1570 may be performed using at least one of analyzers 315, 315-*a*, 315-*b*, rule generator 430, change initiator 425, condition detector 410, occupancy state determiner 405, observation module 210, and implementation module 220 described with reference to FIGS. 2-5.

At block 1575, the method 1500 may include displaying, via the G-CUI, the generated rule to the user. The operation(s) at block 1575 may be performed using one or more of the analyzers 315, 315-*a*, transmitters 320, 320-*a*, G-CUI 135-*a*, 135-*b*, 135-*c*, 135-*d*, message generator 415, observation module 210, communication module 215 described with reference to FIGS. 2-5.

At block 1580, the method 1500 may include receiving, via the G-CUI, a command from the user to implement the generated rule. The operation(s) at block 1580 may be performed using one or more of the analyzers 315, 315-*a*, receivers 310, 310-*a*, G-CUI 135-*a*, 135-*b*, 135-*c*, 135-*d*, response analyzer 420, rule generator 430, change initiator 425, observation module 210, communication module 215, implementation module 220 described with reference to FIGS. 2-5.

At block 1585, the method 1500 may include implementing the generated rule, based at least in part on the command. The operation(s) at block 1585 may be performed using one or more of the analyzers 315, 315-*a*, G-CUI 135-*a*, 135-*b*, 135-*c*, 135-*d*, response analyzer 420, change initiator 425, observation module 210, implementation module 220 described with reference to FIGS. 2-5.

At block 1590, the method 1500 may include logging the implemented rule associated with the identified user. The operation(s) at block 1590 may be performed using at least one of the analyzers 315, 315-*a*, 315-*b*, database 120, 120-*a*, user profiles 150, 150-*a*, memory 510, entity identifier 545, and data analysis module 205, described with reference to FIGS. 3-5. It should be noted that the method 1400 is just one implementation and that the operations of the method 1400 may be rearranged or otherwise modified such that other implementations are possible.

Figure 16:
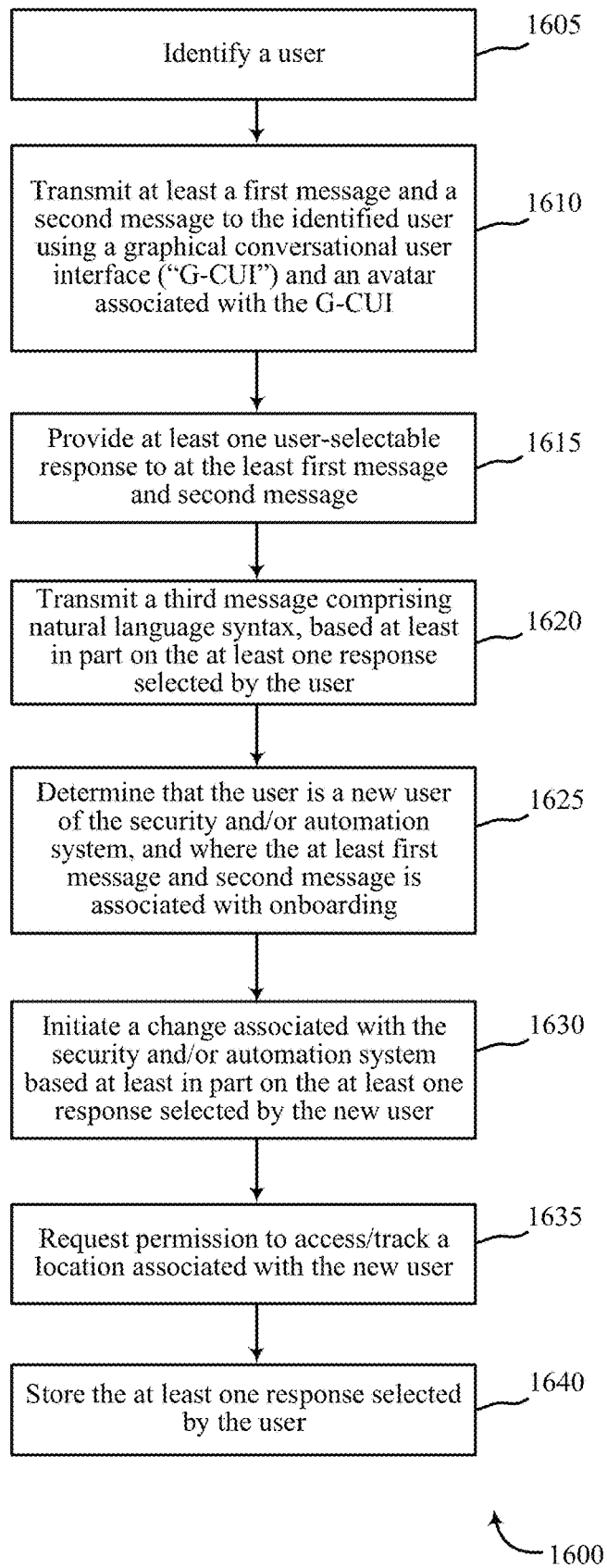
FIG. 16 is a flow diagram illustrating a method relating to a security and/or an automation system that may utilize a G-CUI in accordance with various aspects of this disclosure.

FIG. 16 is a flow diagram illustrating a method 1600 relating to a security and/or an automation system that may utilize a G-CUI in accordance with various aspects of this disclosure. In some aspects, the method 1600 may relate to facilitating communication between a user and a security and/or automation system using a G-CUI. In some examples of method 1600, an onboarding process may be facilitated for new users of a security and home automation system, or alternatively existing users of the security and home automation system who are nonetheless new users of the G-CUI (e.g., the onboarding may relate to the security and home automation system generally or specifically to use of the new G-CUI).

For clarity, the method 1600 is described below with reference to aspects of one or more of the methods 800 and 900 described with reference to FIGS. 8 and 9, and/or aspects of one or more of the methods 1200, 1400, and 1500 described with reference to FIGS. 12, 14, and 15.

In some examples, a controller, and/or device, and/or remote computing device, and/or a backend server and/or one or more sensors may execute one or more sets of codes or instructions to control the functional elements of the controller, and/or device, and/or remote computing device, and/or a backend server and/or one or more sensors to perform the functions described below. Additionally or alternatively, the controller, and/or device, and/or remote computing device, and/or a backend server and/or one or more sensors may perform one or more of the functions described herein using special-purpose hardware.

At block 1605, the method 1600 may include identifying a user. In some examples, determining the identity of the user may include determining a name (and in some examples, a preferred name, nickname, etc.) of the user. In some examples identifying the user may include determining that the user is a new (or relatively new) user of the security and/or automation system. The operation(s) at block 1605 may be performed using one or more of databases 120, 120-*a*, user profiles 150, 150-*a*, entity identifier 545, occupancy state determiner 405, and sensors 125, 125-*a*, 125-*b*, as described with reference to FIGS. 2-5.

At block 1610, the method 1600 may include transmitting at least a first message and a second message to the identified user using a G-CUI and an avatar associated with the G-CUI. Transmitting the first and the second messages may include determining not only the content of the messages but also the manner of communicating, including word choice and style. In some examples, the first message and the second message may be in natural language syntax form. In some examples, the manner of communicating may be based at least in part on certain classification describing the user (e.g., age, education level, nationality, geographic location, origin, ethnicity, gender, etc.). In some examples, the manner of communicating may be based at least in part on a user's word choice, language patterns, etc., and/or input provided by the user regarding a manner of communicating.

In some examples, the content of the first message may address the identified user by name. In some examples, the second message may covey information associated with the security and/or automation system. In some examples at least one of the at least first message and second message may include an explanation of at least one of an objective, or a purpose of the avatar.

In some examples, using the avatar associated with the G-CUI at block 1610 may include providing the user with the option to select an avatar. For example, different avatar and/or avatar types may include different communication styles, including the use of different language patterns, vernacular, frankness in communication, etc. In addition, icons may be associated with respective avatars, which for example may have different appearances of cartoonish persons, with different genders ages, complexions, ethnicity, dress, and other physical features. In some examples, an avatar may be selected for a user for example based at least in part on the identity of a user, and in some hybrid examples as may be selected for the user and then later changed by the user. Moreover, using the G-CUI and G-CUI avatar, a new user may be presented with a series of queries intended to configure the settings for a security and home automation system, as explained in more detail below.

At block 1615, the method 1600 may include providing at least one user-selectable response to the at least first message and second message. In some examples where the content of the first messages addresses the user, and the second message is informational, the at least one user-selectable response may be provided to the second (or subsequent) message. The user-selectable response may be provided via the G-CUI as a plurality of selectable responses. In some examples, the at least one user-selectable response may be close-ended. In some examples, the at least one user-selectable response may be open-ended, and provided by utilizing a keyboard interface.

At block 1620, the method 1600 may include transmitting a third message including natural language syntax, based at least in part on the response selected by the user. In some examples, the third message may not be transmitted until the response selected by the user is received. In other examples, after a threshold amount of time has passed since the user was provided the at least user-selectable response, without any response from the user, the third message may be transmitted based at least in part on, and the content of the third message may for example relate to, the lack of a user-selected response. For example, a predetermined waiting period within which a response is typically expected may serve as the threshold amount of time. In some examples, the waiting period may be determined based at least in part on timeframes in the past within which the user has responded, and/or based at least in part on a statistical analysis of timeframes within which users generally respond.

The operation(s) at blocks 1610, 1615, and 1620 may be performed using one or more of the receivers 310, 310-a, analyzers 315, 315-a, G-CUI 135-a, 135-b, 135-c, 135-d, message generator 415, transmitters 320, 320-a, response analyzer 420, observation module 210, communication module 215, described with reference to FIGS. 2-5.

At block 1625, the method 1600 may include determining that the user is a new user of the security and/or automation system, either as part of identifying the user at block 1605, or as some separate step. In some examples, at block 1625, the method 1600 may further include the at least first message and second message (including, for example, potentially the third message, and just one of the first message or the second message) being associated with onboarding. In some examples the content of the message associated with onboarding may present the new user with at least one query associated with onboarding and may provide the user with at least one user-selectable response to the at least one query.

At block 1630, the method 1600 may include initiating a change associated with the security and/or automation system based at least in part on the response selected by the new user. For example, where the user is determined to be a new user, the change may in some variations be associated with set up and initial preferences of the security and/or automation system. The operation(s) at block 1630 may be performed using one or more of the analyzers 315, 315-a, G-CUI 135-a, 135-b, 135-c, 135-d, response analyzer 420, change initiator 425, observation module 210, and implementation module 220 described with reference to FIGS. 2-5.

At block 1635, the method 1600 may include requesting permission to access/track a location associated with the new user. The request or query may be included in, or may be additional to the at least first message and second message. Based at least in part on the user's response, tracking the user may then be performed. This may assist the system in analyzing and forming observations relating to the user, and may be just one of multiple questions relating to onboarding. One query associated with onboarding that requests permission to track a location associated with the new user may entail performing the tracking based on the user's response. The operation(s) at block 1635 may be performed using one or more of the analyzers 315, 315-a, G-CUI 135-a, 135-b, 135-c, 135-d, message generator 415, response analyzer 420, change initiator 425, observation module 210, implementation module 220 described with reference to FIGS. 2-5

At block 1640, the method 1600 may include storing the at least one response selected by the user. The stored responses may be associated with the identified user and may influence subsequent communications between the user and system. The operation(s) at block 1605 may be performed using one or more analyzers 315, 315-a, 315-b, database 120, 120-a, user profiles 150, 150-a, entity identifier 545, and data analysis module 205, described with reference to FIGS. 3-5. It should be noted that the method 1600 is just one implementation and that the operations of the method 1600 may be rearranged or otherwise modified such that other implementations are possible.

Figure 17:
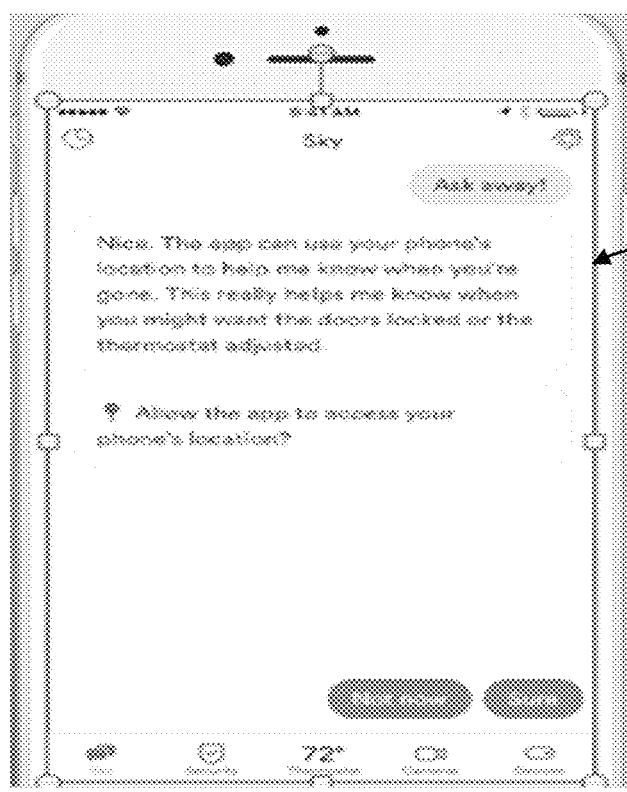
FIGS. 17A and 17B show block diagrams of an apparatus relating to a security and/or an automation system that may utilize a G-CUI in accordance with various aspects of this disclosure.

FIGS. 17A and 17B show block diagrams of an apparatus relating to a security and/or an automation system that may utilize a G-CUI in accordance with various aspects of this disclosure. The apparatus may be or include a device 105-f, which may be similar in one more aspects to device 105, 105-a, 105-b, 105-c, 105-d, 105-e of FIGS. 1, 5, 7, 10, 11, 13. The device 105-f may include a display 130-d, which in one or more aspects may be similar to displays 130, 130-a, 130-b, 130-c of FIGS. 1, 10, 11, 13.

In some examples the display 130-d may be or include all or part of a G-CUI 135-e, which may be similar in some aspects to the G-CUIs 135, 135-a, 135-b, 135-c, 135-d of FIGS. 1, 3, 4, 5, 13, which may assist in some aspects to the security and/or automation system. The display 130-d and/or the G-CUI 135-e may include a title section 1010-c, message section 1015-c and/or user response section 1020-c, which may each be similar in one or more aspects to title sections 1010, 1010-a, 1010-b message sections 1015, 1015-a, 1015-b and user response sections 1020, 1020-a, 1020-b depicted in FIGS. 10, 11 and 13.

As shown in FIG. 17A, the message section 1015-c may include one or more messages relating to facilitating onboarding for the new user. For example, the content of one or more messages may include addressing a user by name, introducing an avatar related to the security and/or automation system, and expressing a purpose of the avatar and/or G-CUI, and an explanation of the capacities of the avatar and/or G-CUI. In some examples, at least one message may convey information related to the security and/or automation system, including for example a condition related to or status of one or more components of the security and/or automation system. In some examples, at least one message may include an observation regarding the security and/or automation system. In some examples, at least one message may include a query or request for permission to initiate a change to the security and/or automation system. In some examples, the change may also relate to the user.

The display 130-d and/or the G-CUI 135-e may also include a user response section 1020-c. In some examples, the user response section 1020-c may (but need not necessarily) be located near the bottom of the display 130-d/G-CUI 135-e. In some examples, the user response section 1020-d may include a plurality of user-selectable responses or in some examples a single user-selectable response (as shown).

As shown in FIG. 17B, in some examples, once a response is selected by the user, the response may then appear in the message section 1015-b. In some examples, and triggered by or based at least in part by the selected response indicating that the user is ready to be presented with additional onboarding information, a message may be displayed in the message section 1015-c relating to such additional onboarding information. For example, a message may be displayed requesting to track the location of the new user, along with an explanation for the request, followed by a second plurality of user-selectable responses (or alternatively, a single user-selectable response). In some examples, one or more rules (e.g., associated with setup of the security and/or automation system) may be generated based at least in part on the user's responses relating to onboarding.

Figure 18:
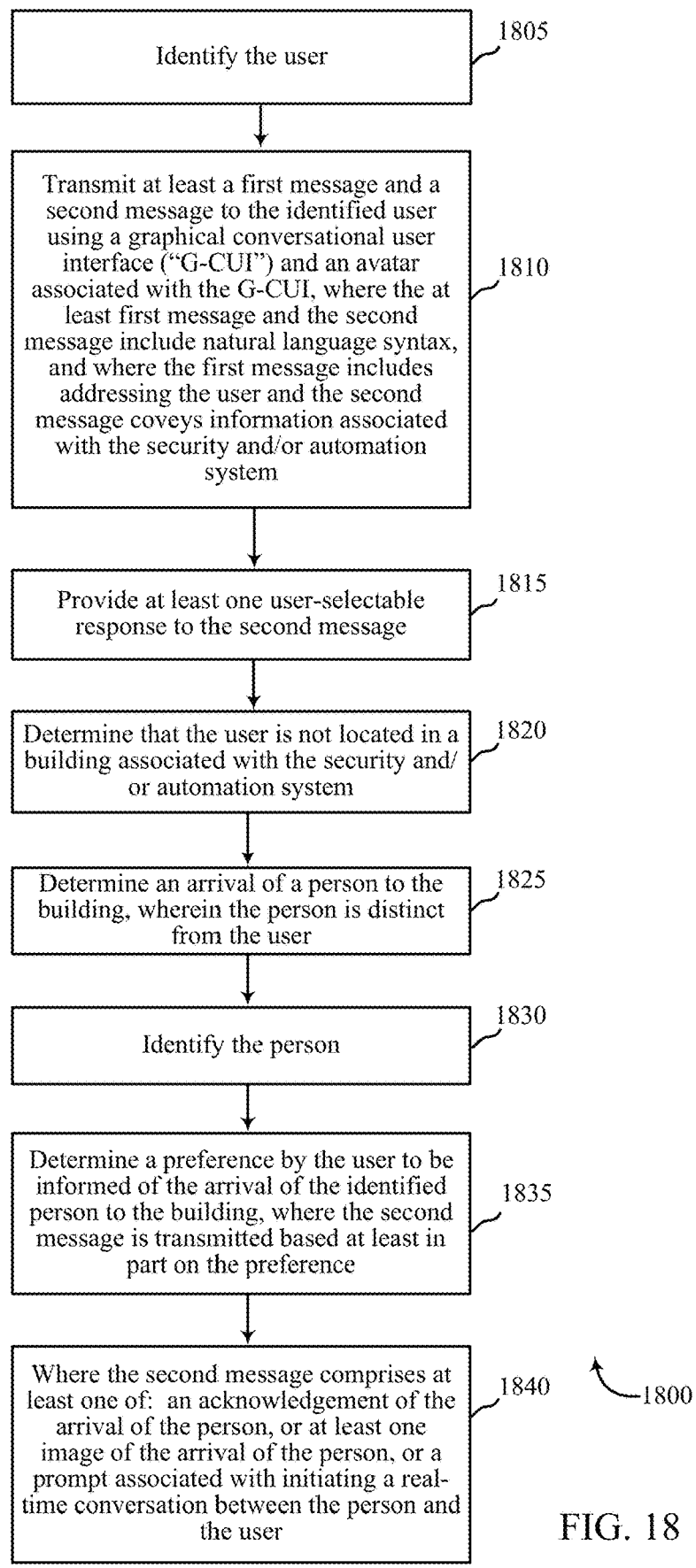
FIG. 18 is a flow diagram illustrating a method relating to a security and/or an automation system that may utilize a G-CUI in accordance with various aspects of this disclosure.

FIG. 18 is a flow diagram illustrating a method 1800 relating to a security and/or an automation system that may utilize a G-CUI in accordance with various aspects of this disclosure. In some examples, the method may relate to communication between a security and/or automation system and the user, to assist for examples with managing the system.

For clarity, the method 1800 is described below with reference to aspects of one or more of the methods 800 and 900 described with reference to FIGS. 8 and 9, and/or aspects of one or more of the 1200, 1400, 1500, and 1600 described with reference to FIGS. 12, 14, 15, and 16. In some examples, a controller (e.g., a control panel), device, and/or remote computing device, may execute one or more sets of codes to control the functional elements of the security and/or automation system and components thereof to perform the functions described below. Additionally or alternatively, the controller, device, and/or remote computing device may perform one or more of the functions described below using special-purpose hardware.

At block 1805, the method 1800 may include identifying the user. In some examples, the identifying may involve matching data provided from a sensor (e.g., facial recognition data, a "motion signature" identifying a user by particular movement such as gate, or certain with a particular user profile, and/or biometric data) with a particular user profile. In some examples, the identifying may be associated with some passcode or other input provided by the user, and/or by the user's possession of a particular device that may uniquely identify the user. In some examples, the user may be identified as a guest. The operation(s) at block 1805 may be performed using one or more of databases 120, 120-a, user profiles 150, 150-a, entity identifier 545, occupancy state determiner 405, and sensors 125, 125-a, 125-b, as described with reference to FIGS. 2-5.

At block 1810, the method 1800 may include transmitting at least a first message and a second message to the identified user using a G-CUI and an avatar associated with the G-CUI, wherein the at least first message and the second message include natural language syntax, and wherein the first message includes addressing the user and the second message coveys information associated with the security and/or automation system.

At block 1815, the method 1800 may include providing at least one user-selectable response to the second message. In some examples, the at least one user-selectable response to the second message may include at least one of a confirmation that some or none of the persons or the users are located in the building, and/or on the building premises.

In some examples, the at least one user-selectable response may additionally or alternatively include a command to perform at least one task associated with the at least one component of the security and/or automation system. In some examples, if the user selects the command to perform the at least one task, the method 1800 may further include performing the at least one task and providing the user with a third message including an acknowledgement of the command and a new status update associated with the performing.

The operation(s) at blocks 1810 and 1815 may be performed using one or more of the receivers 310, 310-a, analyzers 315, 315-a, G-CUI 135-a, 135-b, 135-c, 135-d, message generator 415, transmitters 320, 320-a, response analyzer 420, observation module 210, communication module 215, described with reference to FIGS. 2-5.

At block 1820, the method 1800 may include determining that the user is not located in a building associated with the security and/or automation system. In some examples, the method 1800 may include determining that several users, or some of a plurality of users or other persons or entities are not located in a building and/or on the building premises associated with the security and/or automation system. In some related examples, the at least first message and second message (and in some examples, the second message) may include an indication that one or some or none of the persons or the users are located in the building, and additionally or alternatively a status update associated with at least one component of the security and/or automation system. Thus, in some examples, the determining at block 1820 may occur prior to the transmitting at block 1810 and/or occur prior to the providing at block 1815. In addition, like any other step or block, block 1820 may be incorporated in whole or part in any other flowchart and performed in conjunction with any other steps thereof.

At block 1825, the method 1800 may include determining an arrival of a person to the building, wherein the person is distinct from the user. The operation(s) at blocks 1820 and 1825 may be performed using one or more of the receivers 310, 310-a, analyzers 315, 315-a, G-CUI 135-a, 135-b, 135-c, 135-d, transmitters 320, 320-a, response analyzer 420, occupancy state determiner 405, observation module 210, communication module 215, described with reference to FIGS. 2-5.

At block 1830, the method 1800 may include identifying the person. Some examples may include identifying a plurality of persons associated with the security and/or automation system and/or with the building premises. The operation(s) at block 1830 may be performed using one or more of databases 120, 120-a, user profiles 150, 150-a, entity identifier 545, occupancy state determiner 405, and sensors 125, 125-a, 125-b, as described with reference to FIGS. 2-5.

At block 1835, the method 1800 may include determining a preference by the user to be informed of the arrival of the identified person to the building, wherein the second message is transmitted based at least in part on the preference. In one example, a particular parent may prefer to know when his/her child has arrived at a home (or any other specified location—e.g., a school. The operation(s) at block 1835 may be performed using one or more of the analyzers 315, 315-a, 315-b, user profiles 150, 150-a, entity identifier 545, and data analysis module 205, described with reference to FIGS. 2-5.

At block 1840, the method 1800 may involve the second message including at least one of: an acknowledgement of the arrival of the person, or at least one image or video of the arrival of the person, or a prompt associated with initiating a real-time conversation between the person and the user (using for example a camera having a microphone). In some examples, the system may inform the parent with a preference for being informed of the arrival of the child (but in some examples not necessarily another parent who does not share the preference) of the arrival of the child to the home. For example, the parent may be informed of the arrival of the child by displaying at least one image or video imaging of the arrival of the child to the home. It should be noted that the method 1800 is just one implementation and that the operations of the method 1800 may be rearranged or otherwise modified such that other implementations are possible.

Figure 19:
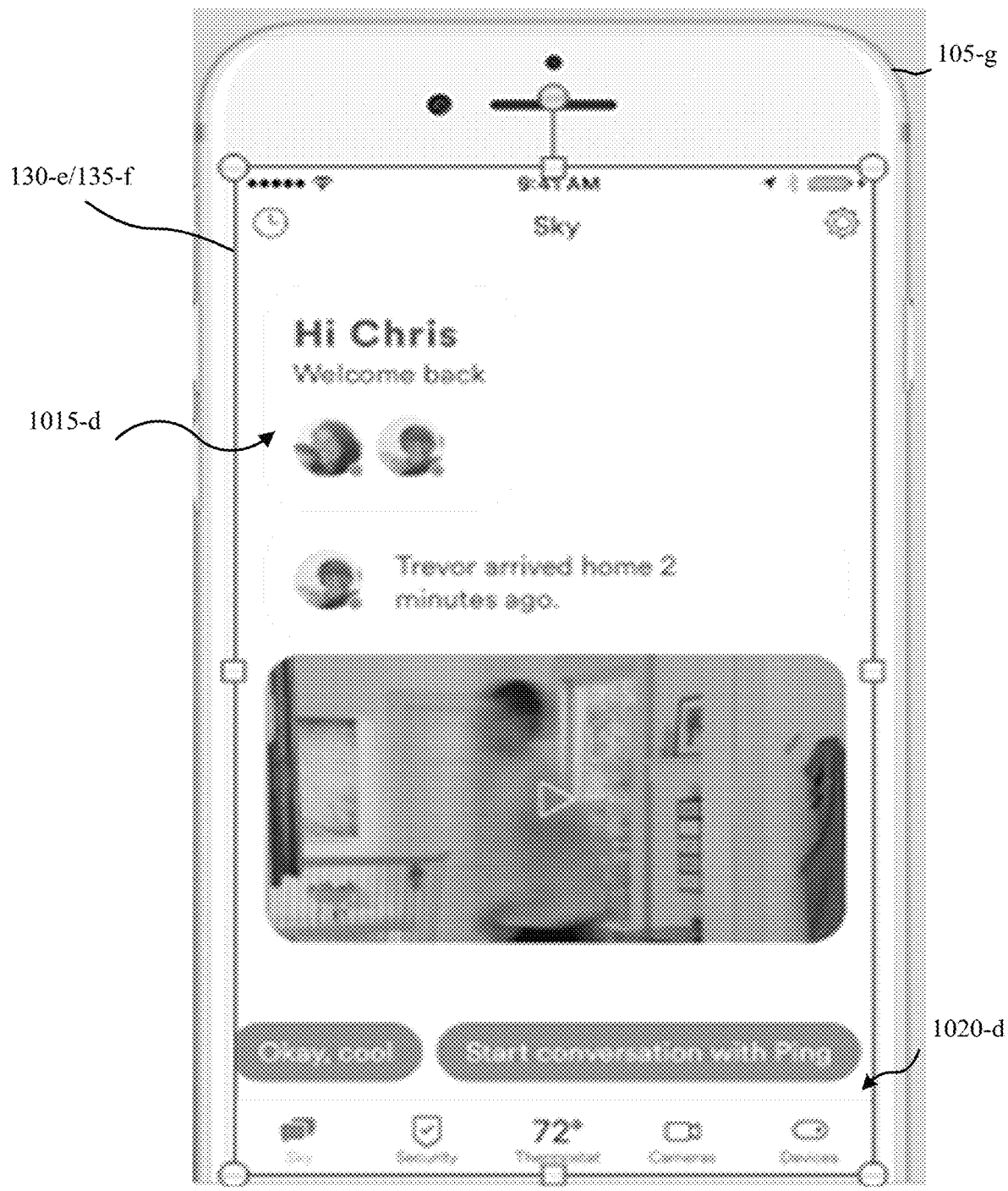
FIG. 19 shows a block diagram of an apparatus relating to a security and/or an automation system that may utilize a G-CUI in accordance with various aspects of this disclosure.

FIG. 19 shows a block diagram of an apparatus relating to a security and/or an automation system that may utilize a G-CUI in accordance with various aspects of this disclosure. The apparatus may be or include a device 105-g, which may be similar in one more aspects to device 105, 105-a, 105-b, 105-c, 105-d, 105-e, 105-f of FIGS. 1, 5, 7, 10, 11, 13, 17A, 17B. The device 105-g may include a display 130-e, which in one or more aspects may be similar to displays 130, 130-a, 130-b, 130-c, 130-d of FIGS. 1, 10, 11, 13, 17A, 17B.

In some examples the display 130-e may be or include all or part of a G-CUI 135-f, which may be similar in some aspects to the G-CUIs 135, 135-a, 135-b, 135-c, 135-d, 135-e of FIGS. 1, 3, 4, 5, 13, 17A, 17B, which may assist in some aspects related to the security and/or automation system. The display 130-e and/or the G-CUI 135-f may include a message section 1015-d and a user response section 1020-d, which may each be similar in one or more aspects to message sections 1015, 1015-*a*, 1015-*b*, 1015-*c* and user response sections 1020, 1020-*a*, 1020-*b*, 1020-*c* depicted in FIGS. 10, 11, 13, 17A and 17B.

As shown in FIG. 19, the message section 1015-*d* may include one or more messages relating to a user's preference, setting, and/or rule relating to the security and/or automation system. For example, the user (e.g., a working parent) may have a preference or setting to be informed/sent a message whenever his son returns home. Based at least in part on that preference, a rule may have been generated and implemented to send the user a message whenever his son returns home (e.g., from school) while the parent is working, which message may be displayed in the message section 1015-*d*. Relatedly, in some examples, implementing the rule may be based at least in part on the occupancy state of the user (e.g., "away," "away at the office," etc.). In addition, the user may prefer to have a conversation—or at least have the option to start a conversation—with his son whenever his son returns home, and a rule may have already been generated and implemented to that end.

The display 130-*e* and/or the G-CUI 135-*f* may also include a user response section 1020-*d*. In some examples, the user response section 1020-*d* may (but need not necessarily) be located near the bottom of the display 130-*e*/G-CUI 135-*f*. In some examples, the user response section 1020-*d* may include a plurality of user-selectable responses or in some examples a single user-selectable response (as shown).

For instance, as shown in FIG. 19, in some examples based at least in part on the user's stated preference above, the user may be provided via the G-CUI with a plurality of user-selectable responses, which may provide the user with the option to start a conversation with his son via a camera of the security and/or automation system having a microphone and speaker.

Figure 20:
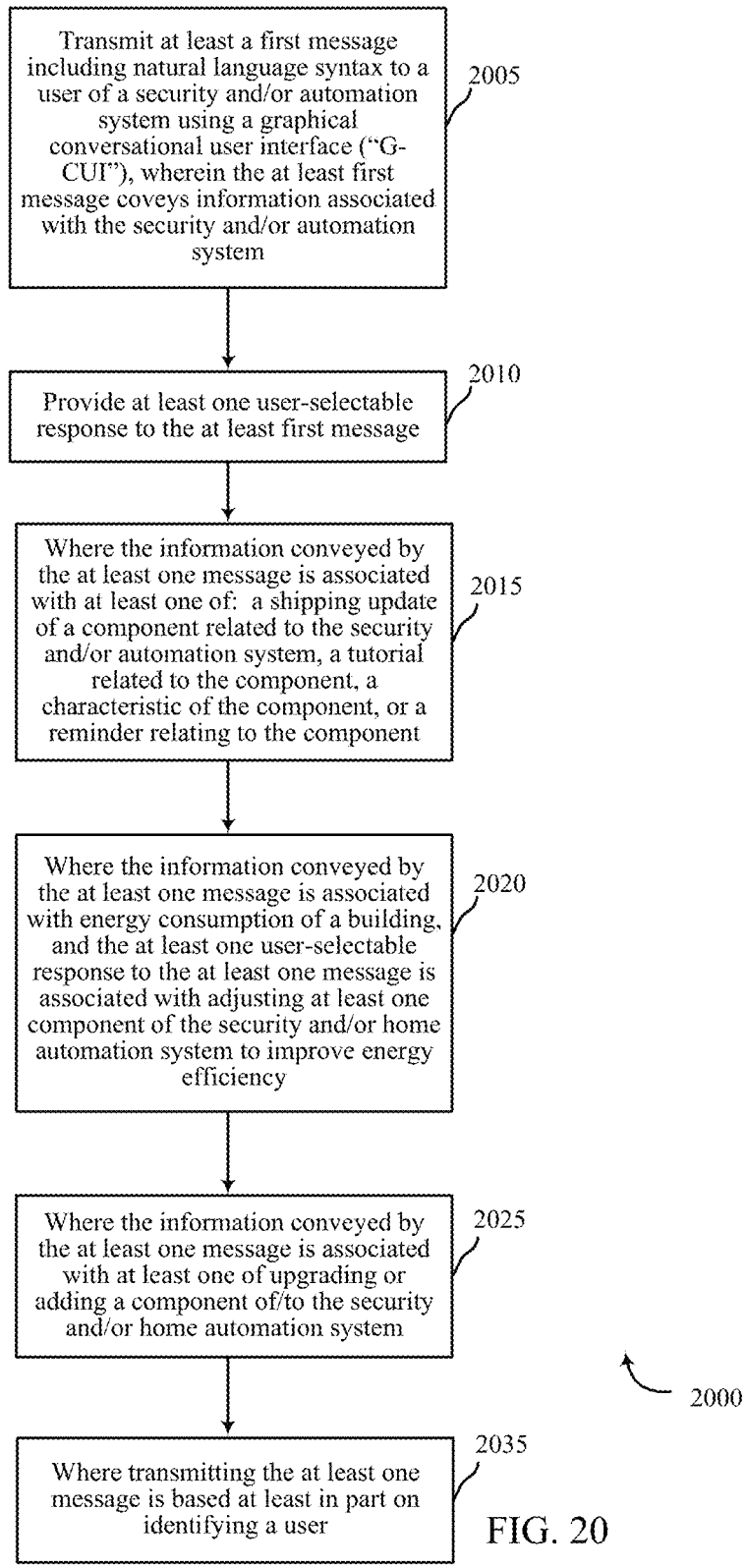
FIG. 20 is a flow diagram illustrating a method relating to a security and/or an automation system that may utilize a G-CUI in accordance with various aspects of this disclosure.

FIG. 20 is a flow diagram illustrating a method 2000 relating to a security and/or an automation system that may utilize a G-CUI in accordance with various aspects of this disclosure. In some examples of method 2000, a user may be sent informational messages of observations and recommendations regarding past, present, and future operations of the security and home automation system. For clarity, the method 2000 is described below with reference to aspects of one or more of the methods 800 and 900 described with reference to FIGS. 8 and 9, and/or aspects of one or more of the methods 1200, 1400, 1500, 1600, and 1800 described with reference to FIGS. 12, 14-16, and 18. In some examples, a controller (e.g., a control panel), device, and/or remote computing device, may execute one or more sets of codes to control the functional elements of the security and/or automation system and components thereof to perform the functions described below. Additionally or alternatively, the controller, device, and/or remote computing device may perform one or more of the functions described below using special-purpose hardware.

At block 2005, the method 2000 may include transmitting at least a first message including natural language syntax to a user of a security and/or automation system using a G-CUT, wherein the at least first message coveys information associated with the security and/or automation system. In some examples the transmitting may also use an avatar associated with the G-CUI. In some examples, the at least one message may include an initial or introductory message addressing the user and a second message conveying the information associated with the security and/or automation system.

At block 2010, the method 2000 may include providing at least one user-selectable response to the at least first message.

At block 2015, the method 2000 may include the information conveyed by the at least one message being associated with at least one of: a shipping update of a component related to the security and/or automation system, a tutorial related to the component, a characteristic of the component, or a reminder relating to the component. A characteristic of the component may include, for example, a battery level, and the tutorial related to the component may be directed to, for example, how to replace the batteries (e.g., of the specific component). In some examples, the tutorial could be a short instructional video on how to use a component (e.g., a recently purchased component).

At block 2020, the method 2000 may include the information conveyed by the at least one message being associated with energy consumption of a building, and the at least one user-selectable response to the at least one message being associated with adjusting at least one component of the security and/or home automation system to improve energy efficiency. For example, the at least one message may provide a summary of building (which may be a home) energy consumption, including energy consumption of different components and/or parts of a building premises, and/or comparisons with energy consumption associated with the building at other times of the year and/or at the same time of the year but during a different year, and/or with an optimal and/or expected and/or acceptable range level of energy consumption.

At block 2025, the method 2000 may include the information conveyed by the at least message being associated with at least one of upgrading of, or adding a component to, the security and/or home automation system. In some examples, the at least one message may recommend adjusting some aspect and/or component of the system to improve energy efficiency, and in some examples such a recommendation may be based on reported home energy consumption (e.g., block 2020). In some instances, the recommendation regarding improving energy efficiency may relate to other components (e.g., devices) or services that the user could obtain. For example, the method 2000 may involve a determination that upgrading the system with the purchase of a particular thermostat may better improve energy consumption.

At block 2035, the method 2000 may include the transmitting the at least one message being based at least in part on identifying a user. For examples, in some variations a particular user may be designated for receiving a message regarding when a battery of a sensor should be changed. Alternatively, a particular user's profile may be associated with a certain component of the system (for example, based on a historic action of the user associated with the certain component), and therefore the at least one may be transmitted to the particular user if the information relates to the certain component.

The operation(s) at blocks 2005, 2010, 2015, 2020, 2025, 2030, and 2035 may be performed using one or more of the receivers 310, 310-*a*, analyzers 315, 315-*a*, G-CUI 135-*a*, 135-*b*, 135-*c*, 135-*d*, message generator 415, transmitters 320, 320-*a*, response analyzer 420, observation module 210, communication module 215, occupancy state determiner 405, data analysis module 205, change initiator 425, implementation module 220, energy efficiency measurer 550, and sensors 125, 125-*a*, 125-*b* described with reference to FIGS. 1-5.

It should be noted that the method 2000 is just one implementation and that the operations of the method 2000 may be rearranged or otherwise modified such that other implementations are possible.

Figure 21A:
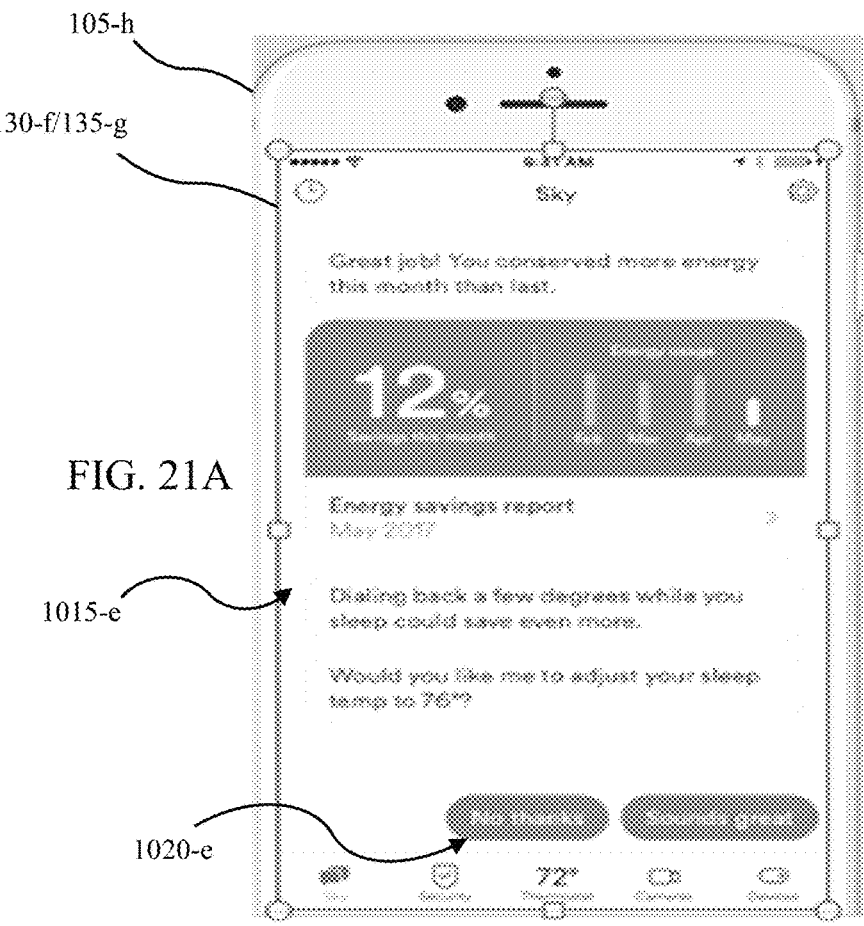
FIGS. 21A and 21B show block diagrams of an apparatus relating to a security and/or an automation system that may utilize a G-CUI in accordance with various aspects of this disclosure.
Figure 21B:
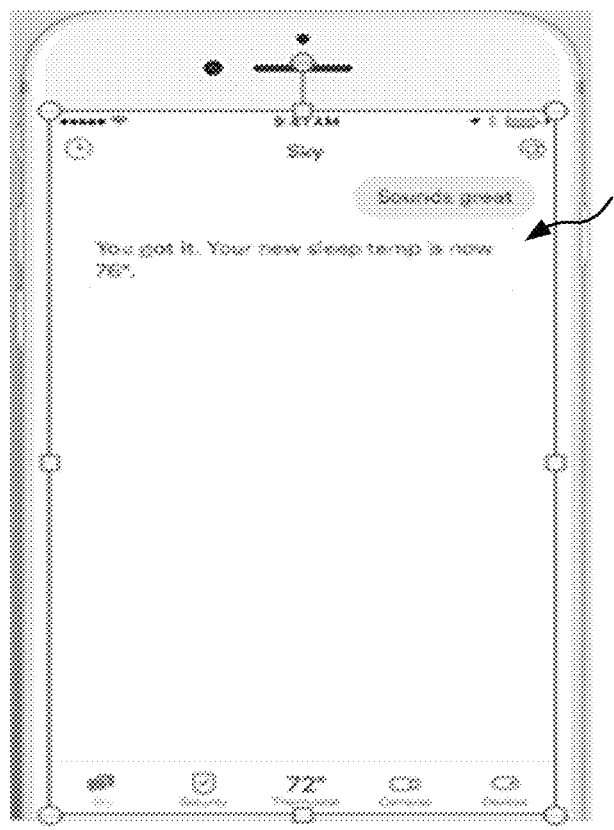

FIGS. 21A and 21B show block diagrams of an apparatus relating to a security and/or an automation system that may utilize a G-CUI in accordance with various aspects of this disclosure. The apparatus may be or include a device 105-$h$, which may be similar in one more aspects to device 105, 105-$a$, 105-$b$, 105-$c$, 105-$d$, 105-$e$, 105-$f$, 105-$g$ of FIGS. 1, 5, 7, 10, 11, 13, 17A, 17B, 19. The device 105-$h$ may include a display 130-$f$, which in one or more aspects may be similar to displays 130, 130-$a$, 130-$b$, 130-$c$, 130-$d$, 130-$e$ of FIGS. 1, 10, 11, 13, 17A, 17B, 19.

In some examples the display 130-$f$ may be or include all or part of a G-CUI 135-$g$, which may be similar in some aspects to the G-CUIs 135, 135-$a$, 135-$b$, 135-$c$, 135-$d$, 135-$e$, 135-$f$ of FIGS. 1, 3, 4, 5, 13, 17A, 17B, 19, which may assist in some aspects related to the security and/or automation system. The display 130-$f$ and/or the G-CUI 135-$g$ may include a message section 1015-$e$ and a user response section 1020-$e$, which may each be similar in one or more aspects to message sections 1015, 1015-$a$, 1015-$b$, 1015-$c$, 1015-$d$ and user response sections 1020, 1020-$a$, 1020-$b$, 1020-$c$, 1020-$d$ depicted in FIGS. 10, 11, 13, 17A, 17B and 19.

As shown in FIG. 21A, the message section 1015-$e$ may include one or more messages relating energy consumption in a home. In some examples, such messages may be intended to encourage decisions and/or behavior by a user that conserves energy and/or improves energy efficiency. For example, periodic (e.g., monthly) or instantaneously-provided (at a user's request) reports may be displayed on the display 130-$f$ and/or the G-CUI 135-$g$ in the message section 1015-$e$. In some examples, observations and/or suggested actions for conserving additional energy may further be displayed on the display 130-$f$ and/or the G-CUI 135-$g$ in the message section 1015-$e$. In some examples, such observations and/or suggestions may be based at least in part on a user's preference, setting, rule, past behavior, and/or other action relating to the building, the security and/or automation system, and/or energy conservation in general. As with many aspects described herein, applications relating to energy conservation, etc., need not always require utilization of a G-CUI. In addition or alternatively, aspects relating to the aforementioned reports may be utilized in applications other than those associated with energy conservation.

In some examples, the response section 1020-$e$ may (but need not necessarily) be located near the bottom of the display 130-$e$/G-CUI 135-$f$. In some examples, the user response section 1020-$d$ may include a plurality of user-selectable responses or in some examples a single user-selectable response (as shown). In some examples, the system may initiate one or more actions relating to energy conservation based at least in part on the user's selected response, as shown in FIG. 21B, which may be confirmed in a follow up message shown in the message section 1015-$e$.

FIGS. 22A, 22B and 22C show block diagrams of an apparatus relating to a security and/or an automation system that may utilize a G-CUI in accordance with various aspects of this disclosure. The apparatus may be or include a device 105-$i$, which may be similar in one or more aspects to device 105, 105-$a$, 105-$b$, 105-$c$, 105-$d$, 105-$e$, 105-$f$, 105-$g$, 105-$h$ of FIGS. 1, 5, 7, 10, 11, 13, 17A, 17B, 19, 21. The device 105-$i$ may include a display 130-$g$, which in one or more aspects may be similar to displays 130, 130-$a$, 130-$b$, 130-$c$, 130-$d$, 130-$e$, 130-$f$ of FIGS. 1, 10, 11, 13, 17A, 17B, 19, 21.

In some examples the display 130-$g$ may be or include all or part of a G-CUI 135-$h$, which may be similar in some aspects to the G-CUIs 135, 135-$a$, 135-$b$, 135-$c$, 135-$d$, 135-$e$, 135-$f$, 130-$g$ of FIGS. 1, 3, 4, 5, 13, 17A, 17B, 19, 21, which may assist in some aspects related to the security and/or automation system. The display 130-$g$ and/or the G-CUI 135-$h$ may include a message section 1015-$f$ and a user response section 1020-$f$, which may each be similar in one or more aspects to message sections 1015, 1015-$a$, 1015-$b$, 1015-$c$, 1015-$d$, 1015-$e$ and user response sections 1020, 1020-$a$, 1020-$b$, 1020-$c$, 1020-$d$, 1020-$e$ depicted in FIGS. 10, 11, 13, 17A, 17B, 19, 21.

As shown in FIG. 22A, the message section 1015-$f$ may include an update relating to a component of the security and/or automation system. By way of another example, once a new piece of equipment is ordered, the user may be sent a shipping status update displayed via the G-CUI 135-$h$ in the message section 1015-$f$. In some examples, a message may include an option to view a shipping status, as shown in FIG. 22A, which option may not necessarily require selecting a user-selectable response in the response section 1020-$f$ in order to view.

In some examples, a single user-selectable response may result in (e.g., thereby signaling that the user may be ready for) additional messages being displayed. For example, selecting a response may lead to another message or sequence of messages being displayed, the content of which may be associated with or logically flow from (e.g., a follow up message), or may not be associated with, the content of a previous message or sequence of messages.

For example, as shown in FIG. 22B, while a piece of equipment or component of the security and/or automation system is in the process of being shipped, a user may be presented with the option of viewing a tutorial related to the equipment (e.g., how to operate, set up, the new equipment) via one or more messages displayed in the message section 1015-$f$. Some messages displayed in the message section 1015-$f$ (such as the tutorial), may have a video format. Thus, in some examples, the G-CUI 135-$h$ may present messages of various formats and functionalities, and may permit seamless transitioning from different operations of various formats in a single platform (e.g., a single G-CUI 135-$h$). Accordingly, in one aspect, the platform may in some respects be considered an app having/utilizing a plurality of mini-apps (e.g., for showing tutorials, purchasing, viewing shipping updates, etc.). Such a platform may be convenient for a user by potentially rendering many steps (e.g., visiting websites and/or opening multiple applications) unnecessary that may otherwise be needed for users to learn the same information and/or accomplish similar tasks.

Relatedly, as shown in FIG. 22C, a user may be presented via displaying in the message section 1015-$f$, an option to learn more about how to operate or better utilize a component and/or certain functionalities thereof. Such a message may be displayed based at in least in part on, for example, a user action or inaction regarding the component, perhaps indicating that the component and/or functionality thereof is being under-utilized, not utilized at all, or misunderstood.

Alternatively, the message relating to instruction about a component or piece of equipment may relate to a component that is not yet a part of the security and/or automation system. In some examples, such a message may assist a user in exploring the benefits of adding such a component to the system. In some examples, if the user responds indicating interest in learning more about the component, the user may be directed outside the platform (e.g., G-CUI 135-$h$) to a website of provider of the component for more information.

In some examples, the website may be visited within the platform. Alternatively, or in addition, in some examples a commerce transaction may occur within the G-CUI's 135-*h* chat interface. Thus, relatedly, the G-CUI 135-*h* may include a combination of text chat content and widgets not normally included in common chatbots.

FIGS. 23A, 23B and 23C show block diagrams of an apparatus relating to a security and/or an automation system, in accordance with various aspects of this disclosure. The apparatus may be or include a device 105-*j*, which may be similar in one more aspects to device 105, 105-*a*, 105-*b*, 105-*c*, 105-*d*, 105-*e*, 105-*f*, 105-*g*, 105-*h*, 105-*i* of FIGS. 1, 5, 7, 10, 11, 13, 17A, 17B, 19, 21, 22. The device 105-*j* may include a display 130-*h*, which in one or more aspects may be similar to displays 130, 130-*a*, 130-*b*, 130-*c*, 130-*d*, 130-*e*, 130-*f*, 130-*g* of FIGS. 1, 10, 11, 13, 17A, 17B, 19, 21, 22.

In some examples the display 130-*h* may be or include all or part of a G-CUI 135-*i*, which may be similar in some aspects to the G-CUIs 135, 135-*a*, 135-*b*, 135-*c*, 135-*d*, 135-*e*, 135-*f*, 130-*g*, 130-*h* of FIGS. 1, 3, 4, 5, 13, 17A, 17B, 19, 21, 22, which may assist in some aspects related to the security and/or automation system. The display 130-*h* and/or the G-CUI 135-*i* may include a message section 1015-*g* and a user response section 1020-*g*, which may each be similar in one or more aspects to message sections 1015, 1015-*a*, 1015-*b*, 1015-*c*, 1015-*d*, 1015-*e*, 1015-*f* and user response sections 1020, 1020-*a*, 1020-*b*, 1020-*c*, 1020-*d*, 1020-*e*, 1020-*f* depicted in FIGS. 10, 11, 13, 17A, 17B, 19, 21, 22.

As shown in FIG. 23A, the message section 1015-*g* may include an observation relating to energy efficiency of the security and/or automation system and/or a component thereof. The observation may be based at least in part on, in some examples, data provided by a sensor related to energy efficiency. The observation may also include, for example, a suggested action to take to improve energy efficiency. For instance, a message may be displayed via the message section 1015-*g* of the G-CUI 135-*i* that may note to a user that a component or subsystem of the security and/or automation system, such as an HVAC system, is performing at a lower than expected efficiency level. This observation may be based at least in part, for example, on data provided by an HVAC system sensor. In some examples, based at least in part of some analysis of the provided data, the determined efficiency level, and or the condition of a consumable component (e.g., the air filter), a message may be displayed in the message section 1015-*g* suggesting that an air filter be replaced.

As shown in FIG. 23B, in some examples based at least in part on a response (e.g., a user-selectable response in the user response section 1020-*g*) from the user, a message may be displayed in the message section 1015-*g* requesting permission or presenting the user with the option to order a new component (e.g., a new air filter). In some examples, a type of air filter including size dimensions thereof may already be known to the system and may be confirmed to the user.

As shown in FIG. 23C, in some examples, if the user grants permission to order the new component (e.g., the new air filter), the item may be added to a shopping cart and/or purchased without the user having to leave the G-CUI platform. In other embodiments, a link to another destination where purchase of the component may be completed may be displayed in the message section 1015-*g*. In this manner, conventional methods for determining that consumable components should be replaced and then purchasing the consumable component may be streamlined and made more user friendly. A "consumable component" may refer, in some examples, to any component that will need to be regularly and periodically be replaced over the life cycle of a building.

Figure 24:
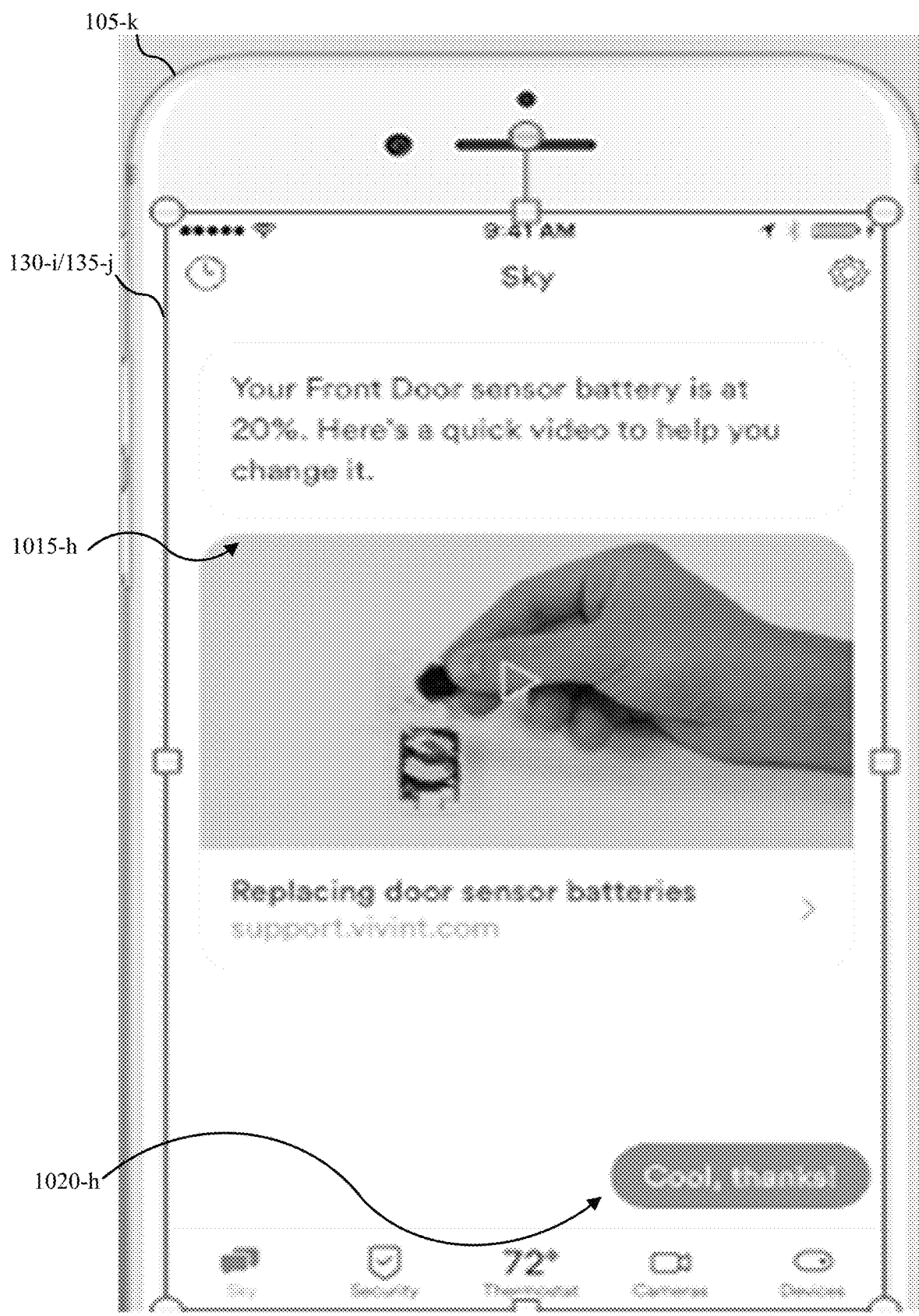
FIG. 24 show a block diagram of an apparatus relating to a security and/or an automation system that may utilize a G-CUI in accordance with various aspects of this disclosure.

FIG. 24 shows a block diagram of an apparatus relating to a security and/or an automation system that may utilize a G-CUI in accordance with various aspects of this disclosure. The apparatus may be or include a device 105-*k*, which may be similar in one or more aspects to device 105, 105-*a*, 105-*b*, 105-*c*, 105-*d*, 105-*e*, 105-*f*, 105-*g*, 105-*h*, 105-*i*, 105-*j* of FIGS. 1, 5, 7, 10, 11, 13, 17A, 17B, 19, 21, 22, 23A, 23B, 23C. The device 105-*k* may include a display 130-*i*, which in one or more aspects may be similar to displays 130, 130-*a*, 130-*b*, 130-*c*, 130-*d*, 130-*e*, 130-*f*, 130-*g*, 130-*h* of FIGS. 1, 10, 11, 13, 17A, 17B, 19, 21-23C.

In some examples the display 130-*i* may be or include all or part of a G-CUI 135-*j* (or vice versa), which may be similar in some aspects to the G-CUIs 135, 135-*a*, 135-*b*, 135-*c*, 135-*d*, 135-*e*, 135-*f*, 130-*g*, 130-*h*, 135-*i* of FIGS. 1, 3, 4, 5, 13, 17A, 17B, 19, 21-23C, which may assist in some aspects related to the security and/or automation system. The display 130-*i* and/or the G-CUI 135-*j* may include a message section 1015-*h* and a user response section 1020-*h*, which may each be similar in one or more aspects to message sections 1015, 1015-*a*, 1015-*b*, 1015-*c*, 1015-*d*, 1015-*e*, 1015-*f*, 1015-*g* and user response sections 1020, 1020-*a*, 1020-*b*, 1020-*c*, 1020-*d*, 1020-*e*, 1020-*f*, 1020-*g* depicted in FIGS. 10, 11, 13, 17A, 17B, 19, 21-23C.

As shown in FIG. 24, the message section 1015-*h* of the G-CUI 135-*j* may include an observation or other informational message. More specifically, for example, the observation or other informational message may relate to the remaining life of a consumable component and/or the remaining energy level of a battery of a component of the security and/or automation system.

In some examples, one or more messages displayed in the message section 1015-*h* may not only alert when batteries should be replaced for certain security system sensors, but may also facilitate the presentation of instructions for completing a task relating to the security and/or automation system, including for example a tutorial explaining how to change the batteries of a particular component thereof. In some examples, the tutorial may be presented/displayed in the same G-CUI 135-*j*, thus allowing different message formats within a single interactive platform (useable in some examples by the touch of a screen). In some examples, the G-CUI 135-*j* may display a link to a website where the instructions may be accessed by the user.

In some examples one or more message of the message section 1015-*h* may also provide a user with the option to purchase new batteries. In some examples each subsequent message may be prompted (e.g., triggered, in some examples) by a user response (not shown), and in some examples a subsequent message may be displayed without first receiving a user response (as shown). Other information that may be communicated, whether requested or not, may relate to the status and condition of components/equipment of the security and/or automation system, and/or ways to improve energy efficiency.

Figure 25:
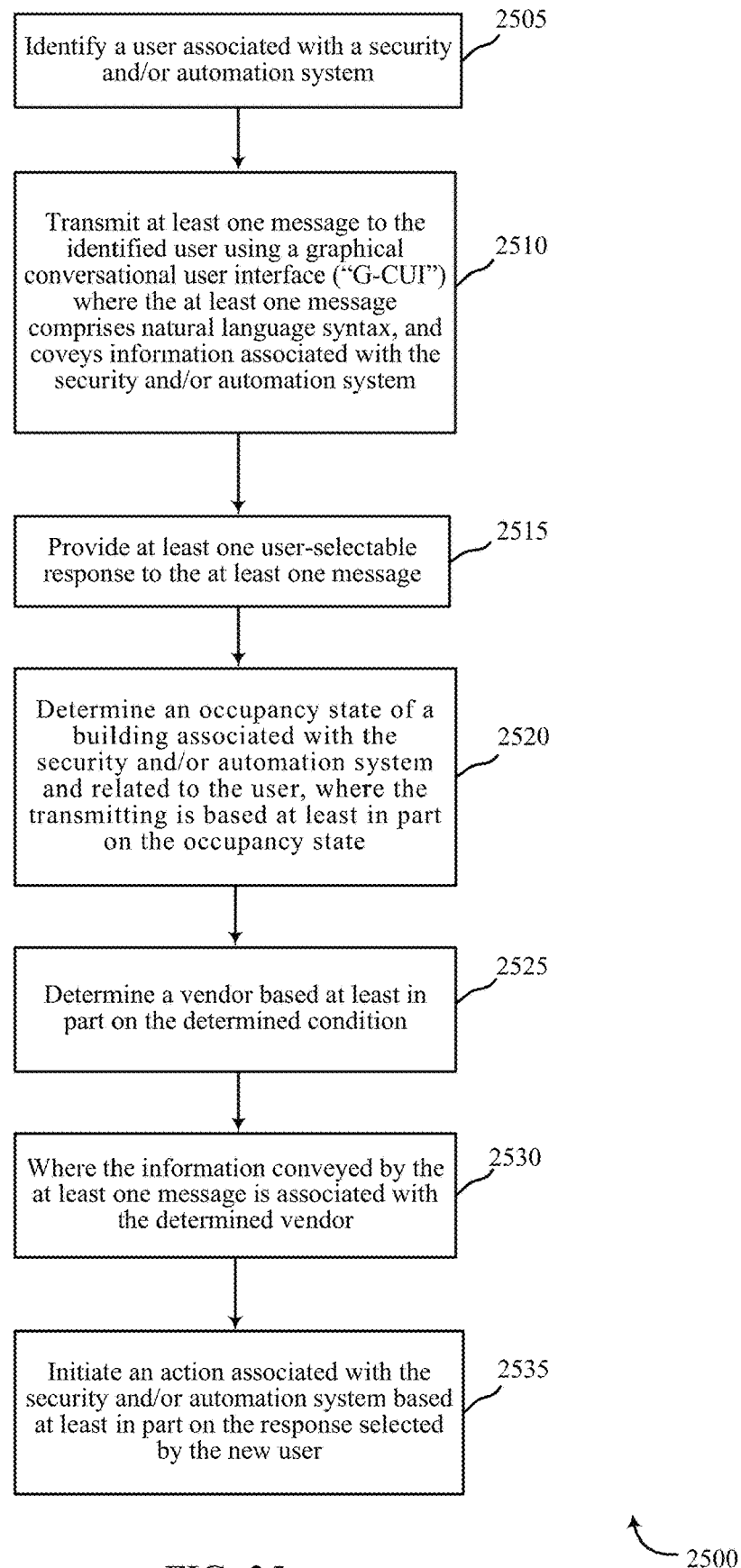
FIG. 25 is a flow diagram illustrating a method relating to a security and/or an automation system that may utilize a G-CUI in accordance with various aspects of this disclosure.

FIG. 25 is a flow diagram illustrating a method 2500 relating to a security and/or an automation system that may utilize a G-CUI in accordance with various aspects of this disclosure. For clarity, the method 2500 is described below with reference to aspects of one or more of the methods 800 and 900 described with reference to FIGS. 8 and 9, and/or aspects of one or more of the methods 1200, 1400, 1500, 1600, 1800 and 2000, described with reference to FIGS. 12, 14, 15, 16, 18 and 20. In some examples, a controller (e.g., a control panel), device, and/or remote computing device, may execute one or more sets of codes to control the functional elements of the security and/or automation system and components thereof to perform the functions described below. Additionally or alternatively, the controller, device, and/or remote computing device may perform one or more of the functions described below using special-purpose hardware.

At block 2505, the method 2500 may include identifying a user associated with a security and/or automation system. In some examples, identifying the user may include determining that the user has a home with separate dwellings (e.g., a "mother-in-law" suite separate from a main dwelling), has a home located in a geographical area experiencing higher than average tourism and/or demand for short-term rentals, and/or has expressed interest in renting out all or part of the home while on vacation. In some examples, identifying the user may include identifying the user out of plurality of users as a point of contact for potential short-term rental opportunities. The operation(s) at block 2505 may be performed using one or more of databases 120, 120-a, user profiles 150, 150-a, entity identifier 545, occupancy state determiner 405, and sensors 125, 125-a, 125-b, as described with reference to FIGS. 2-5.

At block 2510, the method 2500 may include transmitting at least one message to the identified user using a G-CUI, where the at least one message may be in natural language syntax form, and may covey information associated with the security and/or automation system. In some examples the at least one message may include a first message addressing the user and a second message convey the information. In some examples, transmitting the at least one message may include using an avatar associated with the G-CUI. The operation(s) at block 2510 may be performed using one or more of the analyzers 315, 315-a, G-CUI 135-a, 135-b, 135-c, 135-d, message generator 415, transmitters 320, 320-a, observation module 210, and communication module 215, described with reference to FIGS. 2-5.

At block 2515, the method 2500 may include provide at least one user-selectable response to the second message. The operation(s) at block 2515 may be performed using one or more of the analyzers 315, 315-a, G-CUI 135-a, 135-b, 135-c, 135-d, message generator 415, transmitters 320, 320-a, response analyzer 420, observation module 210, communication module 215, described with reference to FIGS. 2-5.

At block 2520, the method 2500 may include determine an occupancy state of a building associated with the security and/or automation system and related to the user. In some examples, the determining of block 2520 (as well as other operations at other blocks described herein) may occur prior to the transmitting of block 2510 and/or the providing of block 2515, and each or either of those operations may be based at least in part on the determined occupancy state of block 2520. In some examples, the determined occupancy state may be "vacation," and the conveyed information may be associated with an opportunity to rent at least a portion of the building while the occupancy state remains "vacation." Alternatively or in addition, at block 2520, the method 2500 may include determining a condition associated with building and/or the security and/or automation system. The operation(s) at block 2520 may be performed using one or more of the analyzers 315, 315-a, 315-b, occupancy state determiner 405, and data analysis module 205, and sensors 125, 125-a, 125-b, described with reference to FIGS. 1-6.

At block 2525, the method 2500 may include determining a vendor based at least in part on the determined condition. In some examples, the vendor may be a partner of a provider of and/or company associated with the security and/or automation system. In some examples determining the vendor may further include gathering and analyzing data regarding a product or service associated with (e.g., offered by) the vendor. For instance, in some examples a vendor may be a third-party online marketplace and/or hospitality service, which may facilitate leasing or renting short-term lodging. In some examples, determining such a vendor may include gathering data regarding demand for a geographical area where the building is located and/or going rates for short-term rentals in the area. The operation(s) at block 2525 may be performed using the databases 120, 120-a, user profiles 150, 150-a, entity identifier 545, memory 510, servers 110, 110-a, network 115, condition detector 410, data analysis module 205, as described with reference to FIGS. 2-5.

At block 2530, the method 2500 may include the information conveyed by the at least one message being associated with the determined vendor. In some examples, the information conveyed may include a tutorial or other presentation to help familiarize the user with goods or services offered by the vendor (e.g., a tutorial on short term rentals of home, how to set up an account to rent a home as a vocational rental using for example the vendor's services, etc.). In some examples, the information conveyed may include a query with the objective of finding out whether the user is already familiar with the goods and services offered by the vendor. In some examples, the information conveyed may relate to short-term rental vendors and the gathered data regarding demand for the geographical area where the building is located and/or going rates for short-term rentals in the area.

At block 2535, the method 2500 may include initiating an action associated with the security and/or automation system based at least in part on the response selected by the new user. In some examples, the action may include sending a message to the vendor, so that the vendor may contact the user. In some examples, the user may also schedule an appointment with a provider of goods and/or services directly from within the G-CUI. In some examples, the action may include facilitating a purchase of the good or use of the service offered by the vendor. In some examples, the action may include initiating a change to the security and/or automation system to accommodate the good or use of the service. For instance, in one example the action may include preparing the security and/or automation system so that the building may be used for a short term rental while the user is away from the building. The operation(s) at block 2535 may be performed using one or more of the analyzers 315, 315-a, G-CUI 135-a, 135-b, 135-c, 135-d, response analyzer 420, change initiator 425, message generator 415, observation module 210, communication module 215, and implementation module 220, transmitters 320, 320-a, described with reference to FIGS. 2-5.

It should be noted that the method 2500 is just one implementation and that the operations of the method 2500 may be rearranged or otherwise modified such that other implementations are possible.

Figures 26A, 26B:
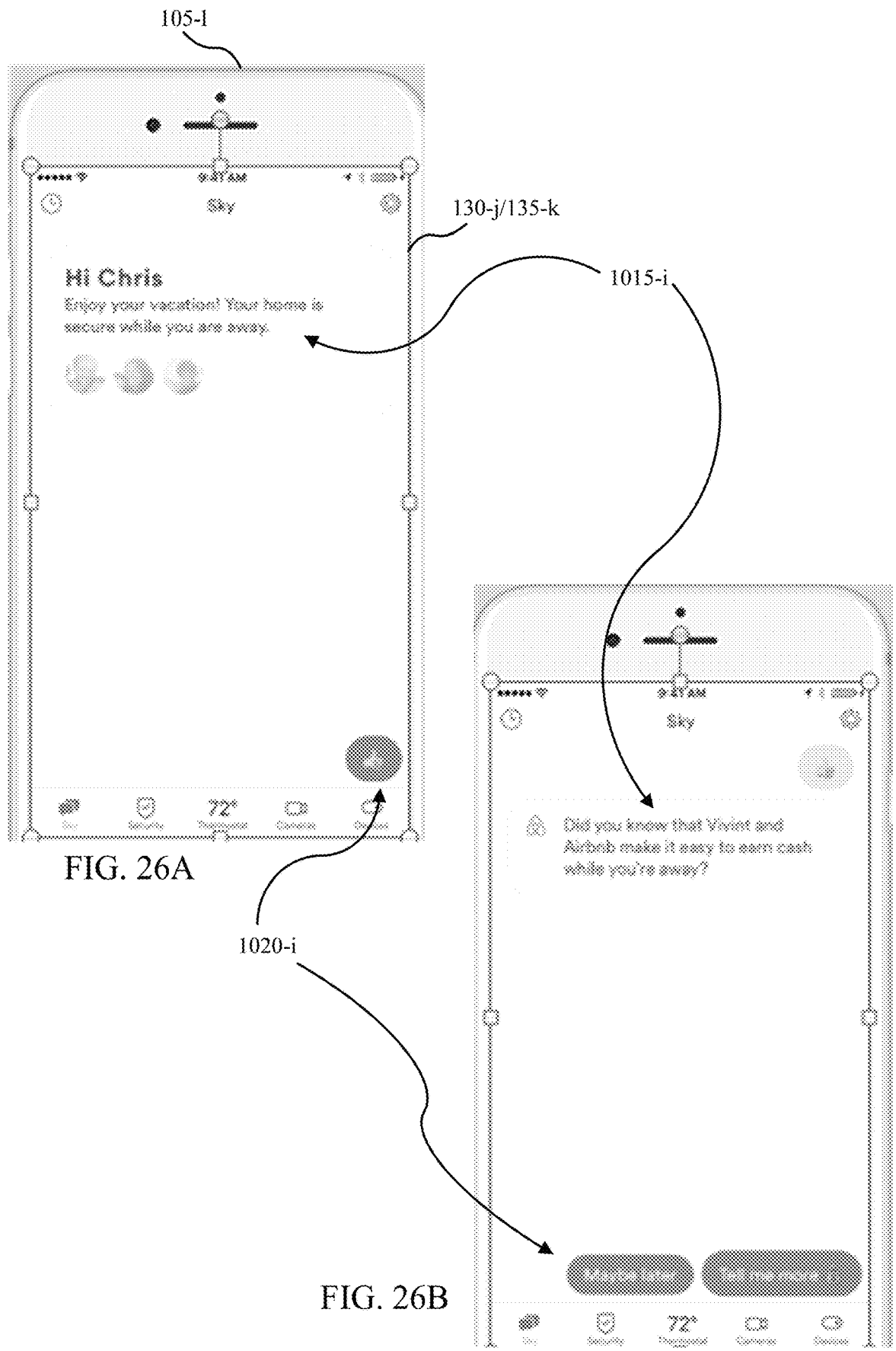
FIGS. 26A and 26B show block diagrams of an apparatus relating to a security and/or an automation system that may utilize a G-CUI in accordance with various aspects of this disclosure.

FIGS. 26A and 26B show block diagrams of an apparatus relating to a security and/or an automation system that may utilize a G-CUI in accordance with various aspects of this disclosure. The apparatus may be or include a device 105-1, which may be similar in one or more aspects to device 105, 105-a, 105-b, 105-c, 105-d, 105-e, 105-f, 105-g, 105-h, 105-i, 105-j, 105-k of FIGS. 1, 5, 7, 10, 11, 13, 17A, 17B, 19, and 21-24. The device 105-1 may include a display 130-*j*, which in one or more aspects may be similar to displays 130, 130-*a*, 130-*b*, 130-*c*, 130-*d*, 130-*e*, 130-*f*, 130-*g*, 130-*h*, 130-*i* of FIGS. 1, 10, 11, 13, 17A, 17B, 19, and 21-24.

In some examples the display 130-*j* may be or include all or part of a G-CUI 135-*k* (or vice versa), which may be similar in some aspects to the G-CUIs 135, 135-*a*, 135-*b*, 135-*c*, 135-*d*, 135-*e*, 135-*f*, 130-*g*, 130-*h*, 135-*i*, 135-*k* of FIGS. 1, 3, 4, 5, 13, 17A, 17B, 19, 21-24, which may assist in some aspects related to utilization of the security and/or automation system. The display 130-*j* and/or the G-CUI 135-*k* may include a message section 1015-*i* and a user response section 1020-*i*, which may each be similar in one or more aspects to message sections 1015, 1015-*a*, 1015-*b*, 1015-*c*, 1015-*d*, 1015-*e*, 1015-*f*, 1015-*g*, 1015-*h* and user response sections 1020, 1020-*a*, 1020-*b*, 1020-*c*, 1020-*d*, 1020-*e*, 1020-*f*, 1020-*g*, 1020-*h* depicted in FIGS. 10, 11, 13, 17A, 17B, 19, and 21-24.

As shown in FIG. 26A, the message section 1015-*i* of the G-CUI 135-*k* may include an observation. For example, a message of the message section 1015-*i* may acknowledge an occupancy state of the home related to the user, and may also display information related to the security and/or automation system. In some cases the message relating to the occupancy states and to the system may be displayed based at least in part on a determined user preference, and/or on a determination that the user may be a good candidate/welcome recipient of the subject of a follow-up and/or subsequent message.

For instance, in some examples based at least in part on a user-selectable response, a subsequent message may be displayed relating to a provider of goods or services, as shown in FIG. 26B. In some cases the message relating to the provider of goods or services may be informational relating to the possibility of renting a home or other building while the user is away from the home for, for instance, an extended period (e.g., vacation). In some examples the provider may be a third-party vendor, which in some examples may also be a partner with a provider of the security and/or automation system. Accordingly, some examples may relate to ways that a user may take advantage of a partnership between the provider of the security and/or automation system and third-party vendor. In some examples, the provider of the security and/or automation system may be a manufacturer of the security and/or automation system and/or of components thereof, and in some examples may be a provider of monitoring services for the security and/or automation systems, and in some examples may be both, and in some examples may be neither but otherwise related at some point to the purchase and/or maintenance of the security and/or automation system.

In some examples the message relating to a third-party provider of goods and/or services may inquire, whether explicitly or implicitly, regarding or gauge the interest level of the user with respect to an offer or opportunity, without overloading the user with too much (and in some examples, without any additional) unrequested information. In some examples, depending at least in part on selection of a user response, more information relating to the services and good and the provider thereof may or may not be displayed. In some examples, a user's responses relating to third-party goods and/or services and other opportunities may be logged and analyzed. In some examples the content and/or frequency of future similar messages may be based on the logged responses and analyses thereof.

Figure 27:
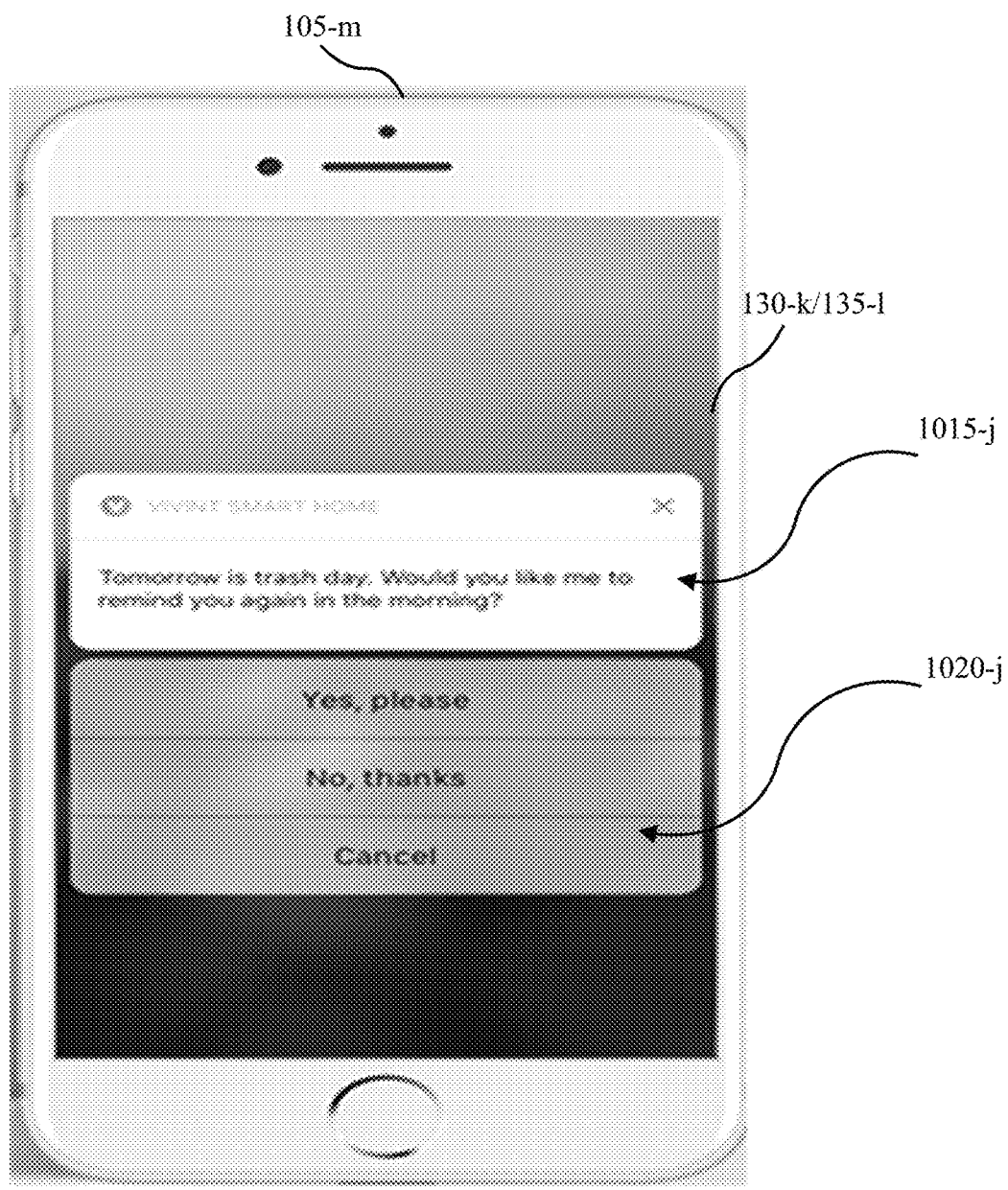
FIG. 27 is a block diagram illustrating an apparatus in accordance with various aspects of this disclosure.

FIG. 27 is a block diagram illustrating an apparatus relating to a security and/or an automation system, in accordance with various aspects of this disclosure. The apparatus may be or include a device 105-*m*, which may be similar in one or more aspects to device 105, 105-*a*, 105-*b*, 105-*c*, 105-*d*, 105-*e*, 105-*f*, 105-*g*, 105-*h*, 105-*i*, 105-*j*, 105-*k*, 105-1 of FIGS. 1, 5, 7, 10, 11, 13, 17A, 17B, 19, 21-24, and 26. The device 105-*m* may include a display 130-*k*, which in one or more aspects may be similar to displays 130, 130-*a*, 130-*b*, 130-*c*, 130-*d*, 130-*e*, 130-*f*, 130-*g*, 130-*h*, 130-*i*, 130-*j* of FIGS. 1, 10, 11, 13, 17A, 17B, 19, 21-24, and 26.

In some examples the display 130-*k* may be or include all or part of a G-CUI 135-1 (or vice versa), which may be similar in some aspects to the G-CUIs 135, 135-*a*, 135-*b*, 135-*c*, 135-*d*, 135-*e*, 135-*f*, 135-*g*, 130-*h*, 135-*i*, 135-*j*, and 135-*k* of FIGS. 1, 3, 4, 5, 13, 17A, 17B, 19, 21-25. The display 130-*k* may include a message section 1015-*j* and a user response section 1020-*j*, which may each be similar in one or more aspects to those message sections and user response sections previously mentioned.

As depicted, an observation may be made related to the security and/or automation system and/or a building and/or building premises thereof. In some embodiments, the observation may be a reminder displayed in the message section 1015-*j* of the display 130-*k*. For example, as shown in FIG. 27 the observation may remind a user that tomorrow is trash day. The reminder may be displayed based at least in part on user settings inputted by the user, a determined user preference, or any other data provided to the security and/or automation system. The reminder may be repeated weekly, monthly, annually or by any interval. In some instances the reminder may be synced with a calendar (e.g., a calendar involving another program or application).

In some examples, multiple observations or different events may be made throughout the day (or week or some other period of time). Events deemed significant to a particular user (based for example on user setting or based on actions by the user indicating that the user may have a particular interest in the events) may be provided in a summary/recap at the end of the day.

In some examples, system alerts or other notices may also be displayed via the G-CUI in conversational format. For instance, a user may be notified of a "lost internet connection," or "your system is in maintenance mode," etc.

Responses to one or more observations may be provided in the user response section 1020-*j*. In some examples, the responses may relate to providing instructions or a command relating to the observation and the performance of an action or sequence of actions or task. For example, as shown the reminder may instruct that a follow up reminder be sent at a later time closer to when the trash should be taken by the user to a curb in front of a home or building.

In some examples, based at least in part on the response selected by the user (and in some examples, based on a multiple responses selected for instance at different time), a rule may be generated. The rule may be based at least in part on, for example, the command or instruction and/or the performance of the action or task.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed. The operations and the steps may be rearranged or otherwise modified and that other implementations are possible. Further, aspects from two or more of the methods may be combined.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The various illustrative blocks and modules described in connection with the disclosure herein may be implemented or performed with a general-purpose processor, a DSP, an ASIC, FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, EEPROM, flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon." Also, the phrase "based on" shall not be construed as a reference to a closed set of conditions. For example, an exemplary step that is described as "based on condition A" may be based on both a condition A and a condition B without departing from the scope of the present disclosure. As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C).

The term "home" as used herein may refer to any building, including the premises of the building. In other words, home may include corporate office buildings and many different types of structures and properties. In some examples, however, "home" may have a more limited meaning and refer for example to a single family dwelling (not a shared building including multiple residences, such as an apartment, etc.).

What is claimed is:

1. A method of communicating with a user of a security and/or automation system, comprising:
   determining an occupancy state of a home relating to a user;
   detecting a condition of a component of the security and/or automation system associated with the home, the condition being associated with actions taken by occupants of the home;

accessing a profile associated with the user based at least in part on detecting the condition of the component, the profile comprising responses of the user to messages from the security and/or automation system;

selecting, based at least in part on the responses of the user and the detected condition of the component, between communicating a message to the user comprising a request for permission from the user to initiate a change associated with the component of the system and refraining from generating the message;

generating, based at least in part on selecting to communicate the message, a natural language message related to the system, the natural language message comprising one or more learned language characteristics of the user, an indication of one or more actions of the user associated with the component, and the request for permission from the user to initiate the change associated with the component;

displaying, based at least in part on the determined occupancy state of the user and the detected condition of the component, the natural language message to the user on a graphical conversational user interface ("G-CUI");

receiving, via the G-CUI, a response from the user comprising an instruction whether to grant permission to initiate the change based at least in part on the displaying; and generating a rule associated with the component of the security and/or automation system and a future occupancy state of the home relating to the user based at least in part on the received response, wherein the rule is included in the profile associated with the user.

2. The method of claim 1, wherein the condition of the component began at a first time, and the generated rule is further based at least in part on an action of the user relating to the component that began at a second time prior to the first time.

3. The method of claim 1, wherein the generated rule is further based at least in part on a prior instruction of the user whether to grant or deny permission to initiate a prior change related to the change.

4. The method of claim 1, further comprising:
providing, via the G-CUI, a plurality of user-selectable responses associated with the message, the plurality of user-selectable responses comprising natural language syntax;
wherein the response from the user is selected from among the plurality of user-selectable responses.

5. The method of claim 4, further comprising:
providing, via the G-CUI, a keyboard user interface based at least in part on the response selected from among the plurality of user-selectable responses; and
enabling communication, via the G-CUI, with a live customer service agent using the keyboard user interface.

6. The method of claim 1, wherein the occupancy state is one of:
home, returning home, away, sleep, or vacation.

7. The method of claim 6, wherein the occupancy state is vacation, and the request is associated with a short term rental of at least a portion of the home.

8. The method of claim 1, wherein the condition is at least one of:
an unlocked or locked door or window, an open or closed door or window, a thermostat/HVAC output, an active/activated or inactive/deactivated appliance/media(TV)/fan/electronic device, open or closed blinds/curtains, turned on or off lights, an unarmed or disarmed state of the security and/or automation system, a running faucet, or a combination thereof.

9. The method of claim 1, further comprising:
displaying, via the G-CUI, the generated rule to the user; and
receiving, via the G-CUI, a command from the user to implement the generated rule.

10. The method of claim 1, wherein the occupancy state of the home further relates to another person, and the future occupancy states further relates to the other person.

11. The method of claim 1, wherein the component is consumable and the detected condition indicates a need for replenishment, and the request relates to replenishing the consumable component.

12. The method of claim 11, wherein the request comprises making a purchase order associated with replenishing the consumable component.

13. The method of claim 11, wherein the detecting comprises determining that an efficiency rating associated with the security and/or automation system and relating to the consumable component is lower than a threshold.

14. The method of claim 1, further comprising:
identifying the user;
analyzing a historical pattern of conditions of the component associated with occupancy states of the home relating to the identified user; and
determining a preference of the user associated with the condition of the component based at least in part on the analyzing;
wherein the generated rule is based at least in part on the determined preference.

15. An apparatus for a security and/or automation system, comprising:
a processor;
memory in electronic communication with the processor; and
instructions stored in the memory, the instructions being executable by the processor to:
determine an occupancy state of a home relating to a user;
detect a condition of a component of the security and/or automation system associated with the home, the condition being associated with actions taken by occupants of the home;
access a profile associated with the user based at least in part on detecting the condition of the component, the profile comprising responses of the user to messages from the security and/or automation system;
select, based at least in part on the responses of the user and the detected condition of the component, between communicating a message to the user comprising a request for permission from the user to initiate a change associated with the component of the system and refraining from generating the message;
generate, based at least in part on selecting to communicate the message, a natural language message related to the system, the natural language message comprising one or more learned language characteristics of the user, an indication of one or more actions of the user associated with the component, and the request for permission from the user to initiate the change associated with the component;
display, based at least in part on the determined occupancy state of the user and the detected condition of the component, the natural language message to the user on a graphical conversational user interface ("G-CUI");

receive, via the G-CUI, a response from the user comprising an instruction whether to grant permission to initiate the change based at least in part on the displaying; and generate a rule associated with the component of the security and/or automation system and a future occupancy state of the home relating to the user based at least in part on the received response, wherein the rule is included in the profile associated with the user.

16. The apparatus of claim 15, wherein the condition of the component began at a first time, and the generated rule is further based at least in part on an action of the user relating to the component that began at a second time prior to the first time.

17. The apparatus of claim 15, wherein the generated rule is further based at least in part on a prior instruction of the user whether to grant or deny permission to initiate a prior change related to the change.

18. The apparatus of claim 15, wherein the instructions are further executable by the processor to:

provide, via the G-CUI, a plurality of user-selectable responses associated with the message, the plurality of user-selectable responses comprising natural language syntax;

wherein the response from the user is selected from among the plurality of user-selectable responses.

19. The apparatus of claim 15, wherein the instructions are further executable by the processor to:

identify the user;

analyze a historical pattern of conditions of the component associated with occupancy states of the home relating to the identified user; and determine a preference of the user associated with the condition of the component based at least in part on the analyzing;

wherein the generated rule is based at least in part on the determined preference.

20. A non-transitory computer-readable medium storing computer-executable code relating to a security and/or automation system, the code executable by a processor to:

determine an occupancy state of a home relating to a user;

detect a condition of a component of the security and/or automation system associated with the home, the condition being associated with actions taken by occupants of the home;

access a profile associated with the user based at least in part on detecting the condition of the component, the profile comprising responses of the user to messages from the security and/or automation system;

select, based at least in part on the responses of the user and the detected condition of the component, between communicating a message to the user comprising a request for permission from the user to initiate a change associated with the component of the system and refraining from generating the message;

generate, based at least in part on selecting to communicate the message, a natural language message related to the system, the natural language message comprising one or more learned language characteristics of the user, an indication of one or more actions of the user associated with the component, and the request for permission from the user to initiate the change associated with the component;

display, based at least in part on the determined occupancy state of the user and the detected condition of the component, the natural language message to the user on a graphical conversational user interface ("G-CUI");

receive, via the G-CUI, a response from the user comprising an instruction whether to grant permission to initiate the change based at least in part on the displaying; and generate a rule associated with the component of the security and/or automation system and a future occupancy state of the home relating to the user based at least in part on the received response, wherein the rule is included in the profile associated with the user.

* * * * *